US009153194B2

(12) United States Patent
Levien et al.

(10) Patent No.: US 9,153,194 B2
(45) Date of Patent: Oct. 6, 2015

(54) PRESENTATION FORMAT SELECTION BASED AT LEAST ON DEVICE TRANSFER DETERMINATION

(75) Inventors: Royce A. Levien, Lexington, MA (US); Richard T. Lord, Tacoma, WA (US); Robert W. Lord, Seattle, WA (US); Mark A. Malamud, Seattle, WA (US); John D. Rinaldo, Jr., Bellevue, WA (US); Clarence T. Tegreene, Bellevue, WA (US)

(73) Assignee: ELWHA LLC, Bellevue, WA (US)

( * ) Notice: Subject to any disclaimer, the term of this patent is extended or adjusted under 35 U.S.C. 154(b) by 0 days.

(21) Appl. No.: 13/317,832

(22) Filed: Oct. 28, 2011

(65) Prior Publication Data

US 2012/0249287 A1 Oct. 4, 2012

Related U.S. Application Data

(63) Continuation of application No. 13/317,827, filed on Oct. 27, 2011, and a continuation-in-part of application No. 13/065,885, filed on Mar. 30, 2011, and a continuation-in-part of application No.

(Continued)

(51) Int. Cl.
*G06F 7/04* (2006.01)
*G09G 5/00* (2006.01)

(52) U.S. Cl.
CPC .............. *G09G 5/00* (2013.01); *G09G 2340/04* (2013.01); *G09G 2340/14* (2013.01); *G09G 2354/00* (2013.01); *G09G 2358/00* (2013.01)

(58) Field of Classification Search
CPC . G09G 5/00; G09G 2340/04; G09G 2354/00; G09G 2340/14; G09G 2358/00
See application file for complete search history.

(56) References Cited

U.S. PATENT DOCUMENTS

| | | | |
|---|---|---|---|
| 5,875,257 | A | 2/1999 | Marrin et al. |
| 6,002,427 | A | 12/1999 | Kipust |
| 6,128,003 | A | 10/2000 | Smith et al. |
| 6,961,912 | B2 | 11/2005 | Aoki et al. |
| 7,190,351 | B1 | 3/2007 | Goren |
| 7,200,248 | B2 | 4/2007 | Horiguchi |
| 7,236,156 | B2 | 6/2007 | Liberty et al. |
| 7,260,726 | B1 | 8/2007 | Doe et al. |
| 7,437,765 | B2 | 10/2008 | Elms et al. |
| 7,649,444 | B1 | 1/2010 | Fear et al. |

(Continued)

OTHER PUBLICATIONS

"Computer Detecting User Presence Video Mockup [Ubuntu]"; Web Upd8.org; Bearing a date of Sep. 14, 2010; pp. 1-11; located at: http://www.webupd8.org/2010/09/computer-detecting-user-presence-video.html; printed on Mar. 30, 2011.
"How do I detect when a user is sitting in the chair in front of a computer?"; Superuser.com; Bearing a date of Aug. 11, 2009; 5 Total pages; located at: http://superuser.com/questions/21364/how-do-i-detect-when-a-user-is-sitting-in-the-chair-in-front-of-a-computer.
Pike, John; "Homeland Security: Biometrics"; GlobalSecurity.org; Bearing a date of Mar. 9, 2007; 4 Total pages; located at: http://www.globalsecurity.org/security/systems/biometrics.htm.

(Continued)

*Primary Examiner* — Nirav B Patel
*Assistant Examiner* — Mohammed Waliullah

(57) ABSTRACT

A computationally implemented method includes, but is not limited to: determining that a computing device that was in possession of a first user has been transferred from the first user to a second user, the determining including at least partially identifying the second user and the computing device being designed for presenting one or more items; and presenting, via the computing device, the one or more items in one or more particular formats, the one or more particular formats being selected based, at least in part, on said determining. In addition to the foregoing, other method aspects are described in the claims, drawings, and text forming a part of the present disclosure.

36 Claims, 24 Drawing Sheets

Related U.S. Application Data

13/065,964, filed on Mar. 31, 2011, and a continuation-in-part of application No. 13/066,848, filed on Apr. 25, 2011, and a continuation-in-part of application No. 13/066,917, filed on Apr. 26, 2011, now Pat. No. 8,347,399, and a continuation-in-part of application No. 13/135,314, filed on Jun. 29, 2011, and a continuation-in-part of application No. 13/135,392, filed on Jun. 30, 2011, and a continuation-in-part of application No. 13/199,237, filed on Aug. 22, 2011, and a continuation-in-part of application No. 13/199,286, filed on Aug. 23, 2011, and a continuation-in-part of application No. 13/200,743, filed on Sep. 28, 2011, and a continuation-in-part of application No. 13/200,800, filed on Sep. 29, 2011.

(56) References Cited

U.S. PATENT DOCUMENTS 7,774,486 B2 8/2010 Clarke
7,868,778 B2 1/2011 Kenwright
8,279,242 B2 10/2012 Bentley
8,289,130 B2 10/2012 Nakajima et al.
8,406,162 B2 3/2013 Haupt et al.
8,479,122 B2 7/2013 Hotelling et al.
2002/0126876 A1 9/2002 Paul et al.
2002/0176603 A1 11/2002 Bauer et al.
2003/0016253 A1 1/2003 Aoki et al.
2003/0107584 A1 6/2003 Clapper
2005/0039027 A1 2/2005 Shapiro
2005/0149726 A1 7/2005 Joshi et al.
2006/0052132 A1 3/2006 Naukkarinen et al.
2006/0277474 A1 12/2006 Robarts et al.
2007/0005616 A1 1/2007 Hay et al.
2007/0030824 A1 2/2007 Ribaudo et al.
2007/0042714 A1* 2/2007 Ayed ............ 455/41.2
2007/0052672 A1 3/2007 Ritter et al.
2007/0118604 A1 5/2007 Costa Requena
2007/0150827 A1 6/2007 Singh et al.
2007/0162574 A1* 7/2007 Williamson et al. .......... 709/220
2007/0174633 A1 7/2007 Draper et al.
2007/0222771 A1 9/2007 Brask et al.
2007/0234209 A1 10/2007 Williams
2007/0247425 A1 10/2007 Liberty et al.
2007/0259685 A1 11/2007 Engblom et al.
2008/0159496 A1 7/2008 Brown
2008/0201783 A1 8/2008 Tamai
2008/0233996 A1 9/2008 Ogasawara et al.
2008/0266089 A1 10/2008 Haren et al.
2008/0271109 A1 10/2008 Singh et al.
2009/0005079 A1 1/2009 Shields et al.
2009/0006962 A1 1/2009 Ives et al.
2009/0015425 A1 1/2009 Palmqvist et al.
2009/0179765 A1* 7/2009 Nymark et al. ............... 340/669
2009/0210932 A1 8/2009 Balakrishnan et al.
2009/0239587 A1 9/2009 Negron et al.
2009/0240569 A1 9/2009 Ramer et al.
2009/0253410 A1* 10/2009 Fitzgerald et al. ............ 455/411
2009/0292930 A1 11/2009 Marano et al.
2009/0297064 A1 12/2009 Koziol et al.
2010/0042827 A1 2/2010 Pratt et al.
2010/0053322 A1 3/2010 Marti et al.
2010/0124363 A1 5/2010 Ek et al.
2010/0157135 A1 6/2010 Dossaji et al.
2010/0167783 A1 7/2010 Alameh et al.
2010/0180210 A1 7/2010 Toyama et al.
2010/0222141 A1 9/2010 LaSalvia et al.
2010/0235667 A1 9/2010 Mucignat et al.
2010/0275159 A1 10/2010 Matsubara et al.
2011/0025842 A1 2/2011 King et al.
2011/0069940 A1 3/2011 Shimy et al.
2011/0072452 A1 3/2011 Shimy et al.
2011/0083109 A1 4/2011 Hildebrandt et al.
2011/0093806 A1 4/2011 Cohen et al.
2011/0107427 A1 5/2011 Cohen et al.
2011/0110557 A1 5/2011 Clark et al.
2011/0133908 A1 6/2011 Leung
2011/0141011 A1 6/2011 Lashina et al.
2011/0154266 A1 6/2011 Friend et al.
2011/0166972 A1 7/2011 Cohen et al.
2011/0175822 A1 7/2011 Poon et al.
2011/0197121 A1 8/2011 Kletter
2011/0202269 A1 8/2011 Reventlow
2011/0219340 A1 9/2011 Pathangay et al.
2011/0227856 A1 9/2011 Corroy et al.
2011/0231911 A1 9/2011 White et al.
2011/0265179 A1 10/2011 Newman et al.
2011/0283241 A1 11/2011 Miller et al.
2011/0317872 A1 12/2011 Free
2011/0321143 A1 12/2011 Angaluri et al.
2012/0017147 A1 1/2012 Mark
2012/0028625 A1 2/2012 Konig
2012/0062729 A1 3/2012 Hart et al.
2012/0081392 A1* 4/2012 Arthur .......................... 345/633
2012/0088543 A1 4/2012 Lindner et al.
2012/0108215 A1* 5/2012 Kameli ...................... 455/412.2
2012/0124456 A1 5/2012 Perez et al.
2012/0131471 A1 5/2012 Terlouw et al.
2012/0151339 A1 6/2012 Zhang et al.
2012/0166966 A1 6/2012 Wood et al.
2012/0172085 A1 7/2012 Vuppu et al.
2012/0191764 A1 7/2012 Leibu et al.
2012/0235790 A1 9/2012 Zhao et al.
2012/0256967 A1 10/2012 Baldwin et al.
2012/0293528 A1 11/2012 Larsen
2012/0299876 A1 11/2012 De Leon et al.
2012/0311438 A1 12/2012 Cranfill et al.
2012/0330660 A1 12/2012 Jaiswal
2013/0065608 A1 3/2013 Nakajima et al.
2013/0159939 A1 6/2013 Krishnamurthi

OTHER PUBLICATIONS

U.S. Appl. No. 13/374,479, Levien et al.
U.S. Appl. No. 13/374,352, Levien et al.
U.S. Appl. No. 13/374,213, Levien et al.
U.S. Appl. No. 13/374,083, Levien et al.
U.S. Appl. No. 13/373,796, Levien et al.
U.S. Appl. No. 13/373,679, Levien et al.
U.S. Appl. No. 13/317,827, Levien et al.
U.S. Appl. No. 13/200,800, Levien et al.
U.S. Appl. No. 13/200,743, Levien et al.
U.S. Appl. No. 13/199,286, Levien et al.
U.S. Appl. No. 13/199,237, Levien et al.
U.S. Appl. No. 13/135,392, Levien et al.
U.S. Appl. No. 13/135,314, Levien et al.
U.S. Appl. No. 13/066,917, Levien et al.
U.S. Appl. No. 13/066,848, Levien et al.
U.S. Appl. No. 13/065,964, Levien et al.
U.S. Appl. No. 13/065,885, Levien et al.
Hughes, Neil; "Apple Exploring Face Detection to Unlock, Customize & Interact with iOS Devices"; bearing a date of Apr. 5, 2012; pp. 1-4; AppleInsider; http://www.appleinsider.com/articles/12/04/05/apple_exploring_face_detection_to_unlock_customize_interact_with_ios_devices.html.
Kernchen et al.; "Multimodal user interfaces for context-aware mobile applications"; IEEE 16$^{th}$ International Symposium on Personal, Indoor and Mobile Radio Communications; bearing a date of Mar. 20, 2005; pp. 2268-2273; #1568961325; IEEE.
Noll et al.; "Integrating Mobile Devices into Semantic Services Environments"; The Fourth International Conference on Wireless and Mobile Communications; bearing a date of Mar. 4, 2008; pp. 137-143; IEEE Computer Society.
Kionix et al.; "Screen Rotation and Device Orientation"; AN 011; May 21, 2007; pp. 1-6; Kionix, Inc.

* cited by examiner

PRESENTATION FORMAT SELECTION BASED AT LEAST ON DEVICE TRANSFER DETERMINATION

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications, including any priority claims, is incorporated herein by reference to the extent such subject matter is not inconsistent herewith.

For purposes of the USPTO extra-statutory requirements, the present application constitutes a continuation of U.S. patent application Ser. No. 13/317,827, entitled PRESENTATION FORMAT SELECTION BASED AT LEAST ON DEVICE TRANSFER DETERMINATION, naming Royce A. Levien; Richard T. Lord; Robert W. Lord; Mark A. Malamud; John D. Rinaldo, Jr.; Clarence T. Tegreene as inventors, filed 27 Oct. 2011, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/065,885, entitled ACCESS RESTRICTION IN RESPONSE TO DETERMINING DEVICE TRANSFER, naming Royce A. Levien; Richard T. Lord; Robert W. Lord; Mark A. Malamud; John D. Rinaldo, Jr.; Clarence T. Tegreene as inventors, filed 30 Mar. 2011, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/065,964, entitled ACCESS RESTRICTION IN RESPONSE TO DETERMINING DEVICE TRANSFER, naming Royce A. Levien; Richard T. Lord; Robert W. Lord; Mark A. Malamud; John D. Rinaldo, Jr.; Clarence T. Tegreene as inventors, filed 31 Mar. 2011, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/066,848, entitled PROVIDING GREATER ACCESS TO ONE OR MORE ITEMS IN RESPONSE TO DETERMINING DEVICE TRANSFER, naming Royce A. Levien; Richard T. Lord; Robert W. Lord; Mark A. Malamud; John D. Rinaldo, Jr.; Clarence T. Tegreene as inventors, filed 25 Apr. 2011, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/066,917, entitled PROVIDING GREATER ACCESS TO ONE OR MORE ITEMS IN RESPONSE TO DETERMINING DEVICE TRANSFER, naming Royce A. Levien; Richard T. Lord; Robert W. Lord; Mark A. Malamud; John D. Rinaldo, Jr.; Clarence T. Tegreene as inventors, filed 26 Apr. 2011, now U.S. Pat. No. 8,347,399 which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/135,314, entitled PROVIDING PARTICULAR LEVEL OF ACCESS TO ONE OR MORE ITEMS IN RESPONSE TO DETERMINING PRIMARY CONTROL OF A COMPUTING DEVICE, naming Royce A. Levien; Richard T. Lord; Robert W. Lord; Mark A. Malamud; John D. Rinaldo, Jr.; Clarence T. Tegreene as inventors, filed 29 Jun. 2011, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/135,392, entitled PROVIDING PARTICULAR LEVEL OF ACCESS TO ONE OR MORE ITEMS IN RESPONSE TO DETERMINING PRIMARY CONTROL OF A COMPUTING DEVICE, naming Royce A. Levien; Richard T. Lord; Robert W. Lord; Mark A. Malamud; John D. Rinaldo, Jr.; Clarence T. Tegreene as inventors, filed 30 Jun. 2011, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/199,237, entitled SELECTIVE ITEM ACCESS PROVISION IN RESPONSE TO ACTIVE ITEM ASCERTAINMENT UPON DEVICE TRANSFER, naming Royce A. Levien; Richard T. Lord; Robert W. Lord; Mark A. Malamud; John D. Rinaldo, Jr.; Clarence T. Tegreene as inventors, filed 22 Aug. 2011, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/199,286, entitled SELECTIVE ITEM ACCESS PROVISION IN RESPONSE TO ACTIVE ITEM ASCERTAINMENT UPON DEVICE TRANSFER, naming Royce A. Levien; Richard T. Lord; Robert W. Lord; Mark A. Malamud; John D. Rinaldo, Jr.; Clarence T. Tegreene as inventors, filed 23 Aug. 2011, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/200,743, entitled PROVIDING GREATER ACCESS TO ONE OR MORE ITEMS IN RESPONSE TO VERIFYING DEVICE TRANSFER, naming Royce A. Levien; Richard T. Lord; Robert W. Lord; Mark A. Malamud; John D. Rinaldo, Jr.; Clarence T. Tegreene as inventors, filed 28 Sep. 2011, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/200,800, entitled PROVIDING GREATER ACCESS TO ONE OR MORE ITEMS IN RESPONSE TO VERIFYING DEVICE TRANSFER, naming Royce A. Levien; Richard T. Lord; Robert W. Lord; Mark A. Malamud; John D. Rinaldo, Jr.; Clarence T. Tegreene as inventors, filed 29 Sep. 2011, which is currently co-pending or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above, but expressly points out that such designation(s) are not to be construed in any way as any type of commentary and/or admission as to whether or not the present application contains any new matter in addition to the matter of its parent application(s).

SUMMARY

A computationally implemented method includes, but is not limited to determining that a computing device that was in possession of a first user has been transferred from the first user to a second user, the determining including at least partially identifying the second user and the computing device being designed for presenting one or more items; and presenting, via the computing device, the one or more items in one or more particular formats, the one or more particular formats being selected based, at least in part, on said determining. In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware in one or more machines or article of manufacture configured to effect the herein-referenced method aspects depending upon the design choices of the system designer.

A computationally implemented system includes, but is not limited to: means for determining that a computing device that was in possession of a first user has been transferred from the first user to a second user, the determining including at least partially identifying the second user and the computing device being designed for presenting one or more items; and means for presenting, via the computing device, the one or more items in one or more particular formats, the one or more particular formats being selected based, at least in part, on said determining. In addition to the foregoing, other system aspects are described in the claims, drawings, and text forming a part of the present disclosure.

A computationally implemented system includes, but is not limited to: circuitry for determining that a computing device that was in possession of a first user has been transferred from the first user to a second user, the determining including at least partially identifying the second user and the computing device being designed for presenting one or more items; and circuitry for presenting, via the computing device, the one or more items in one or more particular formats, the one or more particular formats being selected based, at least in part, on said determining. In addition to the foregoing, other system aspects are described in the claims, drawings, and text forming a part of the present disclosure.

An article of manufacture including a non-transitory storage medium bearing one or more instructions for determining that a computing device that was in possession of a first user has been transferred from the first user to a second user, the determining including at least partially identifying the second user and the computing device being designed for presenting one or more items; and one or more instructions for presenting, via the computing device, the one or more items in one or more particular formats, the one or more particular formats being selected based, at least in part, on said determining. In addition to the foregoing, other computer program product aspects are described in the claims, drawings, and text forming a part of the present disclosure.

A method for determining that a computing device that was in possession of a first user has been transferred from the first user to a second user, the determining including at least partially identifying the second user and the computing device being designed for presenting one or more items; and presenting, via the computing device, the one or more items in one or more particular formats, the one or more particular formats being selected based, at least in part, on said determining, wherein said determining that a computing device that was in possession of a first user has been transferred from the first user to a second user, the determining including at least partially identifying the second user and the computing device being designed for presenting one or more items and/or said presenting, via the computing device, the one or more items in one or more particular formats, the one or more particular formats being selected based, at least in part, on said determining are performed via at least one of a machine, article of manufacture, or composition of matter.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
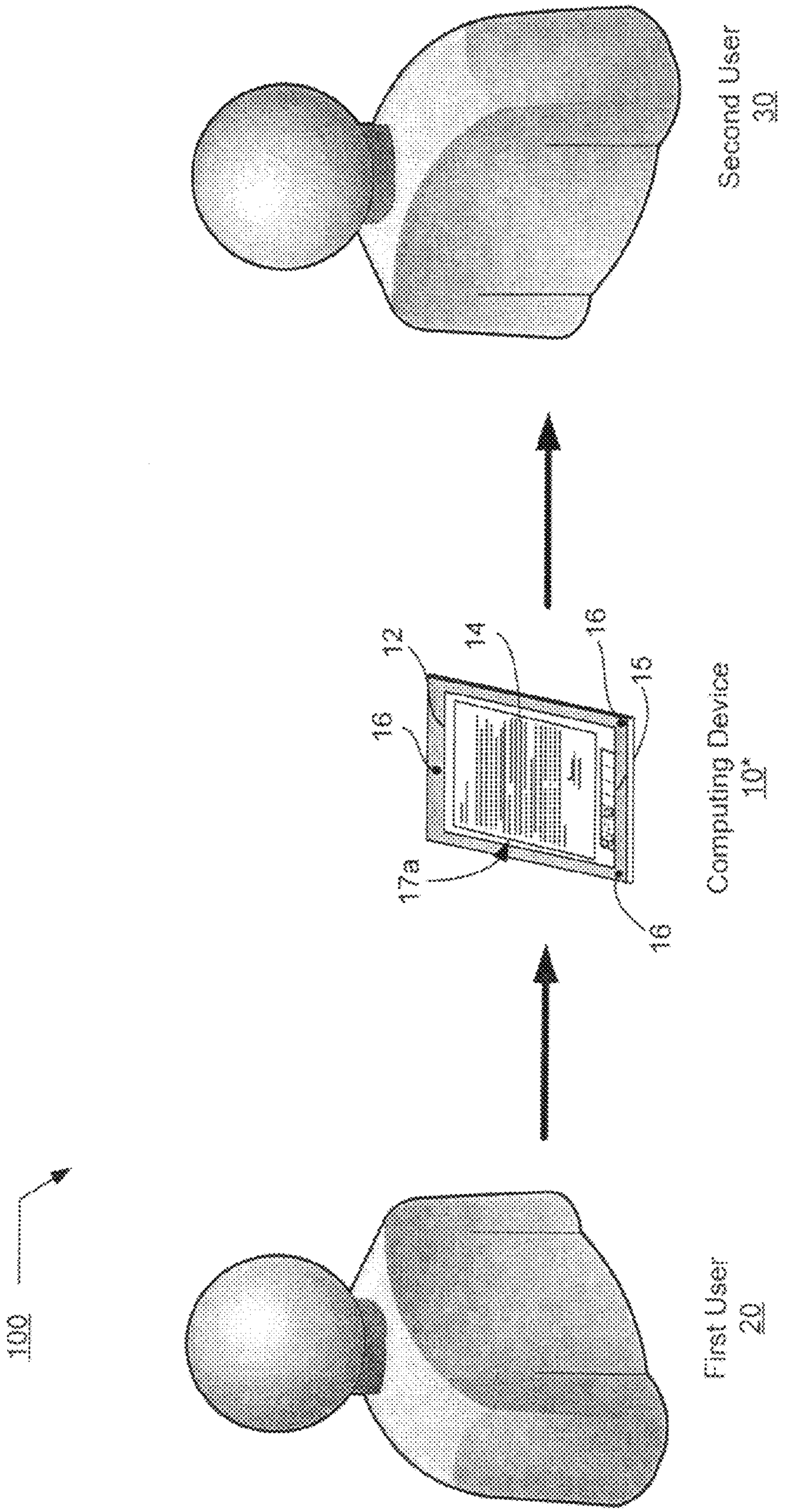
FIG. 1 shows a computing device 10* being transferred between two users in an exemplary environment 100.

FIG. **2*a* shows one type of movement that may be detected/monitored by the computing device 10* of FIG. 1**.

FIG. **2*b* shows another type of movement that may be detected/monitored by the computing device 10* of FIG. 1**.

FIG. **2*c* shows another type of movement that may be detected/monitored by the computing device 10* of FIG. 1**.

FIG. **2*d* shows overall 3-dimensional movements of the computing device 10* of FIG. 1 that may be detected/monitored by the computing device 10***.

FIG. **3*a* shows a particular implementation of the computing device 10* of FIG. 1 illustrated as computing device 10'**.

Figure 3A:
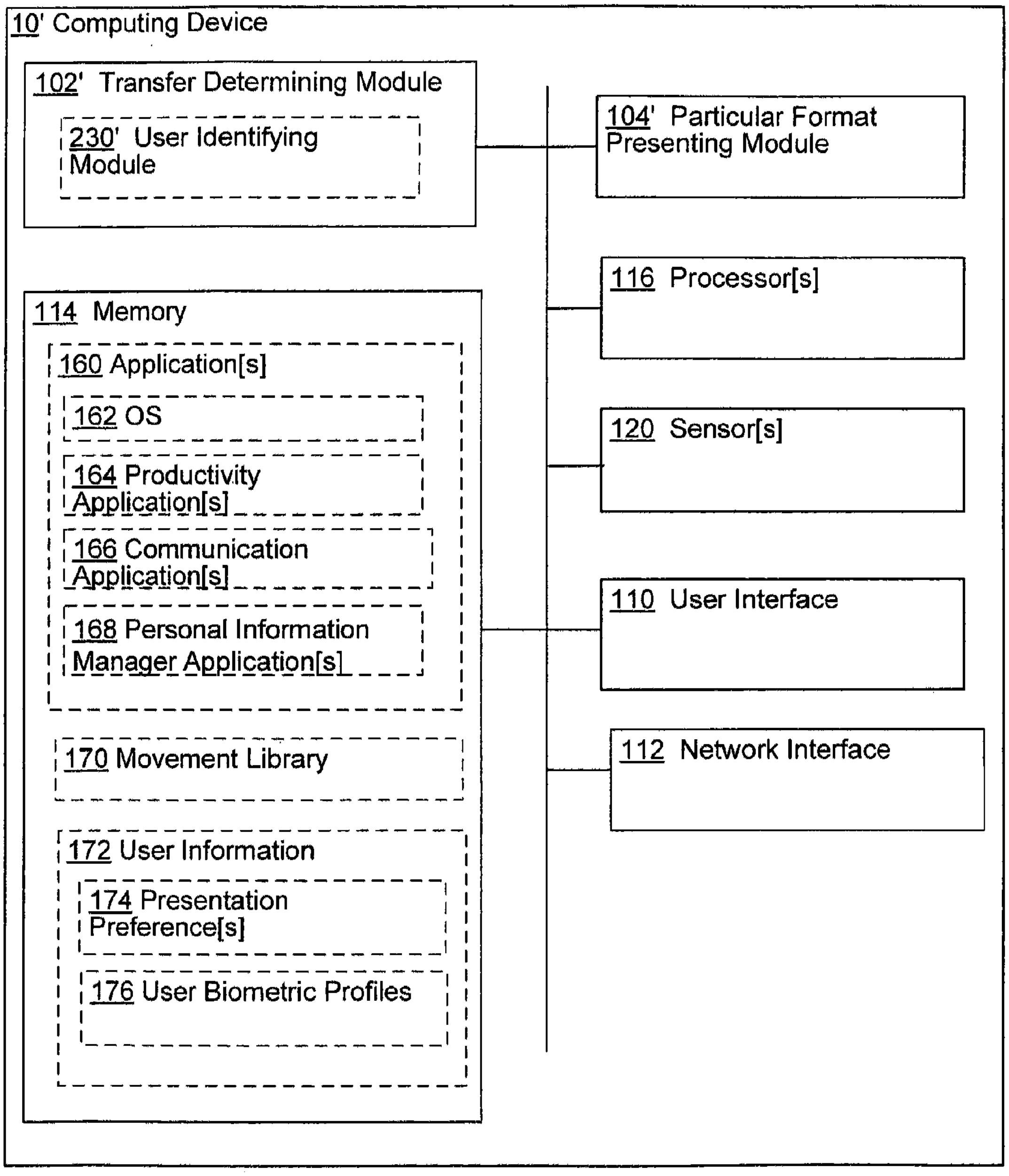
Figure 3B:
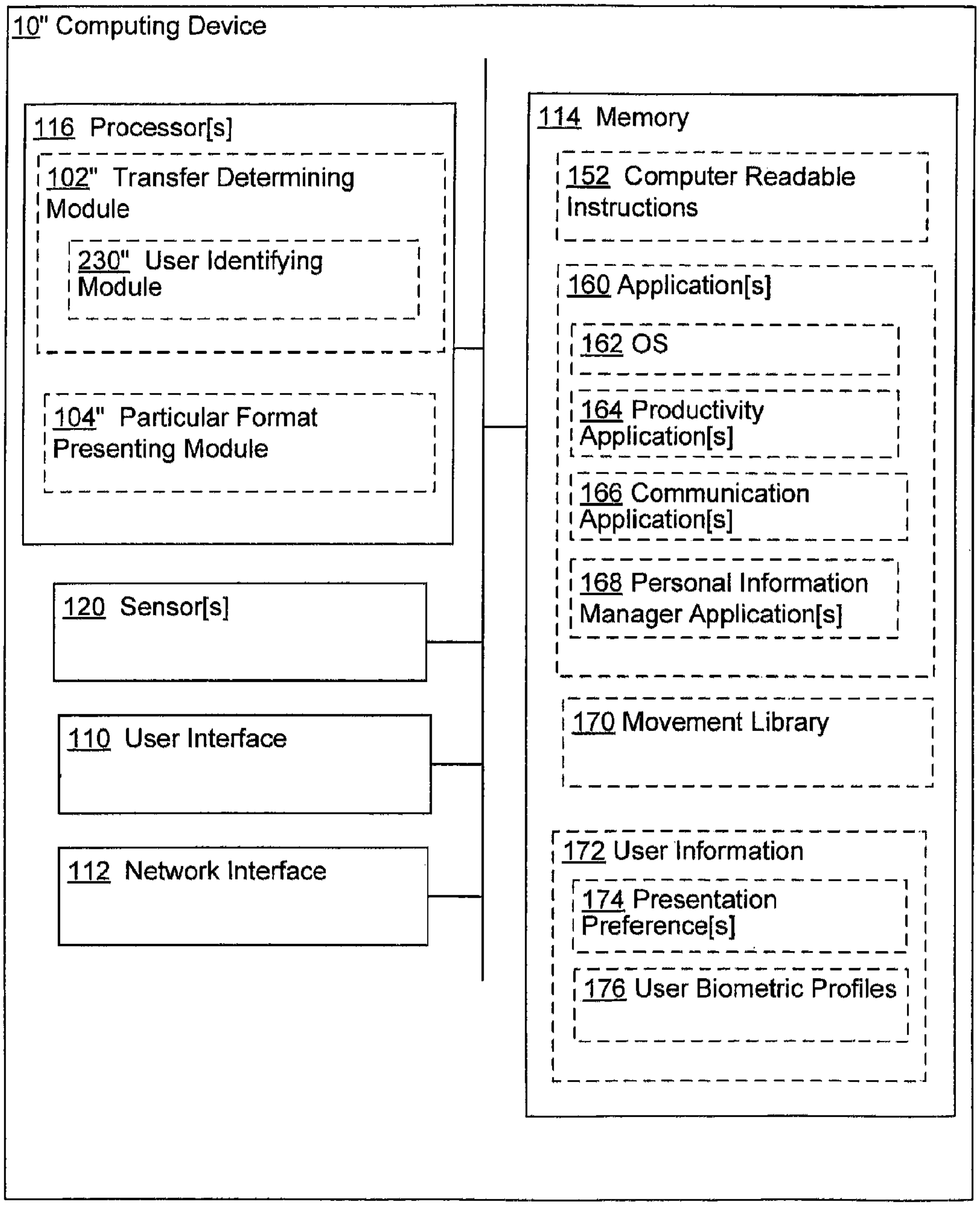

FIG. 3*b* shows another implementation of the computing device 10* of FIG. 1 illustrated as computing device 10".

Figure 3C:
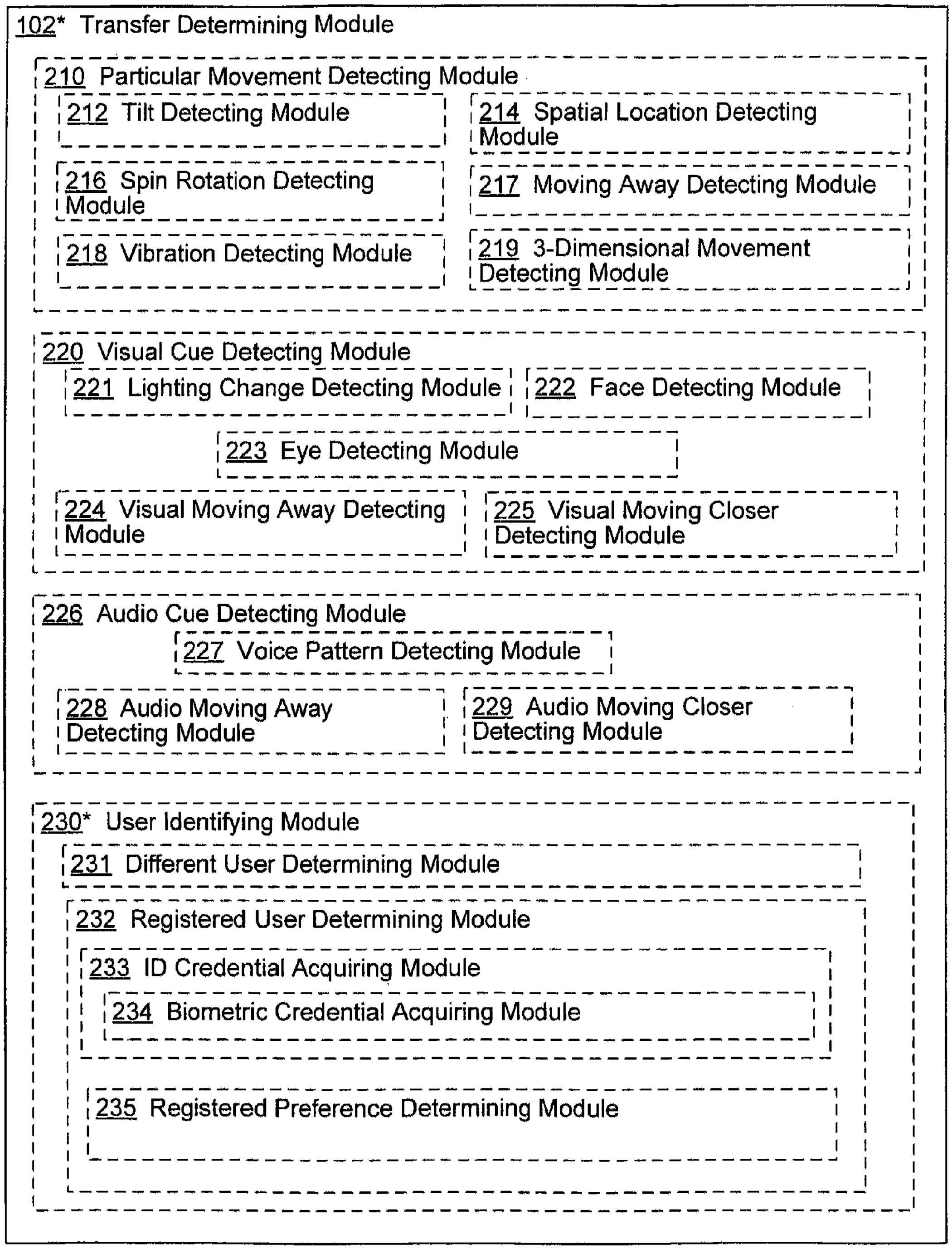

FIG. 3*c* shows another perspective of the transfer determining module 102* of FIGS. 3*a* and 3*b*.

Figure 3D:
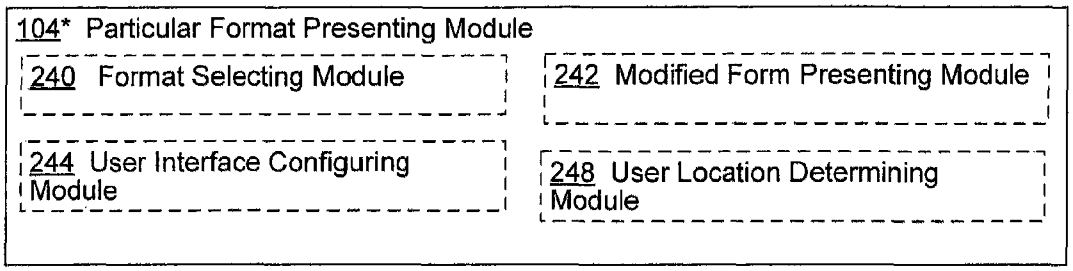

FIG. 3*d* shows another perspective of the particular format presenting module 104* of FIGS. 3*a* and 3*b*.

Figure 3E:
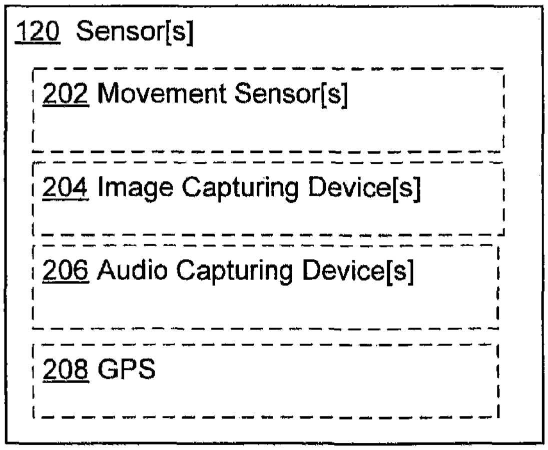

FIG. 3*e* shows various types of sensors 120 that may be included in the computing device 10* of FIGS. 3*a* and 3*b*.

Figure 4:
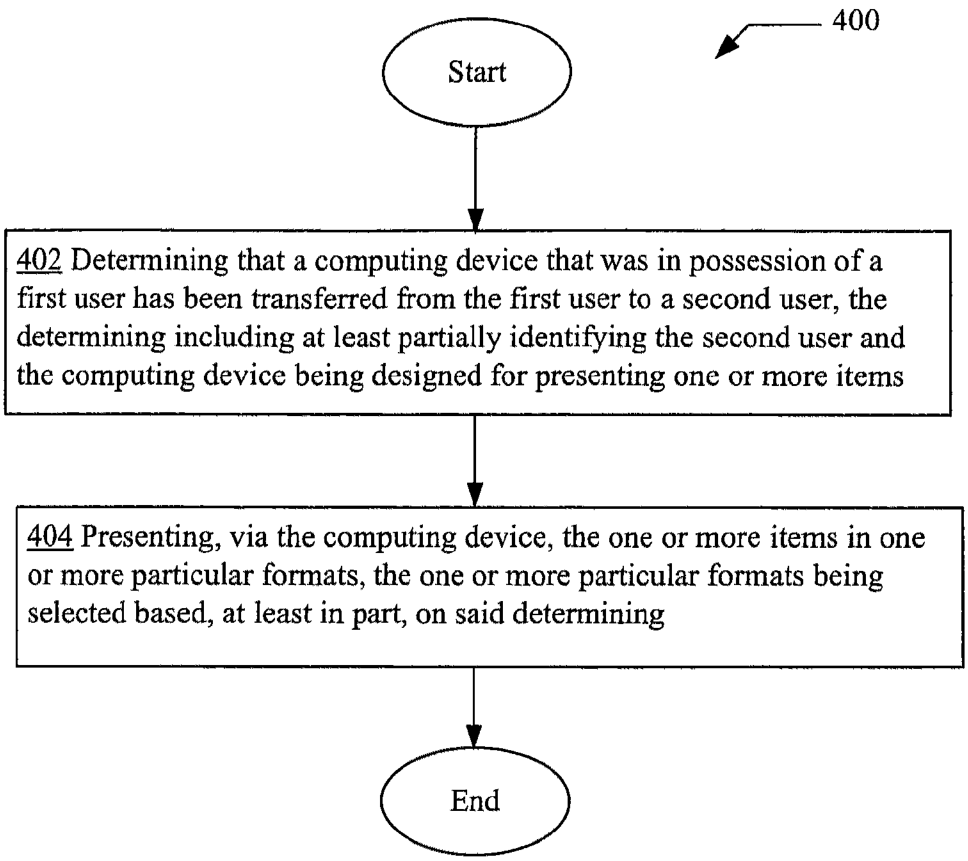

FIG. 4 is a high-level logic flowchart of a process.

Figure 5A:
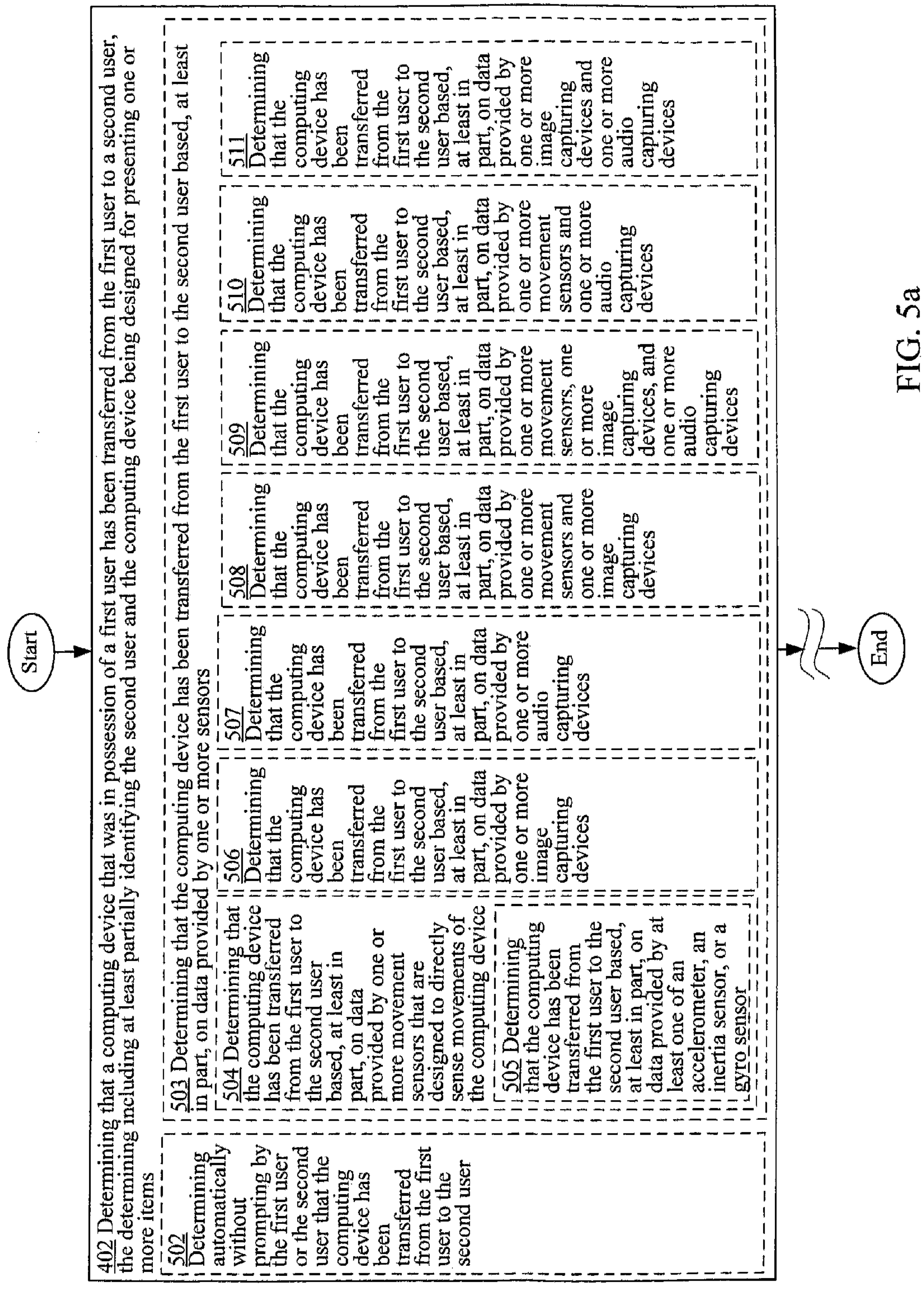

FIG. 5*a* is a high-level logic flowchart of a process depicting alternate implementations of the transfer determining operation 402 of FIG. 4.

Figure 5B:
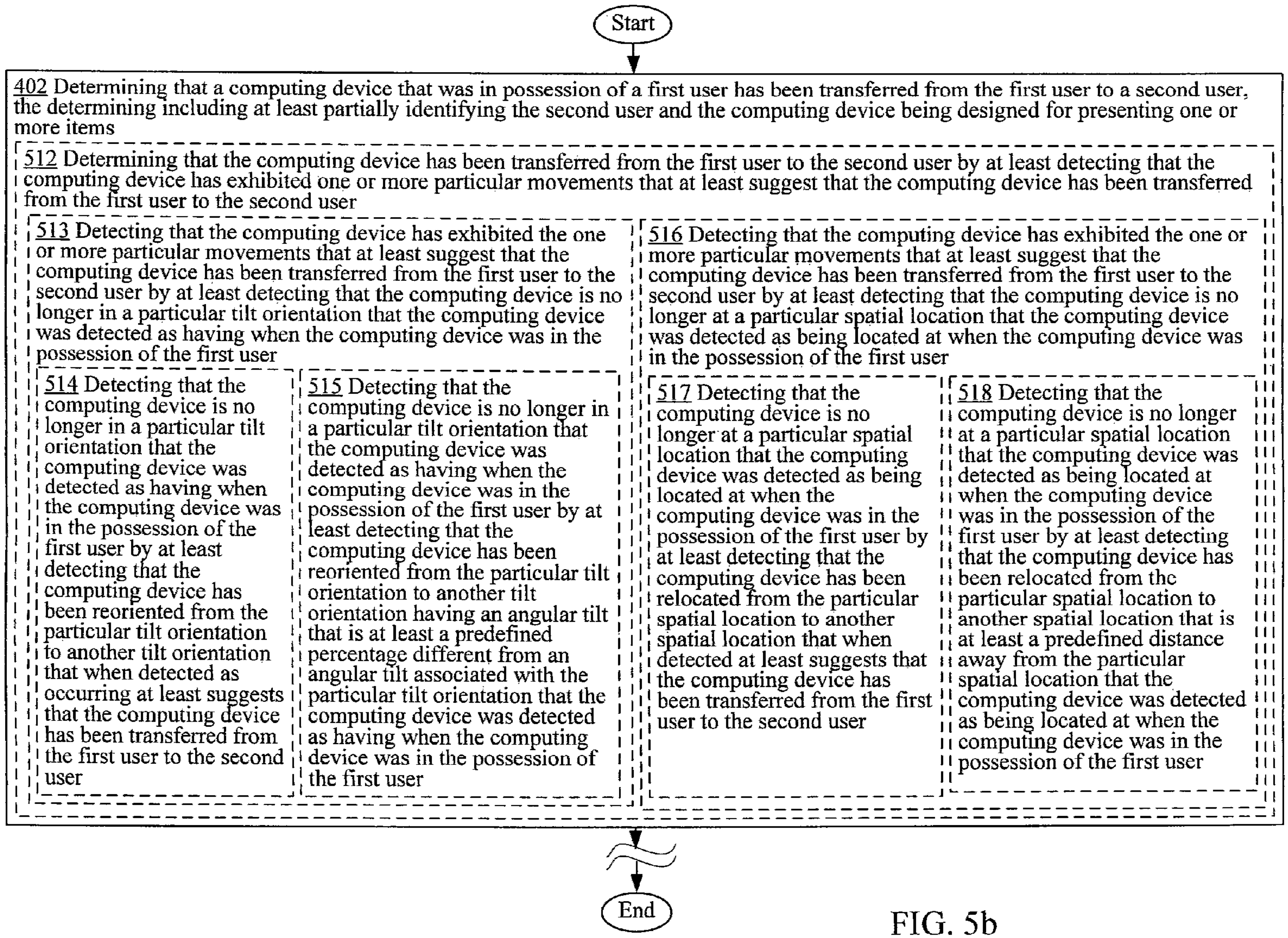

FIG. 5*b* is a high-level logic flowchart of a process depicting alternate implementations of the transfer determining operation 402 of FIG. 4.

Figure 5C:
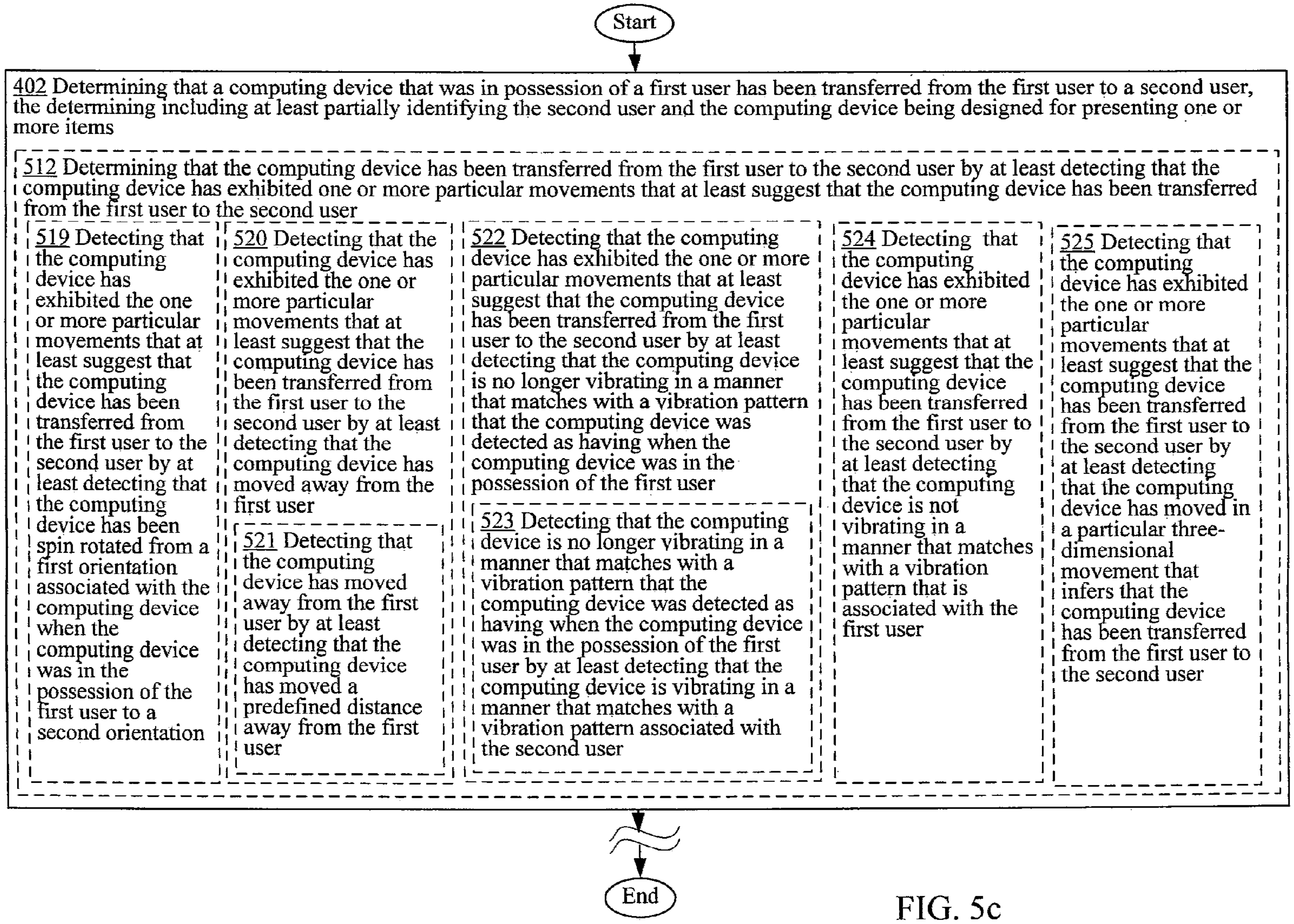

FIG. 5*c* is a high-level logic flowchart of a process depicting alternate implementations of the transfer determining operation 402 of FIG. 4.

Figure 5D:
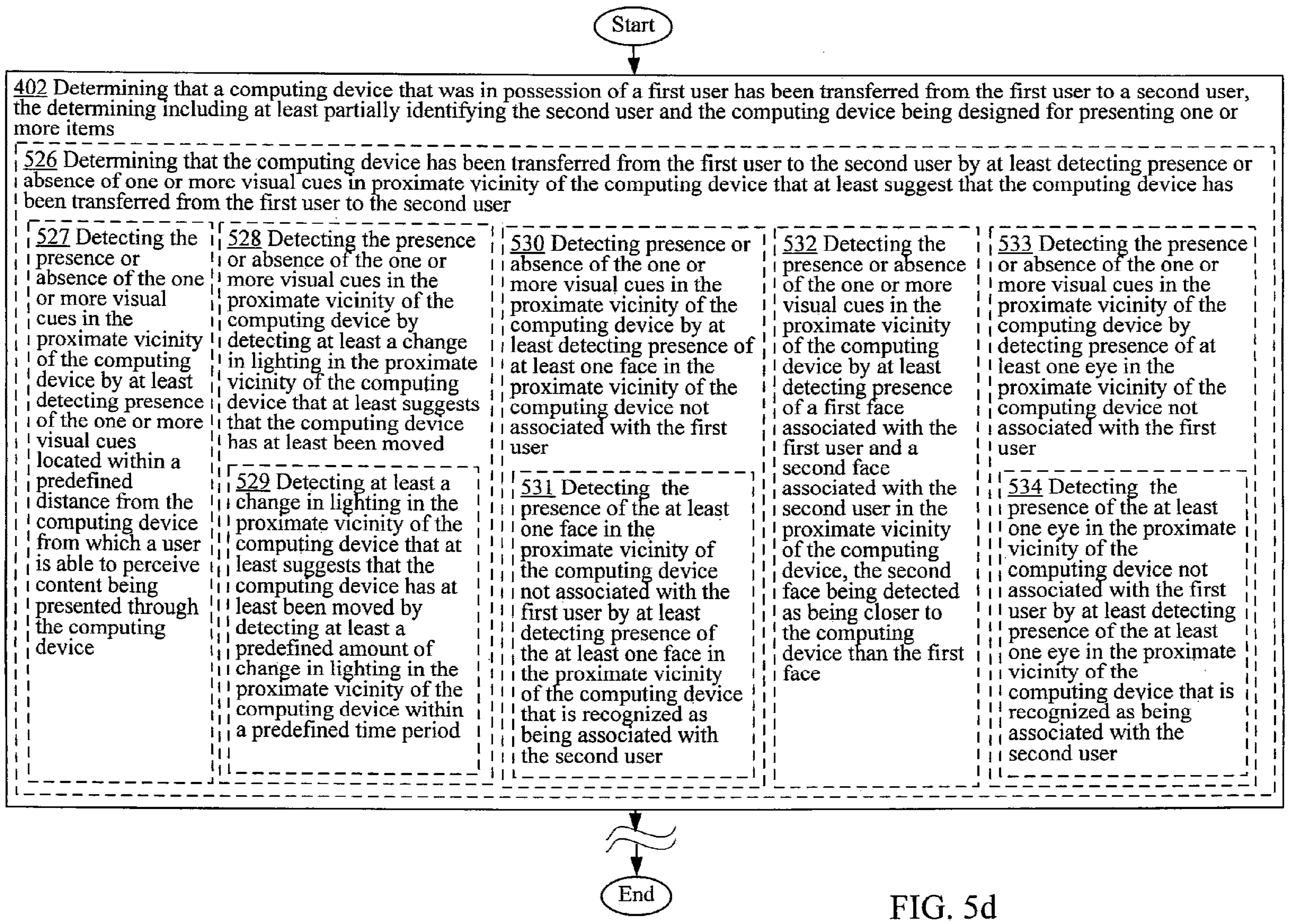

FIG. 5*d* is a high-level logic flowchart of a process depicting alternate implementations of the transfer determining operation 402 of FIG. 4.

Figure 5E:
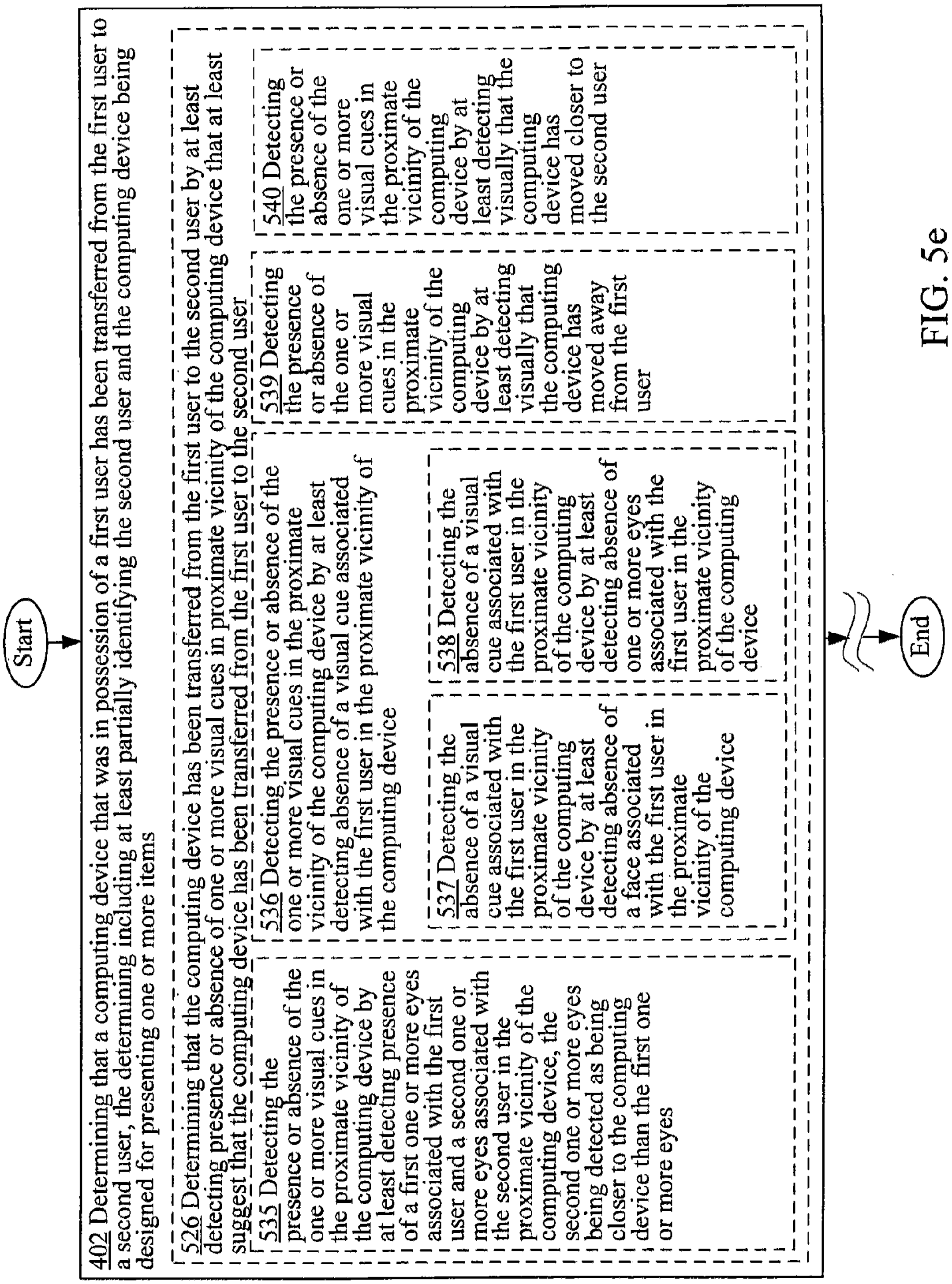

FIG. 5*e* is a high-level logic flowchart of a process depicting alternate implementations of the transfer determining operation 402 of FIG. 4.

Figure 5F:
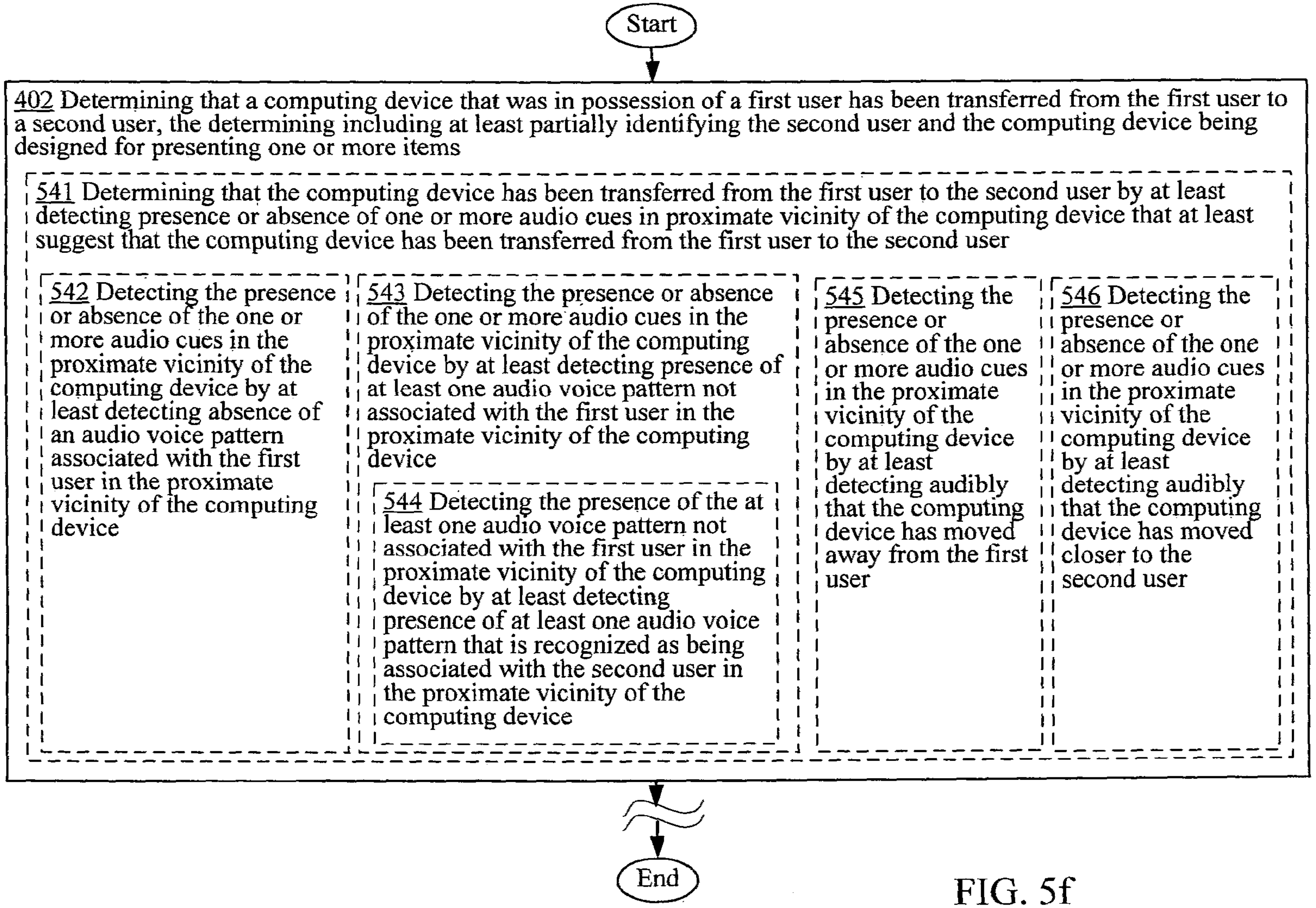

FIG. 5*f* is a high-level logic flowchart of a process depicting alternate implementations of the transfer determining operation 402 of FIG. 4.

Figure 5G:
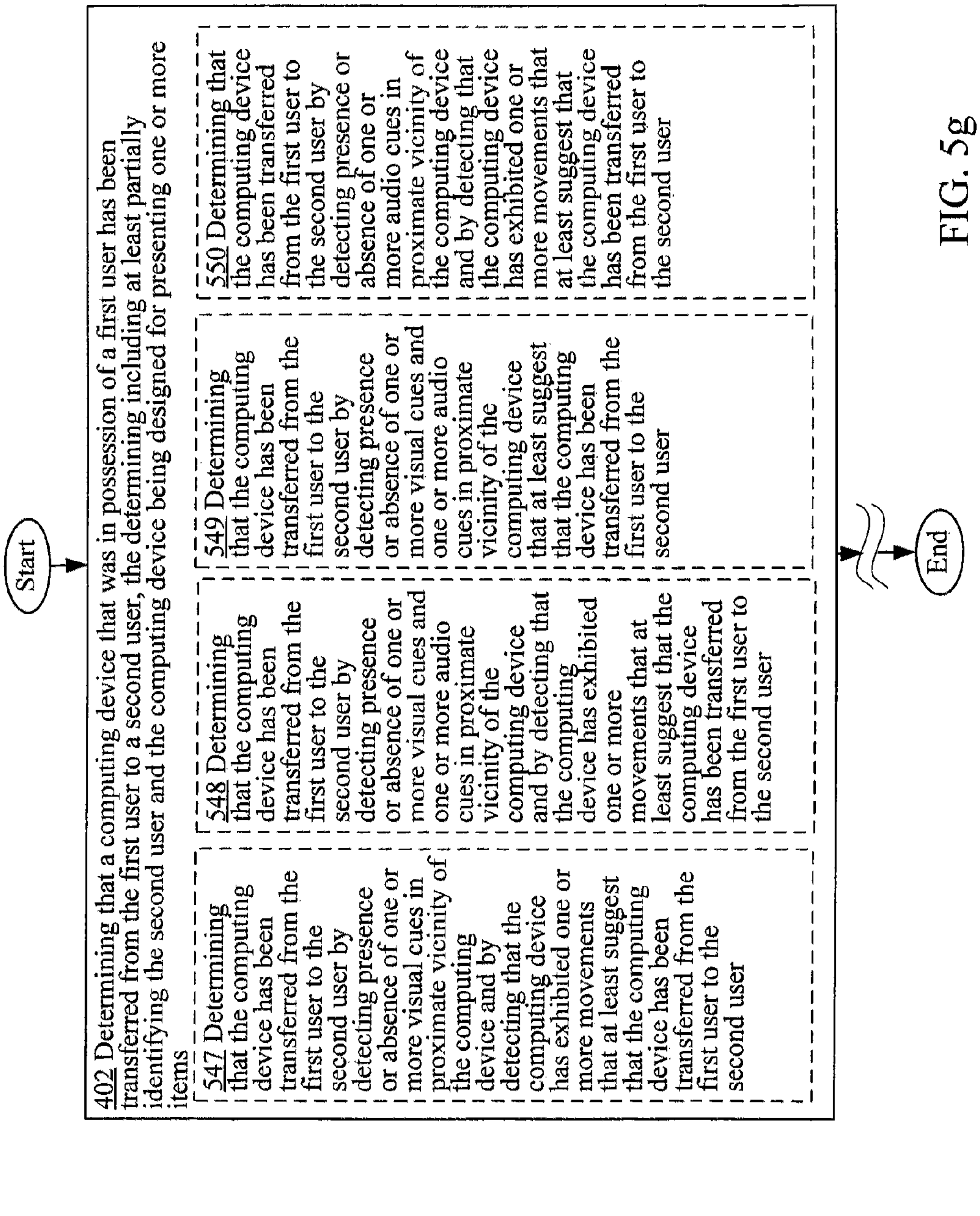

FIG. 5*g* is a high-level logic flowchart of a process depicting alternate implementations of the transfer determining operation 402 of FIG. 4.

Figure 5H:
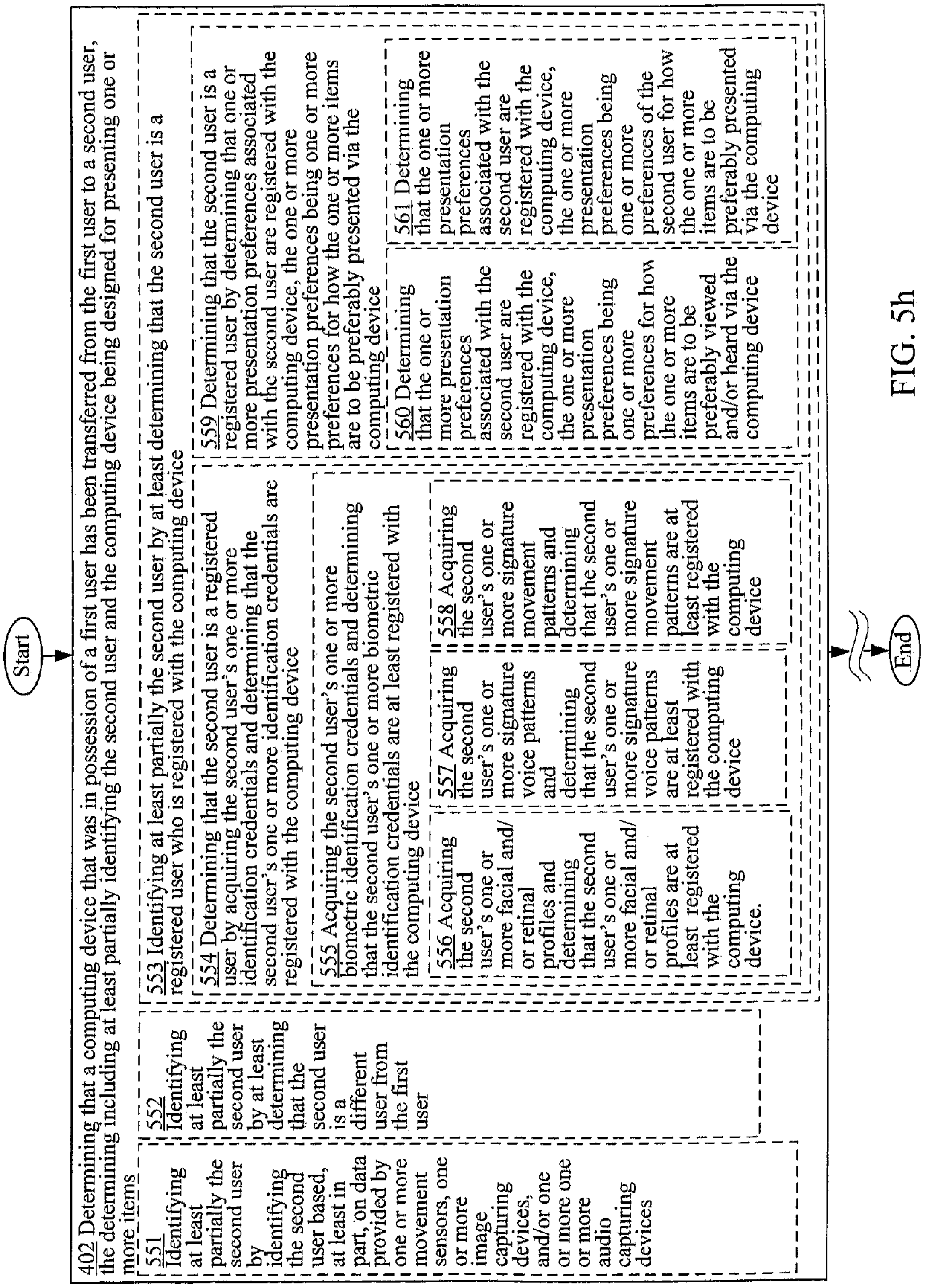

FIG. 5*h* is a high-level logic flowchart of a process depicting alternate implementations of the transfer determining operation 402 of FIG. 4.

Figure 6A:
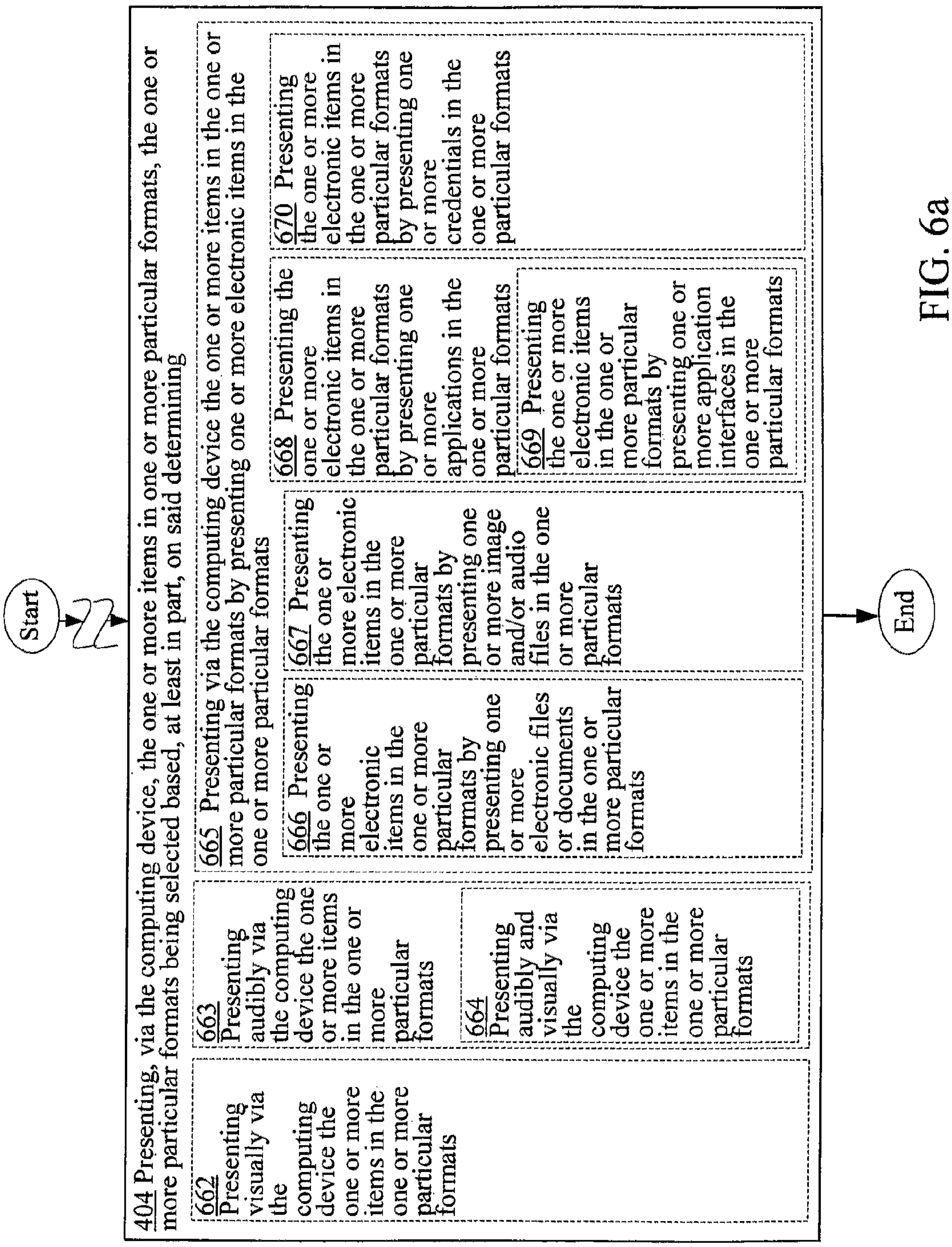

FIG. 6*a* is a high-level logic flowchart of a process depicting alternate implementations of the particular format presenting operation 404 of FIG. 4.

Figure 6B:
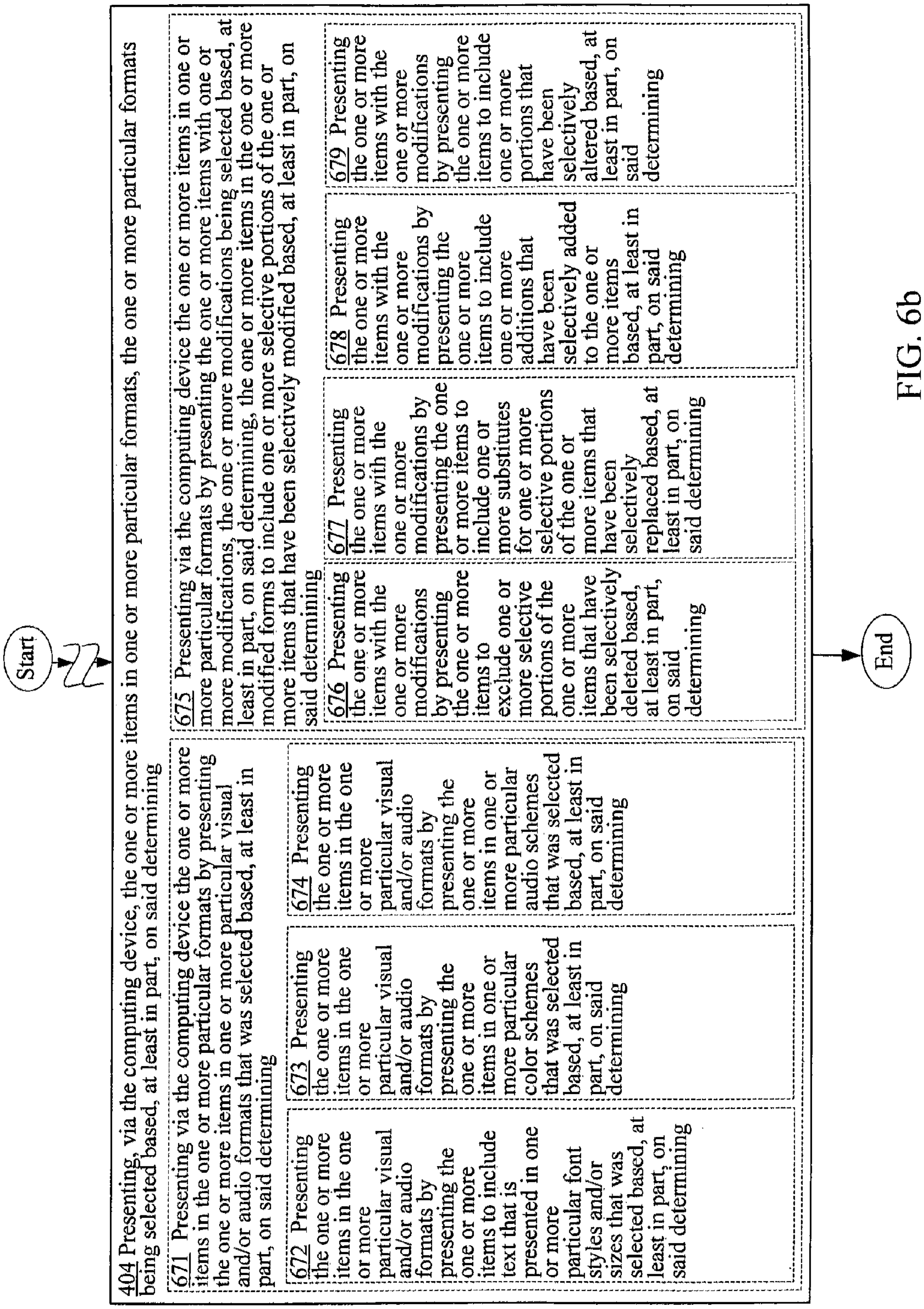

FIG. 6*b* is a high-level logic flowchart of a process depicting alternate implementations of the particular format presenting operation 404 of FIG. 4.

Figure 6C:
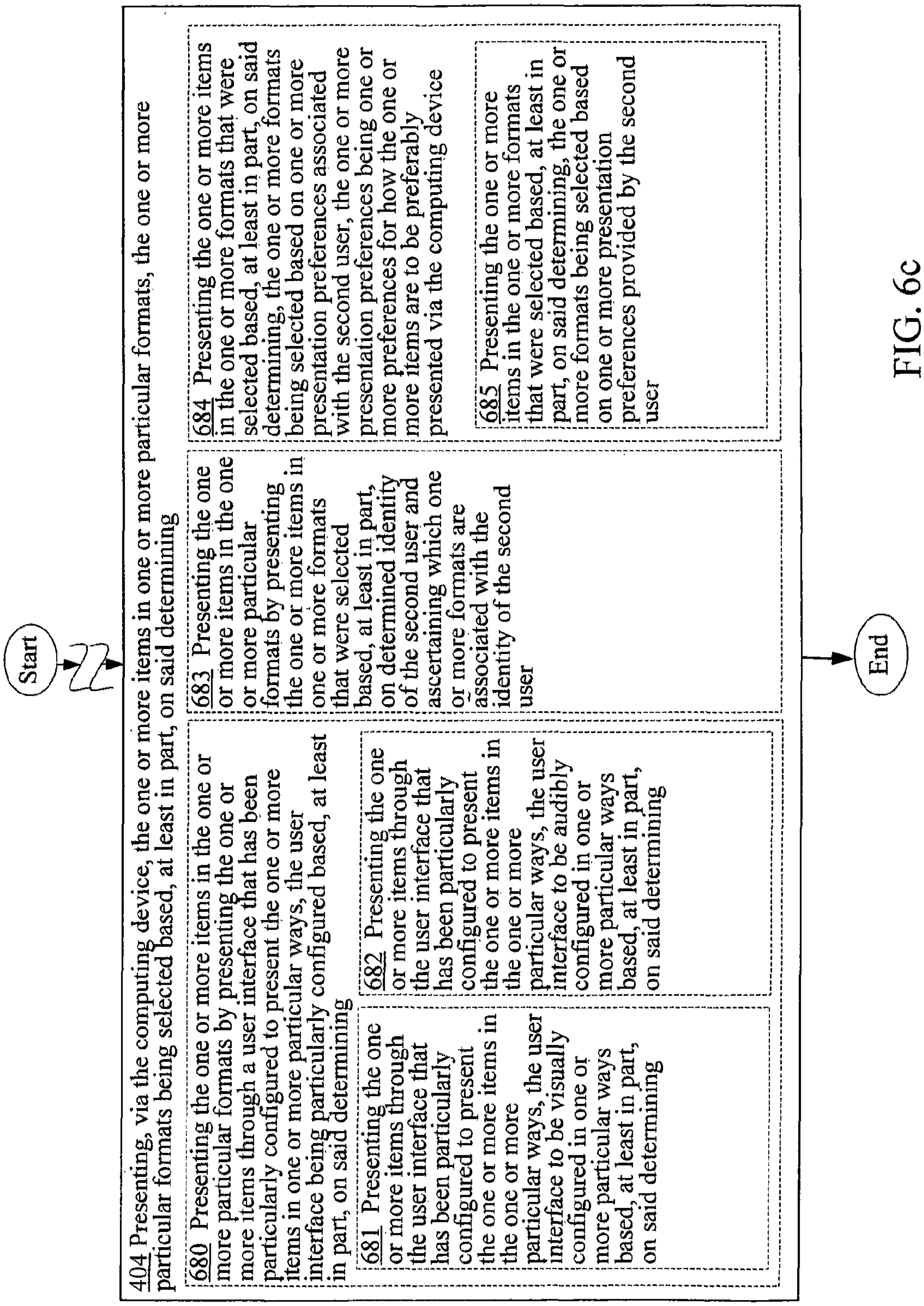

FIG. 6*c* is a high-level logic flowchart of a process depicting alternate implementations of the particular format presenting operation 404 of FIG. 4.

Figure 6D:
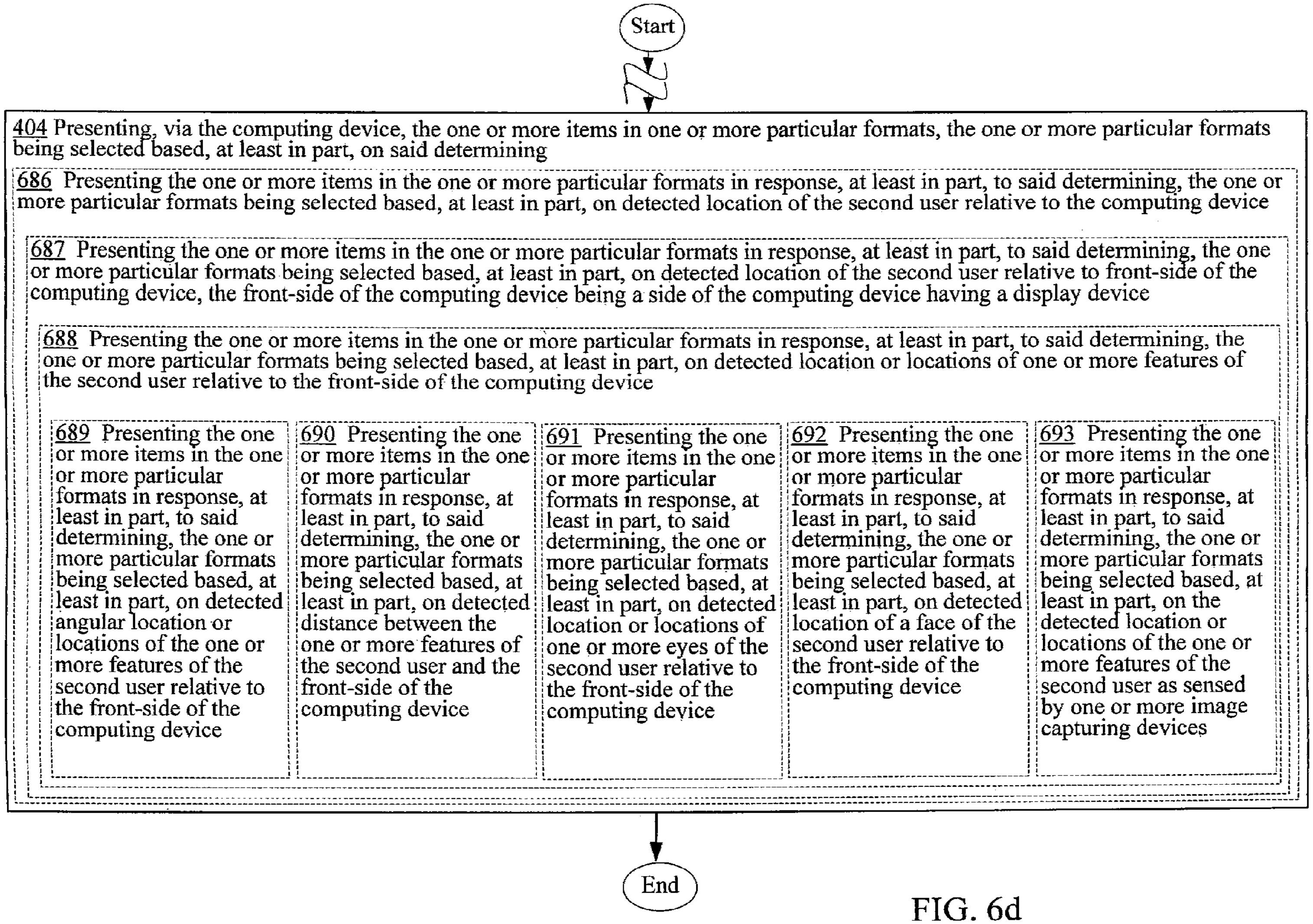

FIG. 6*d* is a high-level logic flowchart of a process depicting alternate implementations of the particular format presenting operation 404 of FIG. 4.

Figure 7A:
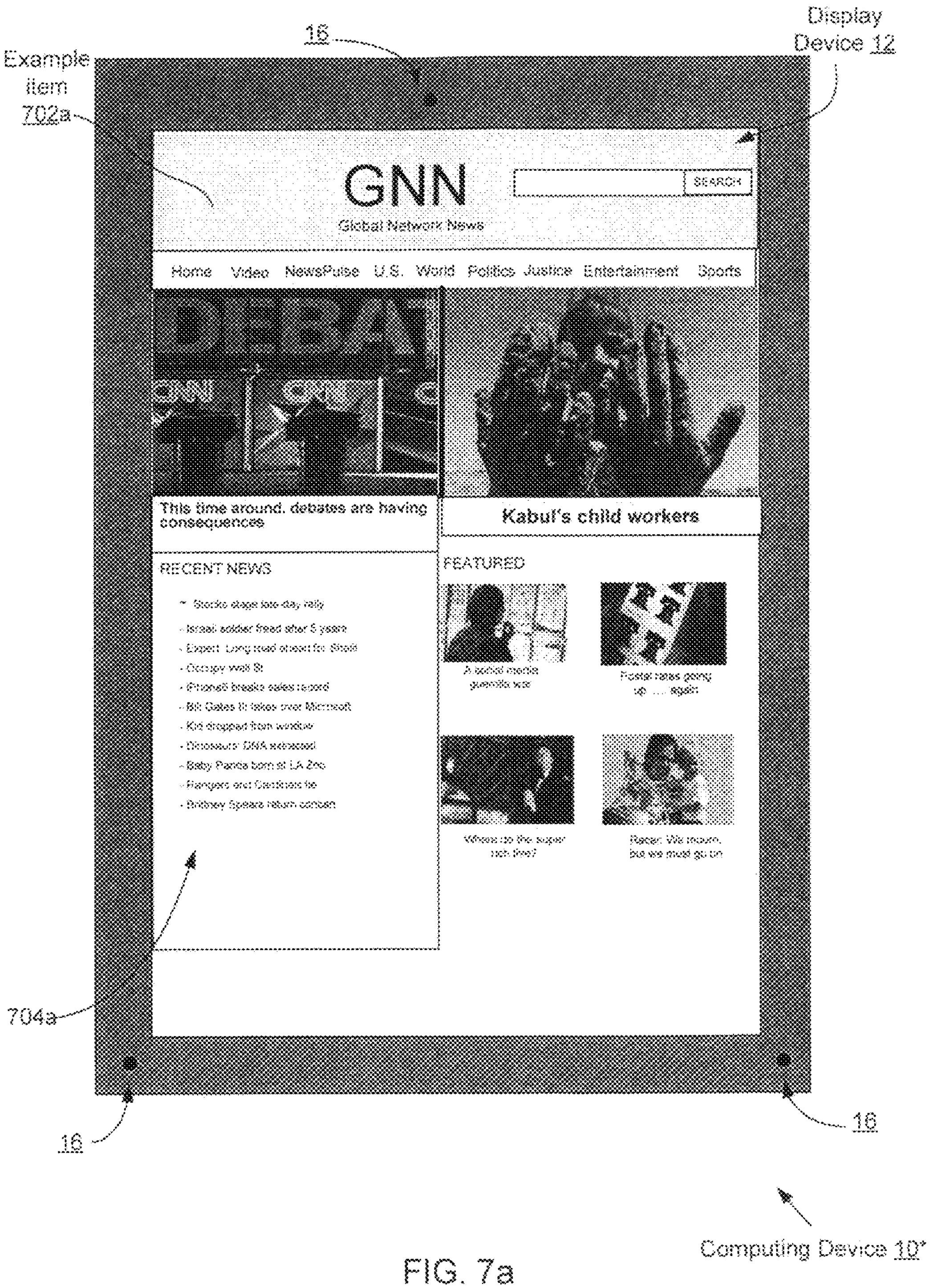

FIG. 7*a* illustrates an example item 702*a* being displayed by the computing device 10* of FIG. 1.

Figure 7B:
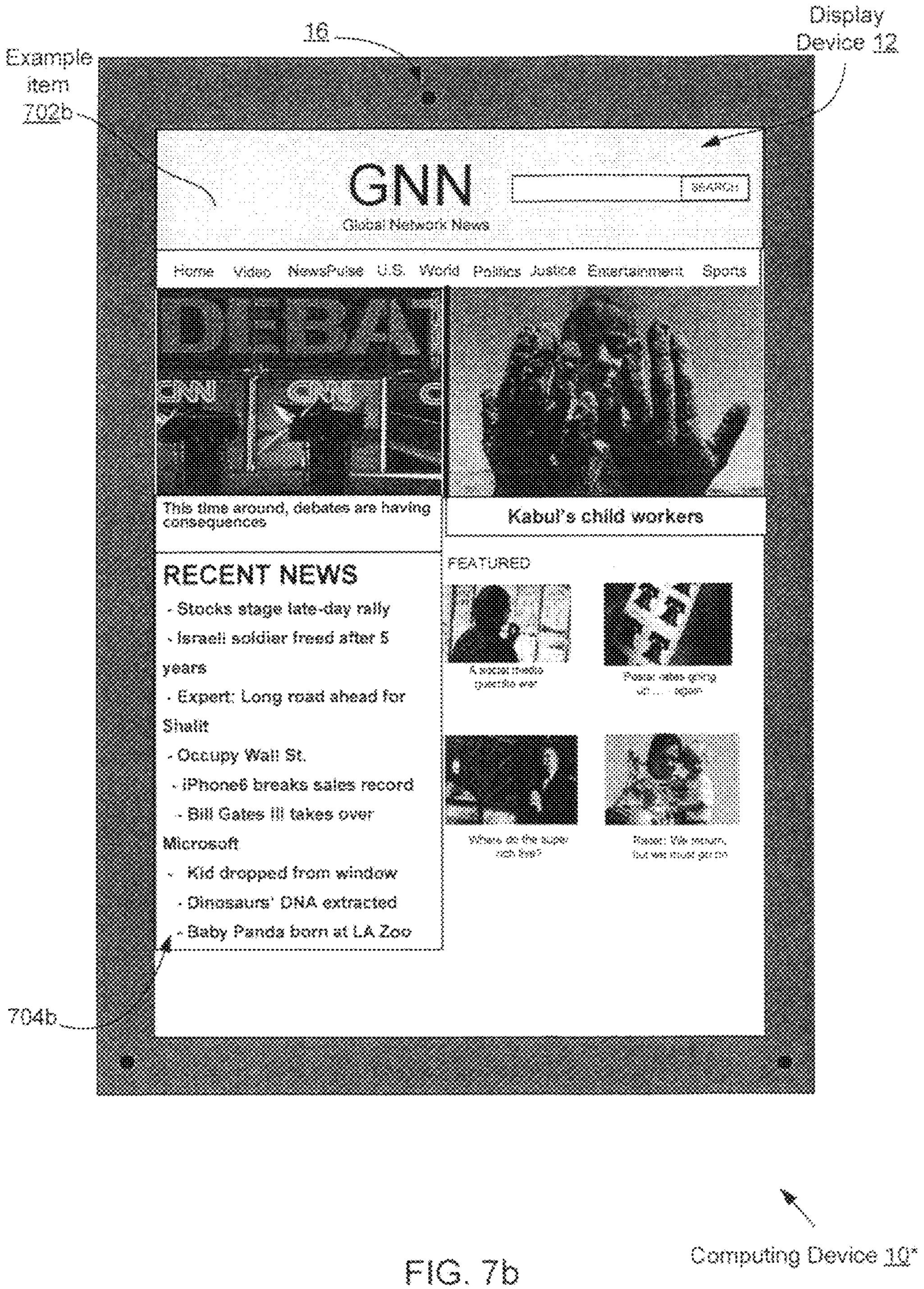

FIG. 7*b* illustrates an example item 702*b* being displayed by the computing device 10* of FIG. 1.

Figure 7C:
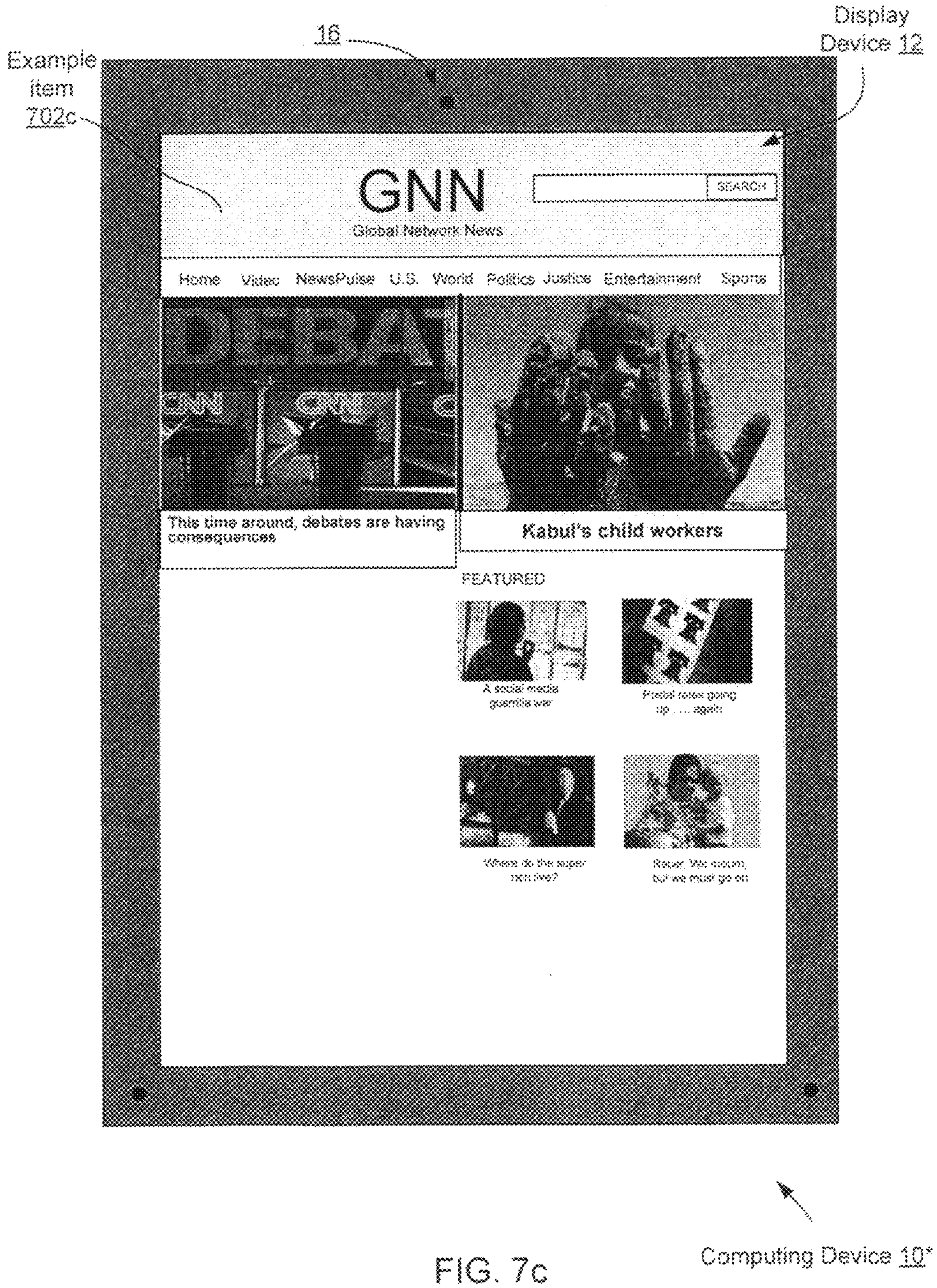

FIG. 7*c* illustrates an example item 702*c* being displayed by the computing device 10* of FIG. 1.

Figure 7D:
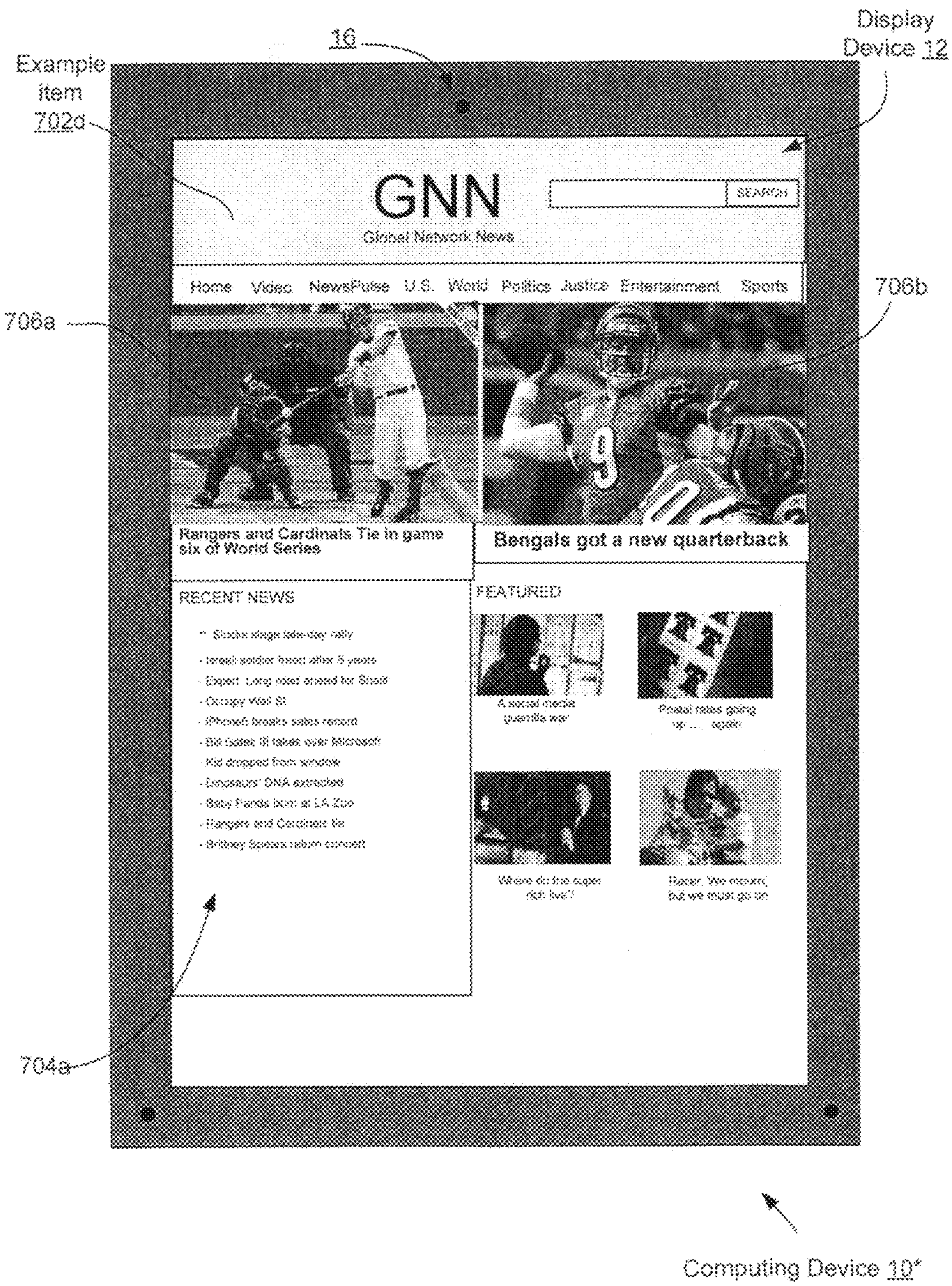

FIG. 7*d* illustrates an example item 702*d* being displayed by the computing device 10* of FIG. 1.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Advances in computing technologies and related technologies (e.g., visual display technology, battery technology, etc.) in recent years have greatly facilitated in the development of computing devices having increasingly smaller form factors while still maintaining exceptional processing capabilities. Examples of such mobile computing devices include, for example, laptops, Netbooks, tablet computers (i.e., "slate" computers), e-readers, Smartphones, personal digital assistants (PDAs), and so forth. Because of their compactness, such mobile computing devices (herein "computing devices") are becoming much easier to share among a plurality of users. That is, due to their small form factors, such devices allow users of such devices to physically share such devices with friends, family, co-workers, clients, and so forth.

These portable computing devices, similar to their larger brethrens, are able to visually and/or audibly present a wide variety of applications and content (herein "items") in a wide range of formats depending on, for example, the needs of the users and the types of items to be presented. There are a number of ways to format items (e.g., applications such as gaming, productivity, or communication applications, audio or image files, textual documents, web pages, communication messages, and so forth) that may be visually and/or audibly presented through such devices One way to format such items is to directly format the items themselves. For example, items such as textual documents including word processing documents or email messages may be formatted to be presented in a wide variety of font styles and font sizes depending on, for example, the particular needs of users (e.g. elderly users with poor vision and/or hearing, or have unsteady fingers and have difficulty using, for example, a touchscreen). Another way to format such items is to configure a user interface (e.g., a display monitor and/or speakers) that is used to visually and/or audibly present the items (e.g., applications and content) in a particular way so that items that are presented through the user interface are presented in appropriate forms. For example, a display monitor may be configured in a particular way so that one or more items (e.g., video files) that are to be displayed through the display monitor may be displayed through a screen having certain brightness and color background that may be, for example, desired by the end user.

In accordance with various embodiments, computationally implemented methods, systems, and articles of manufacture are provided that can automatically determine whether a computing device that is designed for presenting one or more electronic items and that is in the possession of a first user has been transferred from the first user to a second user, the determination including at least partially identifying the second user; and presenting through the computing device the one or more electronic items in one or more particular formats, the one or more particular formats being selected based, at least in part, on the determination that the computing device was transferred from the first user to the second user. In various embodiments, such computationally implemented methods, systems, and articles of manufacture may be implemented at the computing device.

Referring now to FIG. 1 illustrating a computing device 10* in an exemplary environment 100 being transferred between two users. As will be further described herein the illustrated computing device 10* may employ the computationally implemented methods, systems, and articles of manufacture in accordance with various embodiments. The computing device 10*, in various embodiments, may be endowed with logic that is designed to determine that the computing device 10* has been or is being transferred (e.g., handed or passed-off) from a first user 20 to a second user 30, the determination including at least partially identifying the second user 30, and to present one or more items (e.g., electronic items such as applications, application interfaces, electronic documents, image or audio files, passwords, and so forth) in one or more particular formats, the one or more particular formats being selected based, at least in part, on the determination. Note that FIGS. 3*a* and 3*b* illustrate two different implementations of the computing device 10* of FIG. 1 illustrated in FIG. 3*a* as computing device 10' and in FIG. 3*b* as computing device 10". Note further that for purposes of the following, "*" represents a wildcard. Thus, references in the following to the "computing device 10*" may be in reference to the computing device 10' of FIG. 3*a* or the computing device 10" of FIG. 3*b*.

Although the computing device 10* illustrated in FIG. 1 is depicted as being a tablet computer, in alternative embodiments, the computationally implemented methods, systems, and articles of manufacture in accordance with various embodiments may be embodied in other types of computer systems having other form factors including other types of portable computer devices such as, for example, laptops, Netbooks, Smartphones, e-readers, and so forth. As illustrated, the computing device 10* includes a display device 12, such as a touchscreen, on the front-side 17*a* of the computing device 10*. As further depicted in FIG. 1, the display device 12 displaying an exemplary document 14 and a tool bar 15. As further depicted, on the front-side 17*a* of the computing device 10* are three camera eyes or lens 16 for three image capturing devices 204 (see FIG. 3*e*)—an image capturing device 204 may be any one of a variety of camera devices including a webcam, a digital camera, an infrared camera, and so forth. In alternative embodiments, fewer or greater number of image capturing devices 204 may be included with the computing device 10*. In some embodiments, one or more additional cameras may be included on the back-side 17*b* (see, for example, FIGS. 3*a*-3*d*) of the computing device 10*—the back-side 17*b* of the computing device 10* being the opposite side of the computing device 10* from the fronts. Although not depicted in FIG. 1, in some cases, a microphone may also be disposed on the front-side 17*a* of the computing device 10*.

There are a number of ways to determine whether a computing device 10* is or has been transferred from one user to another. In some cases, for instance, various sensor-provided data may be collected in order to make such a determination. Such data may indicate various environmental aspects surrounding the computing device 10* and/or aspects of the computing device itself (e.g., movements). For example, when the computing device 10* of FIG. 1 is passed from, for example, the first user 20 (e.g., a primary user or owner) to a second user 30, the first user 20 may exhibit certain gestures that may at least infer that the computing device 10* is being transferred from the first user 20 to another user (e.g., second user 30). Such gestures may include, for example, the first user 20 extending his/her arms out with the computing device 10* in one or both hands (e.g., as if to offer the computing device 10* to the second user 30); the first user 20 passing the computing device 10* from one hand to another hand, and extending the second hand with the computing device 10* out and away from the first user 20; the first user 20 rotating the computing device 10* around using his/her hands so that the front side 17*a* of the computing device 10* faces away from the first user 20 and faces the second user 30, who is standing or sitting across from the first user 20, and so forth. These movements or gestures made by the first user 20, when detected, may infer that the transfer (e.g., change in possession) of the computing device 10* from a first user 20 to a second user 30 has occurred.

One way to track the movements or gestures of the first user 20 is to track the movements of the computing device 10*. That is, these gestures that may be exhibited by the first user 20 during the transfer of a computing device 10* from the first user 20 to the second user 30 may cause the computing device 10* to be spatially moved in a particular way. Thus, in order to detect whether a computing device 10* is being transferred from a first user 20 to a second user 30, one may observe the spatial movements of the computing device 10* in order to detect spatial movements that when detected at least infer the transfer of the computing device 10* between the first user 20 and the second user 30. For example, the computing device 10* may maintain in its memory 114 (see FIGS. 3*a* and 3*b*) a movement library 170 (see FIGS. 3*a* and 3*b*), which is a catalog or library that identifies those spatial movements that when detected as occurring at least infers (e.g., implies) that a transfer of the computing device 10* has occurred between two users (e.g., first user 20 and second user 30).

One way to monitor for such movements of the computing device 10* is to directly detect such movements using one or more "movement" sensors that are designed to directly detect/measure movements. Examples of such movement sensors include, for example, inertia sensors, accelerometers (e.g. three-axis or 3D accelerometers), gyroscopes, and so forth. These sensors (herein "movement" sensors 202—see FIG. 3*e* which illustrates the one or more types of sensors 120 that may be included in the computing device 10 of FIG. 1) when integrated with a computing device 10* may be used to directly detect the actual movements/motions of the computing device 10 as the computing device 10* is being transferred from, for example, a first user 20 to a second user 30.

Since not all movements of the computing device 10* that may be detected will be as a result of the computing device 10* being transferred between two users, in various embodiments and as will be further described herein, the computing device 10* may be endowed with particular logic for determining (e.g., identifying) which movements associated with the computing device 10* that have been detected indicates or at least suggests that the computing device 10* is or has been transferred from, for example, a first user 20 to a second user 30 and which detected movements may merely be "noise movements."

Various types of movements of the computing device 10* may be tracked in order to determine or at least infer that the computing device 10* is being transferred between, for example, a first user 20 and a second user 30. Examples of the type of movements that may be tracked include, for example, tilt type movements, spin-rotation type movements, spatial relocation type movements, vibration movements, and so forth of the computing device 10. In order to determine or at least infer that the computing device 10* has been transferred from the first user 20 to the second user 30, one or more of these movements of the computing device 10* may be, individually or in combination, tracked using one or more sensors 120 that may be included with the computing device 10* as illustrated in FIG. 3*e*. For example, in various embodiments, one or more movement sensors 202 (e.g., inertia devices, accelerometers, etc.) that can directly detect movements, and/or other types of sensors (e.g., image capturing devices 204, audio capturing devices 206, etc.) that may be able to indirectly detect movements may be employed in order to track the movements of the computing device 10* as will be further described herein.

Figure 2A:
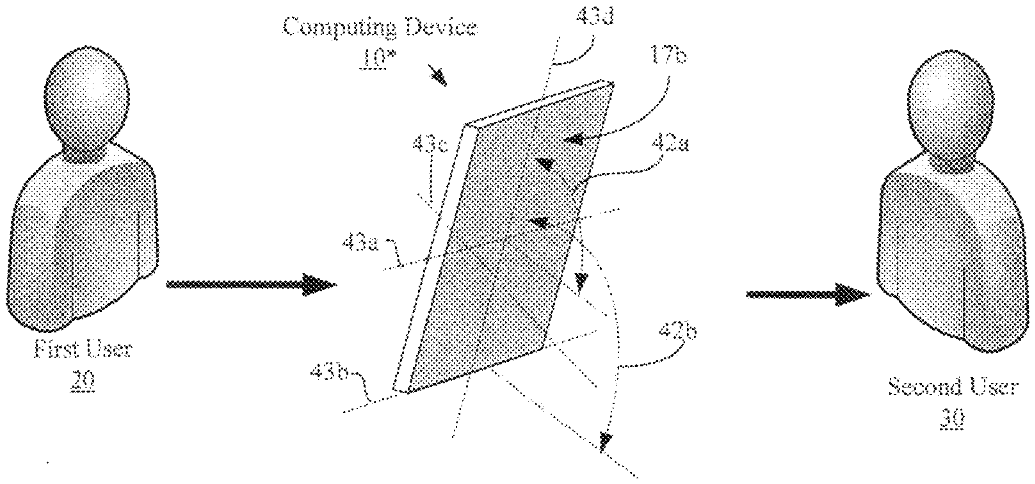

Referring now to FIG. 2*a* illustrating various types of tilts and tilt movements of the computing device 10* that may be detected and monitored using one or more sensors 120 (e.g., one or more movement sensors 202) in order to, for example, determine or infer that the computing device 10* has been transferred from a first user 20 to a second user 30. That is, FIG. 2*a* shows the back-side 17*b* of the computing device 10* and some of the tilt-type movements that may be monitored by the computing device 10*(or the logic endowed with the computing device 10*) in order to, for example, determine whether the computing device 10* has been transferred from a first user 20 to a second user 30. One type of tilt movement that may be detected/monitored is tilt 42*a* of the computing device 10* that may occur when the computing device 10* is at least partially rotated around a central horizontal axis 43*a*. A second type of tilt that may be detected is tilt 42*b*, which may occur when the computing device 10* is at least partially rotated around a bottom horizontal axis 43*b*. Although not depicted, yet another type of tilt that may occur and that may be monitored is when the computing device 10* is at least partially rotated around an angular axis 43*c* that is angular with respect to a horizontal axis (e.g., axis 43*a* or 43*b*) and is parallel to the plane of the backside 17*b* similar to axis 43*a* and axis 43*b*. Still another type of tilt that may occur and that may also be monitored is when the computing device 10* is at least partially rotated around a vertical axis 43*d*. Note that although the vertical axis 43*d* is depicted as being centered along the backside 17*b* of the computing device 10*, just like the horizontal axis 43*b*, the vertical axis 43*d* does not have to be centered on the backside 17*b* and instead, may be offset from the center of the backside 17*b* of the computing device 10*(e.g., may be closer to one end of the device rather than an opposite end of the device.

By detecting that the computing device 10* has been tilted in a particular manner from a first tilt orientation to a second tilt orientation, a determination or at least an inference may be made that the computing device 10* has been transferred from the first user 20 to the second user 30. In particular, when the first user 20 is handing-off or transferring the computing device 10* to the second user 30, the first user 20 may tilt the computing device 10* in a particular way that may be identifiable. Thus, when the computing device 10* is being transferred from a first user 20 to a second user 30, the computing device 10*(or rather the logic endowed with the computing device 10*) may track the movements of the computing device 10* as it moves from a first tilt orientation (e.g., the tilt of the computing device 10* at the beginning of the transfer or when the first user 20 was using the computing device 10*) to a second tilt orientation (e.g., the tilt of the computing device 10* at the end of the transfer or when the second user 30, for example, has obtained possession of the computing device 10*).

In order to make a determination or inference that a transfer was made from the first user 20 to the second user 30, the computing device 10* or at least the logic endowed in the computing device 10* may examine the particular movements of the computing device 10*(e.g., how the computing device 10* was reoriented from a first tilt orientation to a second tilt orientation including speed and cadence of the reorientation) as the computing device 10* moves from the first tilt orientation to a second tilt orientation. The computing device 10* may additionally or alternatively analyze the second tilt orientation (e.g., the tilt of the computing device 10* after it has finished being reoriented) at least with respect to the first tilt orientation in order to determine or infer that the computing device 10* has been transferred. To further determine or at least infer that the computing device 10* has been transferred from the first user 20 to the second user 30, the examination/analysis of the detected tilt movements of the computing device 10* may involve comparing the detected tilt movements of the computing device 10* with catalogued or library tilt movements (which may be stored in the memory 114 of the computing device 10) that are identified as being movements associated with transfer of the computing device 10* between two users.

That is, the computing device 10* may maintain in its memory 114 (see FIGS. 3A and 3B) a movement library 170 that may include a catalogue or library of movements including tilt movements that have been previously identified as tilt movements that may occur when, for example, a computing device 10* is transferred between two users (e.g., first user 20 and second user 30). Thus, when tilt movements that match with catalogued or library tilt movements have been detected, then a determination or inference may be made that a transfer of the computing device 10* between two users has occurred. Note that the above discussed tilt movements relates to the movement of the computing device 10* as it moves from a first tilt orientation to a second tilt orientation.

Thus, another aspect of tilt orientation changes that may be considered in order to determine or infer that a transfer has taken place is to simply look at the end points of the tilt reorientation and their differences. In other words, to analyze the first tilt orientation (e.g., the tilt orientation of the computing device 10* before the computing device 10* being reoriented) and the second tilt orientation (e.g., the end tilt orientation of the computing device 10* after it has been reoriented) with respect to each other, and the differences between the first tilt orientation and the second tilt orientation. Thus, in some embodiments, the computing device 10* may also or additionally maintain a catalogue or library of changes of tilt orientation (e.g., tilt orientation changes) that have been previously identified as tilt changes that occur when, for example, a computing device 10* is transferred between two users. Such catalogue or library of tilt orientation changes may be stored as part of a movement library 170 stored in memory 114 (see FIGS. 3*a* and 3*b*) of the computing device 10* of FIG. 1 (e.g., the computing device 10' of FIG. 3*a* or the computing device 10" of FIG. 3*b*). Therefore, when tilt orientation changes that match with catalogued or library tilt orientation changes (e.g., as stored in the movement library 170 of the memory 114) have been detected, then at least an inference may be made that a transfer of the computing device 10* between two users has occurred.

Figure 2B:
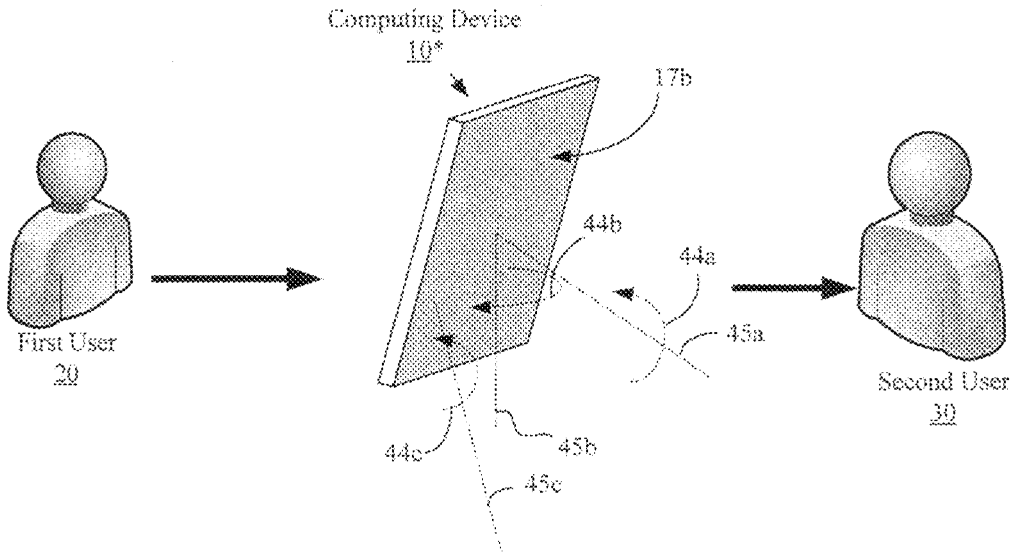

Referring now to FIG. 2*b* illustrating another type of movement of the computing device 10* that may be detected/monitored in order to determine or at least infer that the computing device 10* has been transferred between two users. In particular, FIG. 2*b* shows a couple types of spin-rotation and spin-rotation movements of the computing device 10* that may be detected/monitored using one or more sensors 120 (e.g., one or more movement sensors 202) in order to determine or infer that the transfer of the computing device 10* has occurred. Note that this type of rotation (e.g., spin-rotation) is different from the type of rotation associated with the previously described tilt movement where the "tilt" rotation involves the entire backside 17*b* of the computing device 10* rotating around some axis in a sweeping motion. In a spin-rotation, the backside 17*b* of the computing device 10* substantially spins around an axis without the sweeping motion. Referring back to FIG. 2*b*, which shows some of the various types of spin rotations that may be monitored by the computing device 10* in order to, for example, determine whether the computing device 10* has been transferred from a first user 20, such as a primary user or owner of the computing device 10*, to a second user 30, such as a third party who may have inferior access rights to the computing device 10 than the first user 20. Examples of the type of spin rotations that may be monitored include a spin rotation 44*a* of the computing device 10* that occurs when the computing device

10* is rotated around a center axis 45*a* that is centered and vertical to the backside 17*b* of the computing device 10*. Another type of rotation that may be monitored is a spin rotation 44*b* of the computing device 10* that occurs when the computing device 10* is rotated around a center axis 45*b* that may be centered but not vertical to the backside 17*b* of the computing device 10*. Instead, the center axis 45*b* is angular to the backside 17*b* of the computing device 10* such that when the computing device 10* is rotating around the center axis 45*b*, the computing device 10* will have a constant tilt with respect to the center axis 45*b*. Another type of rotation that may be monitored is spin rotation 44*c* of the computing device 10* that may occur when the computing device 10* is rotated around an axis 45*c* that may not be centered on the backside 17*b* of the computing device and that may not be vertical to the backside 17*b* of the computing device 10*.

By detecting that the computing device 10* has been spin-rotated in a particular manner, a determination or at least an inference may be made that the computing device 10* has been transferred from the first user 20 to the second user 30. In particular, when the first user 20 is handing-off or transferring the computing device 10* to the second user 30, the first user 20 may spin-rotate the computing device 10* in a particular way. Thus, when the computing device 10* is being transferred from a first user 20 to a second user 30, the computing device 10*(or rather the logic endowed with the computing device 10*) may track the movements of the computing device 10* as it moves from a first spin orientation (e.g., the orientation of the computing device 10* at the beginning of the transfer or when the first user 20 was using the computing device 10*) to a second spin orientation (e.g., the orientation of the computing device 10* at the end of the transfer or when the second user 30 has obtained possession of the computing device 10*).

Similar to the tilt or tilt movement detection/analysis described earlier, in order to make a determination or inference that a transfer was made from the first user 20 to the second user 30, the computing device 10* or at least the logic endowed in the computing device 10* may scrutinize the particular movements of the computing device 10* as the computing device 10* spin rotates from a first orientation to a second orientation. The computing device 10* may additionally or alternatively analyze the second orientation (e.g., the orientation of the computing device 10* after it has finished being spin rotated) at least with respect to the first orientation (e.g., the orientation of the computing device 10* before it was spin rotated) in order to determine or at least infer that the computing device 10* has been transferred. To further determine or at least infer that the computing device 10* has been transferred from the first user 20 to the second user 30, the examination/analysis of the detected spin rotation of the computing device 10* from the first orientation to the second orientation may involve comparing the detected spin rotation movement of the computing device 10* with catalogued or library spin rotation movements that are identified as being associated with transfer of the computing device 10*. That is, the computing device 10* may maintain in its memory 114 (see FIGS. 2*a* and 2*b*) a movement library 170 that may include a catalogue or library of movements including spin rotation movements that when detected as occurring may infer that a transfer of the computing device 10* between two users has occurred.

Figure 2C:
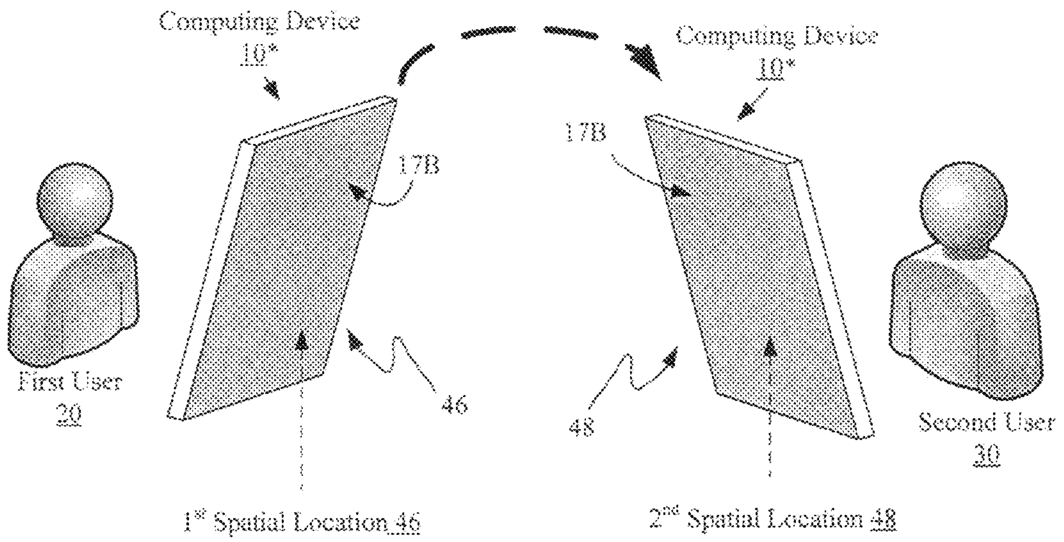

Turning now to FIG. 2*c* illustrating yet another type of movement of the computing device 10* that may be detected/monitored in order to determine or infer that the computing device 10* has been transferred between two users. In particular, FIG. 2*c* shows the computing device 10* being relocated by moving from a first spatial location 46 to a second spatial location 48 when the computing device 10* is transferred from a first user 20 to a second user 30. In various embodiments, such movements from the first spatial location 46 to the second spatial location 48, which will be referred to herein as "spatial relocation movements," may be detected using one or more sensors 120 (e.g., one or more movement sensors 202). In order to make a determination or inference that a transfer was made from the first user 20 to the second user 30, the computing device 10* or at least the logic endowed in the computing device 10* may examine/analyze the particular spatial relocation movements of the computing device 10 as it moves from the first spatial location 46 to the second spatial location 48, and to compare the pattern of spatial relocation movements (e.g., path, speed, acceleration, and so forth). In some cases, the computing device 10*(or rather the logic endowed with the computing device 10*) may additionally or alternatively analyze the second spatial location 48 with respect to the first spatial location 46 in order to determine or at least infer that the computing device 10* has been transferred from the first user 20 to the second user 30. To further determine or infer that the computing device 10* has been transferred from the first user 20 to the second user 30, the examination/analysis of the detected spatial relocation movements of the computing device 10* may be compared with catalogued or library spatial relocation movements that have been identified as being associated with the transfer of the computing device 10 between two users. That is, the computing device 10* may maintain in its memory 114 (see FIGS. 2*a* and 2*b*) a movement library 170 that may include a catalogue or library of movements including movements that when detected as occurring may infer that a transfer of the computing device 10* between two users has occurred.

In some embodiments, in order to determine or at least infer that the computing device 10* has been transferred from the first user 20 to the second user 30, the computing device 10* may be endowed with logic that detects/monitors vibrations. That is, each user who may come in contact with the computing device 10* may pass on to the computing device 10* unique vibration pattern or signature (e.g., as a result of heartbeat). Thus, when the first user 20 is holding the computing device 10*, the computing device 10* may vibrate in a particular vibration pattern that is associated with the first user 20. In contrast, when the computing device 10* has been transferred to the second user 30 and the second user 30 is holding the computing device 10*, the computing device 10* may vibrate in a vibration pattern that is associated with the second user 30. Thus, one way to determine whether the computing device 10* has been transferred from the first user 20 to the second user 30 is to detect/monitor at least changes in vibrations of the computing device 10*. In some cases, this may involve the computing device 10*(or at least the logic endowed with the computing device 10*) initially detecting the particular vibration pattern of the computing device 10* when the computing device 10* is being held by the first user 20, and to detect when the computing device 10* no longer vibrates in such a particular vibration pattern. In order to determine whether the computing device 10* has been transferred from the first user 20 to the second user 30, the computing device 10* in some cases may be further designed to determine that the computing device 10* is vibrating in a way that matches with a vibration pattern of the second user 30. By making such a determination, an inference may be made that the computing device 10* is being held or is in contact with the second user 30.

In some embodiments, the computing device 10* may include logic that is designed to determine whether the computing device 10 has moved away from the first user 20 in order to determine whether the computing device 10* has been transferred from the first user 20 to the second user 30. That is, by making such a determination, an inference may be made that the computing device 10* has been transferred from the first user 20 to the second user 30. In some embodiments, in order to make such a determination, data from a combination of sensors 120 may be processed and analyzed. That is, in order to determine whether the computing device 10 has moved away from the first user 20, a combination of one or more movement sensors 202 (see FIG. 3*e*) for directly detecting movements of the computing device 10*, one or more image capturing devices 204 (e.g., webcam or digital camera), and/or one or more audio capturing devices 206 (e.g., microphones) may be employed in order to determine whether the computing device 10* is moving away from the first user 20 (and thus, an inference that the computing device 10* has been transferred to the second user 30). For example, the computing device 10* in some cases may employ one or more movement sensors 202 to detect the actual movements of the computing device 10* and one or more image capturing devices 204 (along with facial recognition system/application) to determine that a face associated with the first user 20 is moving away from the computing device 10*. Based on the data provided by both the movement sensors 202 and the image capturing devices 204, at least an inference may be made that the computing device 10* has moved away from the first user 20*.

Figure 2D:
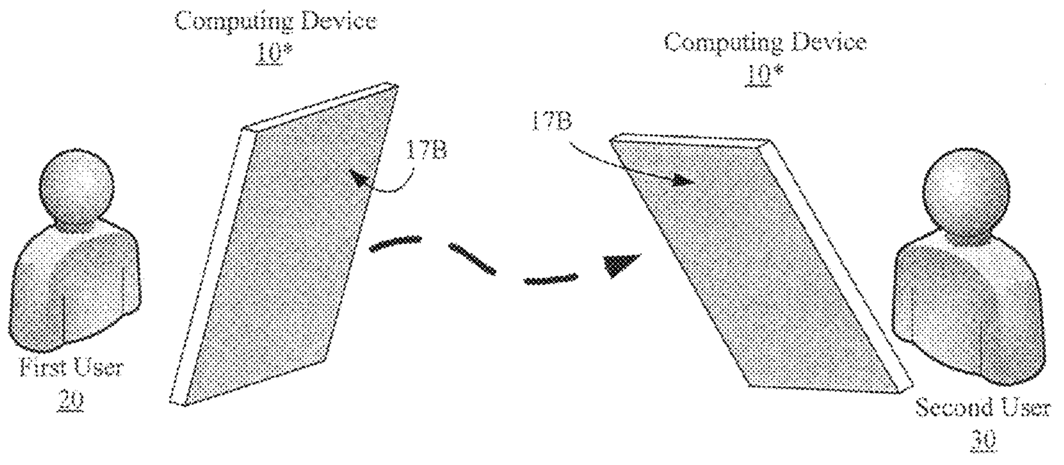

In some embodiments, and as illustrated in FIG. 2*d*, rather than only detecting/monitoring for a particular type of movement (e.g., tilt-type movements, spin-rotation type movements, spatial relocation type movements, vibration movements, and so forth) the computing device 10* may be endowed with logic that is designed to detect/monitor the overall three-dimensional movements of the computing device 10* and to determine whether the computing device 10* has moved in a particular three-dimensional way that at least infers that the computing device 10* has been transferred from the first user 20 to the second user 30. In order to accomplish this, the computing device 10 may maintain in its memory 114 (see FIGS. 3*a* and 3*b*) a movement library 170 that may include a catalogue or library of movements including three-dimensional movements that when detected as occurring may infer that a transfer of the computing device 10* between two users has occurred.

As described briefly above, in addition to directly detecting the movements of the computing device 10* using movement sensors 202 (e.g., inertia sensors, accelerometers, gyroscopes, and so forth), other types of environmental aspects may be detected/monitored in order to determine whether the computing device 10* has been transferred from a first user 20 to a second user 30. For instance, in some embodiments, the computing device 10* or the logic endowed with the computing device 10* may be designed to detect, using one or more image capturing devices 204, certain visual cues that when detected at least infers the transfer of the computing device 10* from a first user 20 to a second user 30. For example, in some embodiments, the computing device 10* may be endowed with logic that at least detects, via one or more image capturing devices 204, changes in lighting in the proximate vicinity of the computing device 10*. That is, generally when an object is moved from one spatial location to another spatial location, as in the case of a computing device 10* being transferred between two users, the object will be exposed to changes in lighting conditions. Thus, by merely detecting changes in lighting conditions of the computing device 10*, at least an inference may be made that the computing device 10* is being transferred between two users.

Alternatively or additionally, in some embodiments, the computing device 10* may be endowed with a facial recognition system (e.g., facial recognition software) that when employed with one or more image capturing devices 204 may be used in order to determine the presence or absence of a face associated with the first user 20 or the second user 30 within the proximate vicinity of the computing device 10*. If the face associated with the first user 20 is not detected in the proximate vicinity of the computing device 10* and/or if a face not associated with the first user 20 is detected in the proximate vicinity of the computing device 10*, such as the face of the second user 30, then a determination or at least an inference may be made that a transfer of the computing device 10* from the first user 20 to the second user 30 may have occurred. The phrase "proximate vicinity" as used here is in reference to the immediate area surrounding the computing device 10* or within a distance from the computing device 10* from which an object or a person is visually (or audibly) discernable or identifiable by the computing device 10* using, for example, a facial recognition system (or a voice verification system).

Another type of visual cues that the computing device 10* or at least the logic endowed with the computing device 10* may look for in order to determine whether the computing device 10* has been transferred from a first user 20 to a second user 30 is the presence or absence of one or more eyes (e.g., irises or retinas) in the proximate vicinity of the computing device 10* that are determined to be associated with the first user 20 or the second user 30. In particular, if the eyes of the first user 20 is determined not to be at least in the field of view of an image capturing device 204 of the computing device 10* and/or if one or more eyes of another person (e.g., second user 30) other than the first user 20 is determined to be in the field of view of the image capturing device 204, then at least an inference may be made that the computing device 10* has been transferred from the first user 20 to the second user 30.

Yet another type of visual cues that the computing device 10* or at least the logic endowed with the computing device 10* may look for in order to determine whether the computing device 10* has been transferred from a first user 20 to a second user 30 is whether the first user 20 or the second user 30 has visually exhibited movements or visual gestures which indicates or at least infers that the computing device 10* has been transferred from the first user 20 to the second user 30. That is, and as described earlier, one way to track the movements or gestures of the first user 20 that indicates or at least suggests that the computing device 10* has been transferred from the first user 20 to the second user 30 is to directly detect or track the movements of the computing device 10* using, for example, one or more movement sensors 202. An alternative technique for detecting the gestures of the first user 20 (or the second user 30) that indicates or at least suggests that the computing device 10* has been transferred from the first user 20 to the second user 30 is to visually detect such gestures using, for example, one or more image capturing devices 204. For example, when the computing device 10* or at least the logic endowed with the computing device 10* using one or more image capturing devices 204 visually detects the first user 20 extending his or her arms out (such as when the first user 20 is passing the computing device 10*), then that may at least suggest that the computing device 10* is being transferred. Similarly, when the computing device 10* or at least the logic endowed with the computing device 10* detects the second user 30 withdrawing his or her arms, then that may at least suggest that the second user 30 is receiving the computing device 10*.

Note that in some cases, multiple image capturing devices 204 may be employed by the computing device 10* in order to obtain better visual data. For example, by using multiple visual sensors (i.e., image capturing devices 204), a better image of the face or eyes of the first user 20 or the second user 30 may be obtained. Further, by employing multiple visual sensors, rather than a single visual sensor, a more accurate determination regarding the location of the first user 20 or the second user 30 (e.g., the location of faces or eyes of the first user 20 and/or the second user 30) relative to the specific orientation of the computing device 10* may be obtained. As will be further described herein, in some embodiments, such information may be useful in order to properly format items that may be presented by the computing device 10* when the computing device 10* is transferred to the second user 30.

In various embodiments, the computing device 10* or at least the logic that may be endowed with the computing device 10* may be designed to look for absence or presence of audio cues in the proximate vicinity of the computing device 10* in order to determine or at least infer as to whether the computing device 10* has been transferred from a first user 20 to a second user 30. For example, in some embodiments, the computing device 10* may be endowed with a voice verification system that may be designed to detect, via one or more audio capturing devices 206 (e.g., one or more microphones), a voice in the proximate vicinity of the computing device 10* having a voice pattern that may be different from the voice pattern of the first user 20. By making such a determination and/or by detecting absence of a voice pattern associated with the first user 20 in the proximate vicinity of the computing device 10*, at least an inference may be made that the computing device 10* has been transferred from the first user 20 to the second user 30.

In some embodiments, the computing device 10* or at least the logic endowed with the computing device 10* may be designed to determine the transfer of the computing device 10* from the first user 20 to the second user 30 based on one or more detected movements of the computing device 10*, one or more detected visual cues, and/or one or more detected audio cues. That is, since in many situations, a particular type of data or measurement (e.g., detected movements of the computing device 10* or detected visual cues in the proximate vicinity of the computing device 10*) may not reliably or conclusively indicate that the transfer of the computing device 10* from the first user 20 to the second user 30 has occurred, in various embodiments, the computing device 10* may make the determination as to whether the computing device 10* has been transferred based on different types of measurements (e.g., direct movements of the computing device 10*, visual cues, and/or audio cues).

In various embodiments, in order to properly format the items (e.g., electronic items such as audio and/or image files, textual documents, applications, application interfaces, Internet web pages, textual messages, voice message, and so forth) that may be presented through the computing device 10* after the computing device 10*, the determination operation for determining whether the computing device 10* has been transferred from the first user 20 to the second user 30 may include an operation to at least partially identify the second user 30. That is, in various embodiments, the selection of the format to be applied to the one or more items that are to be presented through the computing device 10* may depend on at least the partial identification of the second user 30. For example, if the second user 30 is a primary user or owner of the computing device 10*, the second user 30 may prefer that certain formatting be applied to the one or more items to be presented through the computing device 10*.

In some embodiments, in order to at least partially identify the second user 30, the computing device 10* or at least the endowed logic may at least determine that the second user 30 is a different user from the first user 30. Alternatively or additionally, the computing device 10* or at least the endowed logic in order to at least partially identify the second user 30 may determine whether the second user 30 is registered with the computing device 10*. That is, whether the computing device 10* or at least the endowed logic recognizes the second user 30 by determining whether certain detected biometrics of the second user 30 (e.g., facial or retinal characteristics, or voice pattern) has already been inputted or stored in the computing device 10*.

If the computing device 10*(or the endowed logic) does indeed recognize the second user 30 then the computing device 10* may determine whether there are any presentation preferences 174 (see FIGS. 3*a* and 3*b*) linked to the second user 30 or at least linked to the identity of the second user 30. In various embodiments, a presentation preference 174 may indicate a format preference (e.g., font style or size, screen brightness, color, audio volume, and so forth) as to how one or more items should be presented through the computing device 10*. Note that although in many cases a presentation preference 174 that is associated with the second user 30 will be the preference of the second user 30, in other cases, a presentation preference 174 that is associated with the second user 30 may be a preference that was provided by another party (e.g., the first user 20). For example, if the second user 30 is some third party who is not associated with the computing device 10* then the primary user or owner of the computing device 10* may provide the presentation preference 174 so that items that are to be presented through the computing device 10* are presented to the second user 30 in a way that the primary user or owner wishes the items to be presented to others.

In various embodiments, the memory 114 of the computing device 10* may store one or more presentation preferences 174 of one or more users. In some embodiments, the memory 114 may store one or more presentation preferences 174 that are specifically associated with a primary user or owner of the computing device 10* and generic one or more presentation preferences 174 for any other users who may access the computing device 174. Thus, when the computing device 10* determines that the primary user or owner of the computing device 10* has possession of the computing device 10* then the one or more presentation preferences 174 that are determined to be specifically associated with the primary user or owner will be invoked. On the other hand, if the computing device 10* determines that someone else other than the primary user or owner has possession of the computing device 10*, then the generic one or more presentation preferences 174 may be invoked.

As described earlier, in addition to being able to determine that the computing device 10* has been transferred from a first user 20 to a second user 30, the computing device 10* or at least the logic that may be endowed with the computing device 10* may also be designed to present one or more items in one or more particular formats that were selected based, at least in part, on the determination that the computing device 10* has been transferred from the first user 20 and the second user 30 and the at least partial identification of the second user 30. In various embodiments, the one or more items that may be presented in the one or more particular formats may have been open or running prior to the transfer of the computing device 10* and/or electronic items that were accessible through the computing device 10*(e.g., electronic documents and files that were stored in the computing device 10*) prior to the transfer of the computing device 10* to the second user 30.

The type of formatting to be selected and applied based on the determination that the computing device 10* has been transferred from the first user 20 to the second user 30 and the at least partial identification of the second user 30 will depend on a number of factors including what types of items are to be formatted and whether there are any presentation preferences 174 associated with the second user 30 that can be used in order to properly format the items to be presented through the computing device 10*. A more detailed discussion related to the presentation of the one or more items in the one or more particular formats will be provided in greater detail herein.

Referring now to FIGS. 3*a* and 3*b* illustrating two embodiments (illustrated in FIGS. 3*a* and 3*b* as computing device 10' and computing device 10") of the computing device 10* of FIGS. 1, 2*a*, 2*b*, 2*c*, and 2*d*. Referring particularly now to FIG. 3*a*, which illustrates a computing device 10' that includes a transfer determining module 102' that further includes a user identifying module 230', a particular format presenting module 104', a memory 114 (which may store one or more applications 160, a movement library 170, and user information 172 including one or more presentation preferences 174 and/or one or more user biometric profiles 176 such as facial or retinal profiles and/or signature speech patterns), one or more processors 116 (e.g., microprocessors, controllers, etc.), one or more sensors 120, a user interface 110 (e.g., a display device 12 such as a touchscreen, a keypad, a mouse, a microphone, one or more speakers, etc.), and a network interface 112 (e.g., network interface card or NIC).

In various embodiments, the transfer determining module 102' of FIG. 2*a* is a logic module that is designed to, among other things, determine that the computing device 10* that was in possession of a first user 20 has been transferred from the first user 20 to a second user 30, the determination including at least partially identifying the second user 30 by the user identifying module 230. The particular format presenting module 104' is a logic module that is designed to audibly and/or visually present one or more electronic items in one or more particular formats, the one or more particular formats being selected based, at least in part, on the determination that the computing device 10* has been transferred from the first user 20 to the second user 30 and the at least partial identification of the second user 30. For this particular embodiment of the computing device 10* of FIGS. 1, 2*a*, 2*b*, 2*c*, and 2*d*, the two logic modules (e.g., the transfer determining module 102' and the particular format presenting module 104') are implemented using purely circuitry components such as application specific integrated circuit or ASIC. Thus, the computing device 10' illustrated in FIG. 2*a* may be referred to as the "hardwired" version or embodiment of the computing device 10* of FIGS. 1, 2*a;* 2*b*, 2*c*, and 2*d*.

Turning now to FIG. 3*b*, which illustrate a "soft" version or embodiment (e.g., computing device 10") of the computing device 10* of FIGS. 1, 2*a*, 2*b*, 2*c*, and 2*d*. In particular, FIG. 3*b* shows a computing device 10" that has components similar or the same as the components of the computing device 10' of FIG. 3*a*. That is, computing device 10", similar to computing device 10' of FIG. 3*a*, may comprise of a memory 114 (which may store one or more applications 160, a movement library 170, and user information 172 including one or more presentation preferences 174 and/or one or more user biometric profiles 176 such as facial or retinal profiles and/or signature speech patterns), one or more processors 116, one or more sensors 120, user interface 110, and/or a network interface 112. And similar to the computing device 10' of FIG. 3*a*, the computing device 10" of FIG. 3*b* may include logic modules including a transfer determining module 102" that further includes a user identifying module 230" and a particular format presenting module 104" that correspond to and mirror the transfer determining module 102' including the user identifying module 230' and the particular format presenting module 104' of the computing device 10' of FIG. 3*a*. However, unlike the logic modules (e.g., the transfer determining module 102' including the user identifying module 230' and the particular format presenting module 104') of the computing device 10' of FIG. 3*a*, the logic modules (e.g., the transfer determining module 102" including the user identifying module 230" and the particular format presenting module 104") of the computing device 10" of FIG. 3*b* are implemented by the one or more processors 116 executing computer readable instructions 152 (e.g., software and/or firmware) that may be stored in the memory 114.

Note that although FIG. 3*a* illustrates all of the logic modules (e.g., the transfer determining module 102' including the user identify module 230' and the particular format presenting module 104') being implemented using purely circuitry components such as ASIC, and although FIG. 3*b* illustrates all of the logic modules (e.g., the transfer determining module 102" including the user identifying module 230" and the particular format presenting module 104") being implemented using one or more processors 116 executing computer readable instructions 152, in other embodiments, these logic modules may be implemented using a combination of specifically designed circuitry such as ASIC and one or more processors 116 (or other types of circuitry such as field programmable gate arrays or FPGAs) executing computer readable instructions 152. For example, in some embodiments, at least one of the logic modules may be implemented using specially designed circuitry (e.g., ASIC) while a second logic module may be implemented using a processor 116 (or other types of programmable circuitry such as FPGA) executing computer readable instructions 152 (e.g., software and/or firmware).

In various embodiments, the memory 114 of the computing device 10' of FIG. 3*a* and the computing device 10" of FIG. 3*b* may comprise of one or more of mass storage device, read-only memory (ROM), programmable read-only memory (PROM), erasable programmable read-only memory (EPROM), cache memory such as random access memory (RAM), flash memory, synchronous random access memory (SRAM), dynamic random access memory (DRAM), and/or other types of memory devices. In various embodiments the one or more applications 160 stored in memory 114 may include, for example, an operating system 162, one or more productivity applications 164 such as a word processing application or a spreadsheet application, one or more communication applications 166 such as an email or IM application, and one or more personal information manager applications 168 (e.g., Microsoft Outlook).

Turning now to FIG. 3*c* illustrating a particular implementation of the transfer determining module 102*(e.g., the transfer determining module 102' or the transfer determining module 102") of FIGS. 3*a* and 3*b*. As illustrated, the transfer determining module 102*, in addition to the user identifying module 230*(e.g., user identifying module 230' of FIG. 3*a* or user identifying module 230" of FIG. 3*b*), may include one or more sub-logic modules in various alternative implementations. For example, in various implementations, the transfer determining module 102* may include a particular movement detecting module 210 (which may further include a tilt detecting module 212, a spatial location detecting module 214, a spin rotation detecting module 216, a moving away detecting module 217, a vibration detecting module 218, and/or a 3-dimensional movement detecting module 219), a visual cue detecting module 220 (which may further include a lighting change detecting module 221, a face detecting module 222, an eye detecting module 223, a visual moving away detecting module 224, and/or a visual moving closer detecting module 225), an audio cue detecting module 226 (which may further include a voice pattern detecting module 227, an audio moving away detecting module 228, and/or an audio moving closer detecting module 229), and the user identifying module 230*. In various embodiments, the user identifying module 230* may further include a different user determining module 231 and a registered user determining module 232 that may further include an identification credential acquiring module 233 (which may further include a biometric credential acquiring module 234) and a registered preference determining module 235. Specific details related to the transfer determining module 102* as well as the above-described sub-modules of the transfer determining module 102* will be provided below with respect to the operations and processes to be described herein.

Referring now to FIG. 3*d* illustrating a particular implementation of the particular format presenting module 104* (e.g., the particular format presenting module 104' or the particular format presenting module 104") of FIGS. 3*a* and 3*b*. As illustrated, the particular format presenting module 104* may include one or more sub-logic modules in various alternative implementations. For example, in various implementations, the particular format presenting module 104* may include a format selecting module 240, a modified form presenting module 242, a user interface configuring module 244, and/or a user location determining module 248. Specific details related to the particular format presenting module 104* as well as the above-described sub-modules of the particular format presenting module 104* will be provided below with respect to the operations and processes to be described herein.

FIG. 3*e* illustrates the various types of sensors 120 that may be included with the computing device 10*(e.g., the computing device 10' of FIG. 3*a* or the computing device 10" of FIG. 3*b*) of FIGS. 1, 2*a*, 2*b*, 2*c*, and 2*d*. As illustrated, the sensors 120 that may be included with the computing device 10* may include one or more movement sensors 202 (e.g., an accelerometer, an inertia sensor, and/or a gyro sensor), one or more image capturing devices 204 (e.g., a web cam, a digital camera, an infrared camera, etc.), one or more audio capturing devices 206 (e.g., microphones), and/or a global positioning system (GPS) 208 (which may include any device that can determine its geographic location including those devices that determine its geographic location using triangulation techniques applied to signals transmitted by satellites or by communication towers such as cellular towers).

A more detailed discussion related to the computing device 10* of FIGS. 1, 2*a*, 2*b*, 2*c*, and 2*d*(e.g., the computing device 10' of FIG. 3*a* or the computing device 10" of FIG. 3*b*) will now be provided with respect to the processes and operations to be described herein. FIG. 4 illustrates an operational flow 400 representing example operations for, among other things, presenting, via a computing device, one or more items in one or more particular formats, the one or more particular formats being selected based, at least in part, on determining that the computing device that was in possession of a first user has been transferred from the first user to a second user, the determining including at least partially identifying the second user. In FIG. 4 and in the following figures that include various examples of operational flows, discussions and explanations will be provided with respect to the exemplary environment 100 described above and as illustrated in FIG. 1 and/or with respect to other examples (e.g., as provided in FIGS. 2*a*, 2*b*, 2*c*, 2*d*, 3*a*, 3*b*, 3*c*, 3*d*, and 3*e*) and contexts. However, it should be understood that the operational flows may be executed in a number of other environments and contexts, and/or in modified versions of FIGS. 2*a*, 2*b*, 2*c*, 2*d*, 3*a*, 3*b*, 3*c*, 3*d*, and 3*e*. Also, although the various operational flows are presented in the sequence(s) illustrated, it should be understood that the various operations may be performed in other orders other than those which are illustrated, or may be performed concurrently.

Further, in FIG. 4 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated in FIG. 4 as well as the other operations to be described herein are performed by at least one of a machine, an article of manufacture, or a composition of matter unless indicated otherwise.

In any event, after a start operation, the operational flow 400 of FIG. 4 may move to a transfer determining operation 402 for determining that a computing device that was in possession of a first user has been transferred from the first user to a second user, the determining including at least partially identifying the second user and the computing device being designed for presenting one or more items. For instance, and as an illustration, the transfer determining module 102*(e.g., the transfer determining module 102' of FIG. 3*a* or the transfer determining module 102" of FIG. 3*b*) including the user identifying module 230*(e.g., the user identifying module 230' of FIG. 3*a* or the user identifying module 230" of FIG. 3*b*) of the computing device 10* of FIG. 1 (e.g., the computing device 10' of FIG. 3*a* or the computing device 10" of FIG. 3*b*) determining that the computing device 10* that was in possession of a first user 20 has been transferred from the first user 20 to a second user 30, the determining including at least partially identifying the second user 30 by the user identifying module 230* and the computing device 10* being designed for audibly and/or visually presenting one or more items (e.g., electronic items such as audio or image files, textual documents, applications including communication, productivity, or gaming applications, application interfaces, user credentials including passwords, and so forth). In various embodiments, the computing de ice 10* may be designed to present one or more items by having one or more software applications and/or hardware devices that may be needed in order to present the one or more items. For example, in some implementations, the computing device 10* may include a software application such as a word processing application or a communication application and/or a display screen and one or more speakers for presenting the one or more items.

In addition to the transfer determining operation 402, operational flow 400 may also include a particular format presenting operation 404 for presenting, via the computing device, the one or more items in one or more particular formats, the one or more particular formats being selected based, at least in part, on said determining as further illustrated in FIG. 4. For instance, the particular format presenting module 104* (e.g., the particular format presenting module 104' of FIG. 3*a* or the particular format presenting module 104" of FIG. 3*b*) of the computing device 10* of FIG. 1 (e.g., the computing device 10' of FIG. 3*a* or the computing device 10" of FIG. 3*b*) presenting via the computing device 10*(e.g., a mobile computing device such as a tablet computer, a smartphone, an e-reader, a laptop, or other types of portable computing device) the one or more items in one or more particular formats, the one or more particular formats being selected based, at least in part, on said determining that the computing device 10* that was in possession of the first user 20 has been transferred from the first user 20 to the second user 30.

Various types of formatting may be applied in various alternative implementations. For example, in some cases, the presenting of the one or more items in one or more particular formats may involve displaying the one or more items (textual documents) in one or more particular font styles or sizes. In some cases, the presenting of the one or more items in one or more particular formats may involve audibly presenting the one or more items (e.g., audio or video files) at a particular volume level. In other cases, the presenting of the one or more items in one or more particular formats may involve displaying the one or more items through a user interface 110 (e.g., a display device 12 such as a touch screen) that has been configured to display items at particular level or levels of brightness, tint, hue, and/or contrast. In still other cases, the presenting of the one or more items in one or more particular formats may involve displaying the one or more items in one or more particular color schemes. Other types of formatting may additionally or alternatively be applied to the one or more items to be presented in various other implementations as will be further described herein.

As will be further described herein, the transfer determining operation 402 and the particular format presenting operation 404 of FIG. 4 may be executed in a variety of different ways in various alternative implementations. FIGS. 5*a*, 5*b*, 5*c*, 5*d*, 5*e*, 5*f*, 5*g*, and 5*h*, for example, illustrate at least some of the alternative ways that the transfer determining operation 402 of FIG. 4 may be executed in various alternative implementations. For example, in various implementations, the transfer determining operation 402 of FIG. 4 may include an operation 502 for determining automatically without prompting by the first user or the second user that the computing device has been transferred from the first user to the second user as illustrated in FIG. 5*a*. For instance, the transfer determining module 102*(see, for example, the transfer determining module 102' of FIG. 3*a* or the transfer determining module 102" of FIG. 3*b*) of the computing device 10* of FIG. 1 (e.g., the computing device 10' of FIG. 3*a* or the computing device 10" of FIG. 3*b*) determining automatically without prompting by the first user 20 or the second user 30 that the computing device 10* has been transferred from the first user 20 to the second user 30.

As further illustrated in FIG. 5*a*, in some implementations, the transfer determining operation 402 may additionally or alternatively include an operation 503 for determining that the computing device has been transferred from the first user to the second user based, at least in part, on data provided by one or more sensors. For instance, the transfer determining module 102* of the computing device 10* of FIG. 1 (e.g., the computing device 10' of FIG. 3*a* or the computing device 10" of FIG. 3*b*) determining that the computing device 10* has been transferred from the first user 20 to the second user 30 based, at least in part, on data provided by one or more sensors 120.

In various implementations, data from various types of sensors 120 may be used in order to determine whether the computing device 10* has been transferred. For example, in various implementations, operation 503 may include an operation 504 for determining that the computing device has been transferred from the first user to the second user based, at least in part, on data provided by one or more movement sensors that are designed to directly sense movements of the computing device. For instance, the transfer determining module 102* of the computing device 10* of FIG. 1 determining that the computing device 10* has been transferred from the first user 20 to the second user 30 based, at least in part, on data provided by one or more movement sensors 202 that are designed to directly sense (e.g., directly detect) movements of the computing device 10*. In various implementations, data obtained from one or more movement sensors 202 may be processed in order to make the determination that the computing device 10* was transferred from the first user 20 to the second user 30. For example, in some cases, data from one or more movement sensors 202 may be processed in order to determine whether the computing device 10* exhibited certain movements that when detected as occurring may at least suggest that the computing device 10* has been transferred between two users.

In some implementations, operation 504 may include an operation 505 for determining that the computing device has been transferred from the first user to the second user based, at least in part, on data provided by at least one of an accelerometer, an inertia sensor, or a gyro sensor as further depicted in FIG. 5*a*. For instance, the transfer determining module 102* of the computing device 10* of FIG. 1 determining that the computing device 10 has been transferred from the first user 20 to the second user 30 based, at least in part, on data provided by at least one of an accelerometer, an inertia sensor, or a gyro sensor. Note that references to "computing device 10*" in the following description, unless indicated otherwise, may be in reference to the computing device 10' of FIG. 3*a* or to the computing device 10' of FIG. 3*b*.

In the same or different implementations, operation 503 may include an operation 506 for determining that the computing device has been transferred from the first user to the second user based, at least in part, on data provided by one or more image capturing devices. For instance, the transfer determining module 102* of the computing device 10* of FIG. 1 determining that the computing device 10* has been transferred from the first user 20 to the second user 30 based, at least in part, on data provided by one or more image capturing devices 204 (e.g., a webcam, a digital camera, and so forth), which may be integrated in the computing device 10*. In various implementations, data obtained from one or more image capturing devices 204 may be processed in order to make the determination that the computing device 10* was transferred from the first user 20 to the second user 30. For example, in some cases, data from one or more image capturing devices 204 may be processed in order to determine whether a face or one or more eyes associated with the second user 30 is visually detected in the vicinity of the computing device 10*. In other cases, data from one or more image capturing devices 204 may be processed in order to determine whether the first user 20 who had possession of the computing device 10* visually exhibited certain gestures (e.g., arms extending) that when detected at least suggest that the computing device 10* has been transferred. In still other cases, other techniques may be used in order to determine that the computing device 10* has been transferred from the first user 20 to the second user 30 based on data provided by image capturing devices 204.

In the same or alternative implementations, operation 503 may include an operation 507 for determining that the computing device has been transferred from the first user to the second user based, at least in part, on data provided by one or more audio capturing devices. For instance, the transfer determining module 102* of the computing device 10* of FIG. 1 determining that the computing device 10* has been transferred from the first user 20 to the second user 30 based, at least in part, on data provided by one or more audio capturing devices 206 (e.g., microphone), which may be integrated in the computing device 10*. In various implementations, data obtained from one or more audio capturing devices 206 may be processed in order to make the determination that the computing device 10* was transferred from the first user 20 to the second user 30. For example, in some cases, data from one or more audio capturing devices 206 may be processed in order to determine whether a voice associated with the second user 30 is audibly detected in the vicinity of the computing device 10*.

In some cases, a more accurate determination that the computing device 10* has been transferred between two users may be obtained if data from different types of sensors are processed and analyzed. For example, in some implementations, operation 503 may include an operation 508 for determining that the computing device has been transferred from the first user to the second user based, at least in part, on data provided by one or more movement sensors and one or more image capturing devices as depicted in FIG. 5*a*. For instance, the transfer determining module 102* of the computing device 10* of FIG. 1 determining that the computing device 10* has been transferred from the first user 20 to the second user 30 based, at least in part, on data provided by one or more movement sensors 202 and one or more image capturing devices 204.

In some alternative implementations, operation 503 may include an operation 509 for determining that the computing device has been transferred from the first user to the second user based, at least in part, on data provided by one or more movement sensors, one or more image capturing devices, and one or more audio capturing devices. For instance, the transfer determining module 102* of the computing device 10* of FIG. 1 determining that the computing device 10* has been transferred from the first user 20 to the second user 30 based, at least in part, on data provided by one or more movement sensors 202, one or more image capturing devices 204, and one or more audio capturing devices 206.

In some alternative implementations, operation 503 may include an operation 510 for determining that the computing device has been transferred from the first user to the second user based, at least in part, on data provided by one or more movement sensors and one or more audio capturing devices. For instance, the transfer determining module 102* of the computing device 10* of FIG. 1 determining that the computing device 10* has been transferred from the first user 20 to the second user 30 based, at least in part, on data provided by one or more movement sensors 202 and one or more audio capturing devices 206.

In some alternative implementations, operation 503 may include an operation 511 for determining that the computing device has been transferred from the first user to the second user based, at least in part, on data provided by one or more image capturing devices and one or more audio capturing devices. For instance, the transfer determining module 102* of the computing device 10* of FIG. 1 determining that the computing device 10* has been transferred from the first user 20 to the second user 30 based, at least in part, on data provided by one or more image capturing devices 204 and one or more audio capturing devices 206.

Turning now to FIG. 5*b*, in various implementations, the transfer determining operation 402 may include an operation 512 for determining that the computing device has been transferred from the first user to the second user by at least detecting that the computing device has exhibited one or more particular movements that at least suggest that the computing device has been transferred from the first user to the second user. For instance, the transfer determining module 102* including the particular movement detecting module 210 (see FIG. 3*c*) of the computing device 10* of FIG. 1 determining that the computing device 10* has been transferred from the first user 20 to the second user 30 when the particular movement detecting module 210 at least detects that the computing device 10* has exhibited one or more particular movements that when detected at least suggest that the computing device 10* has been transferred from the first user 20 to the second user 30.

As further illustrated in FIGS. 5*b* and 5*c* operation 512 may involve detecting various types of movements of the computing device 10* in order to determine or at least infer that the computing device 10* has been transferred from a first user 20 to a second user 30. For example, in some implementations, operation 512 may include an operation 513 for detecting that the computing device has exhibited the one or more particular movements that at least suggest that the computing device has been transferred from the first user to the second user by at least detecting that the computing device is no longer in a particular tilt orientation that the computing device was detected as having when the computing device was in the possession of the first user as illustrated in FIG. 5*b*. For instance, the particular movement detecting module 210 including the tilt detecting module 212 (see FIG. 3*c*) of the computing device 10* detecting that the computing device 10* has exhibited the one or more movements that at least suggest that the computing device 10* has been transferred from the first user 20 to the second user 30 when the tilt detecting module 212 at least detects that the computing device 10* is no longer in a particular tilt orientation that the computing device 10* was detected as having when the computing device 10* was in the possession of the first user 20.

In some cases, operation 513 may, in turn, include an operation 514 for detecting that the computing device is no longer in a particular tilt orientation that the computing device was detected as having when the computing device was in the possession of the first user by at least detecting that the computing device has been reoriented from the particular tilt orientation to another tilt orientation that when detected as occurring at least suggests that the computing device has been transferred from the first user to the second user as further depicted in FIG. 5*b*. For instance, the tilt detecting module 212 of the computing device 10* detecting that the computing device 10* is no longer in a particular tilt orientation that the computing device 10* was detected as having when the computing device 10* was in the possession of the first user 20 by at least detecting that the computing device 10* has been reoriented from the particular tilt orientation to another tilt orientation that when detected as occurring at least suggests that the computing device 10* has been transferred from the first user 20 to the second user 30.

In the same or different implementations, operation 513 may include an operation 515 for detecting that the computing device is no longer in a particular tilt orientation that the computing device was detected as having when the computing device was in the possession of the first user by at least detecting that the computing device has been reoriented from the particular tilt orientation to another tilt orientation having an angular tilt that is at least a predefined percentage different from an angular tilt associated with the particular tilt orientation that the computing device was detected as having when the computing device was in the possession of the first user as further depicted in FIG. 5*b*. For instance, the tilt detecting module 212 of the computing device 10* detecting that the computing device 10* is no longer in a particular tilt orientation that the computing device 10* was detected as having when the computing device 10* was in the possession of the first user 20 by at least detecting that the computing device 10* has been reoriented from the particular tilt orientation to another tilt orientation having an angular tilt that is at least a predefined percentage different from an angular tilt associated with the particular tilt orientation that the computing device 10* was detected as having when the computing device 10* was in the possession of the first user 20. Such an operation may be executed in order to, for example, filter out "noise" tilts (e.g., random changes in tilt caused by the first user 20 when, for example, the first user 20 accidentally or intentionally moves his/her body or hands in order to, for example, get in a more comfortable body position causing the computing device 10* to move and change in tilt orientation).

In various implementations, the operation 512 for determining that the computing device has been transferred from the first user to the second user by at least detecting that the computing device has exhibited one or more particular movements that at least suggest that the computing device has been transferred from the first user to the second user may involve detecting that the computing device 10* has at least been relocated away from a particular location. For example, in some implementations, operation 512 may include an operation 516 for detecting that the computing device has exhibited the one or more particular movements that at least suggest that the computing device has been transferred from the first user to the second user by at least detecting that the computing device is no longer at a particular spatial location that the computing device was detected as being located at when the computing device was in the possession of the first user as illustrated in FIG. 5*b*. For instance, the particular movement detecting module 210 including the spatial location detecting module 214 (see FIG. 3*c*) of the computing device 10* detecting that the computing device 10* has exhibited the one or more particular movements that at least suggest that the computing device 10* has been transferred from the first user 20 to the second user 30 when the spatial location detecting module 214 at least detects that the computing device 10* is no longer at a particular spatial location (e.g., see spatial location 46 of FIG. 2*c* of the computing device 10* prior to the transfer of the computing device 10* from the first user 20 to the second user 30) that the computing device 10* was detected as being located at when the computing device 10* was in the possession of the first user 20.

In various implementations, operation 516 may include an operation 517 for detecting that the computing device is no longer at a particular spatial location that the computing device was detected as being located at when the computing device was in the possession of the first user by at least detecting that the computing device has been relocated from the particular spatial location to another spatial location that when detected at least suggests that the computing device has been transferred from the first user to the second user. For instance, the spatial location detection module 214 of the computing device 10* detecting that the computing device 10* is no longer at a particular spatial location that the computing device 10* was detected as being located at when the computing device 10* was in the possession of the first user 20 by at least detecting that the computing device 10* has been relocated from the particular spatial location (e.g., see spatial location 46 of FIG. 2*c*) to another spatial location (e.g., see spatial location 48 of FIG. 2*c*) that when detected at least suggests that the computing device 10* has been transferred from the first user 20 to the second user 30.

In the same or different implementations, operation 516 may include an operation 518 for detecting that the computing device is no longer at a particular spatial location that the computing device was detected as being located at when the computing device was in the possession of the first user by at least detecting that the computing device has been relocated from the particular spatial location to another spatial location that is at least a predefined distance away from the particular spatial location that the computing device was detected as being located at when the computing device was in the possession of the first user. For instance, the spatial location detection module 214 of the computing device 10* detecting that the computing device 10* is no longer at a particular spatial location that the computing device 10* was detected as being located at when the computing device 10* was in the possession of the first user 20 by at least detecting that the computing device 10* has been relocated from the particular spatial location to another spatial location that is at least a predefined distance away from the particular spatial location that the computing device 10* was detected as being located at when the computing device 10* was in the possession of the first user 20.

Referring to FIG. 5*c*, in various implementations, operation 512 for determining that the computing device has been transferred from the first user to the second user by at least detecting that the computing device has exhibited one or more particular movements that at least suggest that the computing device has been transferred from the first user to the second user may include an operation 519 for detecting that the computing device has exhibited the one or more particular movements that at least suggest that the computing device has been transferred from the first user to the second user by at least detecting that the computing device has been spin rotated from a first orientation associated with the computing device when the computing device was in the possession of the first user to a second orientation. For instance, the particular movement detecting module 210 including the spin rotation detecting module 216 (see FIG. 3*c*) of the computing device 10* detecting that the computing device 10* has exhibited the one or more particular movements that at least suggest that the computing device 10* has been transferred from the first user 20 to the second user 30 when the spin rotation detecting module 216 at least detects that the computing device 10* has been spin rotated from a first orientation associated with the computing device 10* when the computing device 10* was in the possession of the first user 20* to a second orientation.

In the same or different implementations, operation 512 may include an operation 520 for detecting that the computing device has exhibited the one or more particular movements that at least suggest that the computing device has been transferred from the first user to the second user by at least detecting that the computing device has moved away from the first user. For instance, the particular movement detecting module 210 including the moving away detecting module 217 (see FIG. 3*c*) of the computing device 10* detecting that the computing device 10* has exhibited the one or more particular movements that at least suggest that the computing device 10* has been transferred from the first user 20 to the second user 30 when the moving away detecting module 217 at least detects that the computing device 10* has moved away from the first user 20. Such detection may be based on data provided by one or more sensors 120 including one or more movement sensors 202, one or more image capturing devices 204 (which may detect the face or one or more eyes of the first user 20 moving away from the computing device 10*), and/or one or more audio capturing devices 206 (which may detect the speech signature of the first user 20 diminishing inferring that the first user 20 may be moving away from the computing device 10*).

In some implementations, operation 520 may further include an operation 521 for detecting that the computing device has moved away from the first user by at least detecting that the computing device has moved a predefined distance away from the first user. For instance, the moving away detecting module 217 of the computing device 10* detecting that the computing device 10*has moved away from the first user 20 by at least detecting that the computing device 10* has moved a predefined distance away from the first user 20. In doing so, movements exhibited by the computing device 10* that may be considered "noise" (e.g., random or accidental relocation movements of the computing device 10* caused by, for example, the random or accidental movements of the first user 20 holding the computing device 10*) may be filtered out and ignored.

In various embodiments, operation 512 for determining that the computing device has been transferred from the first user to the second user by at least detecting that the computing device has exhibited one or more particular movements that at least suggest that the computing device has been transferred from the first user to the second user may involve tracking or sensing vibrations that are exposed to the computing device 10* That is, each user who may come in contact with the computing device 10* may be associated with relatively unique signature vibration pattern (e.g., heart rate). Thus, by detecting at least a change in vibration, at least an inference may be made that a transfer of the computing device 10* may have occurred. Thus, in various implementations, operation 512 may include an operation 522 for detecting that the computing device has exhibited the one or more particular movements that at least suggest that the computing device has been transferred from the first user to the second user by at least detecting that the computing device is no longer vibrating in a manner that matches with a vibration pattern that the computing device was detected as having when the computing device was in the possession of the first user as illustrated in FIG. 5*c*. For instance, the particular movement detecting module 210 including the vibration detecting module 218 (see FIG. 3*c*) of the computing device 10* detecting that the computing device 10* has exhibited the one or more particular movements that at least suggest that the computing device 10* has been transferred from the first user 20 to the second user 30 when the vibration detecting module 218 at least detects that the computing device 10* is no longer vibrating in a manner that matches with a vibration pattern that the computing device 10* was detected as having when the computing device 10* was in the possession of the first user 20.

As further illustrated in FIG. 5*c*, in some implementations, operation 522 may further include an operation 523 for detecting that the computing device is no longer vibrating in a manner that matches with a vibration pattern that the computing device was detected as having when the computing device was in the possession of the first user by at least detecting that the computing device is vibrating in a manner that matches with a vibration pattern associated with the second user. For instance, the vibration detecting module 218 of the computing device 10* detecting that the computing device 10* is no longer vibrating in a manner that matches with a vibration pattern that the computing device 10* was detected as having when the computing device 10* was in the possession of the first user 20 by at least detecting that the computing device 10* is vibrating in a manner that matches with a vibration pattern associated with the second user 30.

In the same or different implementations, operation 512 may include an operation 524 for detecting that the computing device has exhibited the one or more particular movements that at least suggest that the computing device has been transferred from the first user to the second user by at least detecting that the computing device is not vibrating in a manner that matches with a vibration pattern that is associated with the first user. For instance, the particular movement detecting module 210 including the vibration detecting module 218 of the computing device 10* detecting that the computing device 10* has exhibited the one or more particular movements that at least suggest that the computing device 10* has been transferred from the first user 20 to the second user 30 when the vibration detecting module 218 at least detects that the computing device 10* is not vibrating in a manner that matches with a vibration pattern that is associated with the first user 20.

In various implementations, operation 512 for determining that the computing device has been transferred from the first user to the second user by at least detecting that the computing device has exhibited one or more particular movements that at least suggest that the computing device has been transferred from the first user to the second user may involve tracking the overall movements of the computing device 10* rather than tracking a particular type of movements (e.g., tilt movements, spin rotation movements, spatial relocation movements, vibration movements, etc.) in order to determine whether the computing device 10* has been transferred from the first user 20 to the second user 30. For example, in some implementations, operation 512 may include an operation 525 for detecting that the computing device has exhibited the one or more particular movements that at least suggest that the computing device has been transferred from the first user to the second user by at least detecting that the computing device has moved in a particular three-dimensional movement that infers that the computing device has been transferred from the first user to the second user. For instance, the particular movement detecting module 210 including the three-dimensional movement detecting module 219 (see FIG. 3*c*) of the computing device 10* detecting that the computing device 10* has exhibited the one or more particular movements that at least suggest that the computing device 10* has been transferred from the first user 20 to the second user 30 when the three-dimensional movement detecting module 219 at least detects that the computing device 10* has moved in a particular three-dimensional movement that infers that the computing device 10* has been transferred from the first user 20 to the second user 30.

In various implementations, the transfer determining operation 402 of FIG. 4 may be executed by determining that the computing device 10* has been transferred from the first user 20 to the second user 30 based, at least in part, on one or more visual cues. For example, in some implementations, the transfer determining operation 402 as illustrated in FIG. 5*d* may include an operation 526 for determining that the computing device has been transferred from the first user to the second user by at least detecting presence or absence of one or more visual cues in proximate vicinity of the computing device that at least suggest that the computing device has been transferred from the first user to the second user. For instance, the transfer determining module 102* including the visual cue detecting module 220 (see FIG. 3*c*) of the computing device 10* determining that the computing device 10* has been transferred from the first user 20 to the second user 30 when the visual cue detecting module 220 at least detects presence or absence of one or more visual cues (e.g., detecting presence or absence of faces of the first user 20 and/or second user 30, detecting background movement relative to the computing device 10*, and so forth) in proximate vicinity (e.g., within a distance from the computing device 10* such as within six feet from which an object or a person is visually discernable or identifiable by the computing device 10*) of the computing device 10* that at least suggest that the computing device 10* has been transferred from the first user 20 to the second user 30.

As further illustrated in FIGS. 5*d* and 5*e*, operation 526 may be implemented in a number of different ways in various alternative implementations. For example, in some implementations, operation 526 may include an operation 527 for detecting the presence or absence of the one or more visual cues in the proximate vicinity of the computing device by at least detecting presence of the one or more visual cues located within a predefined distance from the computing device from which a user is able to perceive content being presented through the computing device. For instance, the visual cue detecting module 220 of the computing device 10* detecting presence or absence of one or more visual cues in the proximate vicinity of the computing device 10* by at least detecting presence of the one or more visual cues located within a predefined distance from the computing device 10* from which a user is able to perceive content being presented through the computing device 10*. For example, if the face of the second user 30 is determined to be within a distance from the computing device 10* from which the second user 30 is able to ascertain what is displaying through the computing device 10*, than determining that the transfer of the computing device 10* has occurred from the first user 20 to the second user 30.

In the same or different implementations, operation 526 may include an operation 528 for detecting the presence or absence of the one or more visual cues in the proximate vicinity of the computing device by detecting at least a change in lighting in the proximate vicinity of the computing device that at least suggests that the computing device has at least been moved. For instance, the visual cue detecting module 220 including the lighting change detecting module 221 (see FIG. 3*c*) of the computing device 10* detecting the presence or absence of the one or more visual cues in the proximate vicinity of the computing device 10* when the lighting change detecting module 221 detects at least a change in lighting in the proximate vicinity of the computing device 10* that at least suggests that the computing device 10* has at least been moved. That is, typically when an item such as a computing device 10* is moved from one location to another location, there may be a variation in the type/amount of light being exposed to the item. Thus, by merely detecting changes in lighting conditions surrounding the computing device 10*, an inference could be made that, for example, a computing device 10* is being moved and being transferred.

In some cases, operation 528 may further include an operation 529 for detecting at least a change in lighting in the proximate vicinity of the computing device that at least suggests that the computing device has at least been moved by detecting at least a predefined amount of change in lighting in the proximate vicinity of the computing device within a predefined time period as further depicted in FIG. 5*d*. For instance, the lighting change detecting module 221 of the computing device 10* detecting at least a change in lighting in the proximate vicinity of the computing device 10* that at least suggests that the computing device 10* has at least been moved (e.g., relocated) by detecting at least a predefined amount of change in lighting in the proximate vicinity of the computing device 10* within a predefined time period (e.g., half a second, one second, two seconds, and so forth). In doing so, inconsequential lighting changes may be filtered out such as those as a result of changes in daylight, which typically occurs slowly.

In the same or different implementations, operation 526 may include an operation 530 for detecting presence or absence of the one or more visual cues in the proximate vicinity of the computing device by at least detecting presence of at least one face in the proximate vicinity of the computing device not associated with the first user. For instance, the visual cue detecting module 220 including the face detecting module 222 (see FIG. 3*c*) of the computing device 10* detecting presence or absence of the one or more visual cues in the proximate vicinity of the computing device 10* when the face detecting module 222 at least detects presence of at least one face in the proximate vicinity of the computing device 10* not associated with the first user 20*.

As further illustrated in FIG. 5*d*, operation 530, in some implementations, may include an operation 531 for detecting the presence of the at least one face in the proximate vicinity of the computing device not associated with the first user by at least detecting presence of the at least one face in the proximate vicinity of the computing device that is recognized as being associated with the second user. For instance, the face detecting module 222 of the computing device 10* detecting the presence of the at least one face in the proximate vicinity of the computing device 10* not associated with the first user 20 by at least detecting presence of the at least one face in the proximate vicinity of the computing device 10* that is recognized as being associated with the second user 30. In some cases, the computing device 10 may store in its memory 114 facial images of one or more parties (e.g., actual and/or potential users of the computing device 10*) including a facial image of the second user 30.

In some cases, operation 526 may alternatively or additionally include an operation 532 for detecting the presence or absence of the one or more visual cues in the proximate vicinity of the computing device by at least detecting presence of a first face associated with the first user and a second face associated with the second user in the proximate vicinity of the computing device, the second face being detected as being closer to the computing device than the first face. For instance, the visual cue detecting module 220 including the face detecting module 222 of the computing device 10* detecting the presence or absence of the one or more visual cues in the proximate vicinity of the computing device 10* when the face detecting module 222 at least detects presence of a first face associated with the first user 20 and a second face associated with the second user 30 in the proximate vicinity of the computing device 10*, the second face being detected as being closer to the computing device 10* than the first face of the first user 20.

In the same or different implementations, operation 526 may include an operation 533 for detecting the presence or absence of the one or more visual cues in the proximate vicinity of the computing device by detecting presence of at least one eye in the proximate vicinity of the computing device not associated with the first user as further illustrated in FIG. 5*d*. For instance, the visual cue detecting module 220 including the eye detecting module 223 (see FIG. 3*c*) of the computing device 10* detecting the presence or absence of the one or more visual cues in the proximate vicinity of the computing device 10* when the eye detecting module 223 detects presence of at least one eye (e.g., iris or retina characteristics) in the proximate vicinity of the computing device 10* not associated with the first user 20. In other words, determining that there is at least one eye having iris or retina characteristics in the proximate vicinity of the computing device 10* that is different from the iris or retina characteristics of the first user 20.

In some cases operation 533 may further include an operation 534 for detecting the presence of the at least one eye in the proximate vicinity of the computing device not associated with the first user by at least detecting presence of the at least one eye in the proximate vicinity of the computing device that is recognized as being associated with the second user. For instance, the eye detecting module 223 of the computing device 10* detecting the presence of the at least one eye in the proximate vicinity of the computing device 10* not associated with the first user 20 by at least detecting presence of the at least one eye in the proximate vicinity of the computing device 10* that is recognized as being associated with the second user 30. Thus, in some cases, the computing device 10* may store in its memory 114 images of eyes (e.g., images of irises or retinas) belonging to one or more parties including, for example, the second user 30.

Turning to FIG. 5*e*, in the same or different implementations, operation 526 may include an operation 535 for detecting the presence or absence of the one or more visual cues in the proximate vicinity of the computing device by at least detecting presence of a first one or more eyes associated with the first user and a second one or more eyes associated with the second user in the proximate vicinity of the computing device, the second one or more eyes being detected as being closer to the computing device than the first one or more eyes. For instance, the visual cue detecting module 220 including the eye detecting module 223 of the computing device 10* detecting the presence or absence of the one or more visual cues in the proximate vicinity of the computing device 10* when the eye detecting module 223 at least detects presence of a first one or more eyes associated with the first user 20 and a second one or more eyes associated with the second user 30 in the proximate vicinity of the computing device 10*, the second one or more eyes being detected as being closer to the computing device 10* than the first one or more eyes.

In the same or different implementations, operation 526 may include an operation 536 for detecting the presence or absence of the one or more visual cues in the proximate vicinity of the computing device by at least detecting absence of a visual cue associated with the first user in the proximate vicinity of the computing device as further illustrated in FIG. 5*e*. For instance, the visual cue detecting module 220 of the computing device 10* detecting the presence or absence of one or more visual cues in the proximate vicinity of the computing device 10* by at least detecting absence of a visual cue associated with the first user 20 in the proximate vicinity of the computing device 10*.

As further illustrated in FIG. 5*e*, in some implementations, operation 536 may include one or more additional operations including an operation 537 for detecting the absence of a visual cue associated with the first user in the proximate vicinity of the computing device by at least detecting absence of a face associated with the first user in the proximate vicinity of the computing device. For instance, the visual cue detecting module 220 including the face detecting module 222 of the computing device 10 detecting the absence of a visual cue associated with the first user 20 in the proximate vicinity of the computing device 10* when the face detecting module 222 at least detects absence of a face associated with the first user 20 in the proximate vicinity of the computing device 10*. For example, if the computing device 10* includes an image capturing device 204, such as a webcam, then the computing device 10* may detect the absence of the visual cue of the first user 20 when the webcam does not detect the face of the first user 20* near the computing device 10*(e.g., within 5 feet, 10 feet, 12 feet, or within some other distance from the computing device 10* that a face of the first user 20 can be detected/identified by the computing device 10*).

In the same or different implementations, operation 536 may include an operation 538 for detecting the absence of a visual cue associated with the first user in the proximate vicinity of the computing device by at least detecting absence of one or more eyes associated with the first user in the proximate vicinity of the computing device as further depicted in FIG. 5*e*. For instance, the visual cue detecting module 220 including the eye detecting module 223 of the computing device 10* detecting the absence of a visual cue associated with the first user 20 in the proximate vicinity of the computing device 10* when the eye detecting module 223 at least detects absence of one or more eyes associated with the first user 20 in the proximate vicinity of the computing device 10*. For example, if the computing device 10* includes an image capturing device 204, then the computing device 10* may detect the absence of the visual cue of the first user 20 when the image capturing device 204 does not detect the one or more eyes of the first user 20* near the computing device 10*(e.g., within 2 feet, 4 feet, 6 feet, or within some other distance from the computing device 10* that an eyeball of the first user 20 can be detected/identified by the computing device 10*).

In various implementations, operation 526 for determining that the computing device has been transferred from the first user to the second user by at least detecting presence or absence of one or more visual cues in proximate vicinity of the computing device that at least suggest that the computing device has been transferred from the first user to the second user may further include an operation 539 for detecting the presence or absence of the one or more visual cues in the proximate vicinity of the computing device by at least detecting visually that the computing device has moved away from the first user as further depicted in FIG. 5*e*. For instance, the visual cue detecting module 220 including the visual moving away detecting module 224 of the computing device 10* detecting the presence or absence of one or more visual cues in the proximate vicinity of the computing device 10* when the visual moving away detecting module 224 at least detects visually (e.g., via an image capturing device 204) that the computing device 10* has moved away from the first user 20 (e.g., has moved away from a face or an eye of the first user 20).

In the same or alternative implementations, operation 526 may additionally or alternatively include an operation 540 for detecting the presence or absence of the one or more visual cues in the proximate vicinity of the computing device by at least detecting visually that the computing device has moved closer to the second user. For instance, the visual cue detecting module 220 including the visual moving closer detecting module 225 (see FIG. 3*c*) of the computing device 10* detecting the presence or absence of one or more visual cues in the proximate vicinity of the computing device 10* when the visual moving closer detecting module 225 at least detects visually that the computing device 10* has moved closer to the second user 30 (e.g., has moved closer to a face or an eye of the second user 30).

In various implementations, the transfer determining operation 402 of FIG. 4 for determining that a computing device that was in possession of a first user has been transferred from the first user to a second user, the determining including at least partially identifying the second user and the computing device being designed for presenting one or more items may involve making the transfer determination based on one or more audio cues. For example, and as illustrated in FIG. 5*f*, in some implementations, the transfer determining operation 402 may include an operation 541 for determining that the computing device has been transferred from the first user to the second user by at least detecting presence or absence of one or more audio cues in proximate vicinity of the computing device that at least suggest that the computing device has been transferred from the first user to the second user. For instance, the transfer determining module 102* including the audio cue detecting module 226 (see FIG. 3*c*) of the computing device 10* determining that the computing device 10* has been transferred from the first user 20 to the second user 30 when the audio cue detecting module 226 at least detects presence or absence of one or more audio cues (e.g., audio cues associated with the first user 20 or the second user 30) in proximate vicinity of the computing device 10* that at least suggest that the computing device 10* has been transferred from the first user 20 to the second user 30.

As further illustrated in 5*f*, operation 541 may include one or more additional operations in various alternative implementations. For example, in some implementations, operation 541 may include an operation 542 for detecting the presence or absence of the one or more audio cues in the proximate vicinity of the computing device by at least detecting absence of an audio voice pattern associated with the first user in the proximate vicinity of the computing device. For instance, the audio cue detecting module 226 including the voice pattern detecting module 227 (see FIG. 3*c*) of the computing device 10* detecting the presence or absence of the one or more audio cues in the proximate vicinity of the computing device 10* when the voice pattern detecting module 227 at least detects absence of an audio voice pattern associated with the first user 20 in the proximate vicinity (e.g., within 10 feet or within some other distance from which voice of the first user 20 is at least clearly discernable) of the computing device 10*.

In the same or different implementations, operation 541 may include an operation 543 for detecting the presence or absence of the one or more audio cues in the proximate vicinity of the computing device by at least detecting presence of at least one audio voice pattern not associated with the first user in the proximate vicinity of the computing device. For instance, the audio cue detecting module 226 including the voice pattern detecting module 227 of the computing device 10* detecting the presence or absence of the one or more audio cues in the proximate vicinity of the computing device 10* when the voice pattern detecting module 227 at least detects presence of at least one audio voice pattern not associated with the first user 20 in the proximate vicinity (e.g., within 5 feet or within some other distance from which voice of the second user 30 is at least clearly discernable or identifiable) of the computing device 10*.

As further illustrated in FIG. 5*f*, in some cases, operation 543 may further include an operation 544 for detecting the presence of the at least one audio voice pattern not associated with the first user in the proximate vicinity of the computing device by at least detecting presence of at least one audio voice pattern that is recognized as being associated with the second user in the proximate vicinity of the computing device. For instance, the voice pattern detecting module 227 of the computing device 10* detecting the presence of the at least one audio voice pattern not associated with the first user 20 in the proximate vicinity of the computing device 10* by at least detecting presence of at least one audio voice pattern that is recognized as being associated with the second user 30 in the proximate vicinity of the computing device 10*.

In the same or different implementations, operation 541 may include an operation 545 for detecting the presence or absence of the one or more audio cues in the proximate vicinity of the computing device by at least detecting audibly that the computing device has moved away from the first user. For instance, the audio cue detecting module 226 including the audio moving away detecting module 228 (see FIG. 3*c*) of the computing device 10* detecting the presence or absence of the one or more audio cues in the proximate vicinity of the computing device 10* when the audio moving away detecting module 228 at least detects audibly that the computing device 10* has moved away from the first user 20. For example, the audio moving away detecting module 228 detecting that the volume of an audio cue, such as a voice pattern, that is associated with the first user 20 is diminishing or has diminished, which would be an inference that the computing device 10* may be moving away from the first user 20. Note the phrase "moving away" does not necessarily require that the computing device 10* be in motion and moving away from the first user 20. For example, in some cases, the first user 20 may be in motion and may be moving away from the computing device 10*, which may be stationary. In other cases, both the computing device 10* and the first user 20 may both be in motion and may be moving away from each other. In other cases, of course, the computing device 10* may be in motion and may be moving away from the first user 20.

In the same or different implementations, operation 541 may include an operation 546 for detecting the presence or absence of the one or more audio cues in the proximate vicinity of the computing device by at least detecting audibly that the computing device has moved closer to the second user. For instance, the audio cue detecting module 226 including the audio moving closer detecting module 229 (see FIG. 3*c*) of the computing device 10* detecting the presence or absence of the one or more audio cues in the proximate vicinity of the computing device 10* when the audio moving closer detecting module 229 at least detects audibly that the computing device 10* has moved closer to the second user 30. Note that the phrase "moved closer", similar to the phrase "moving closer" above, does not necessarily require that the computing device 10* be in motion and moving closer to a stationary second user 30. Instead, the phrase "moved closer" is used herein in reference to situations where the computing device 10* and the second user 30 are merely coming closer together.

In various implementations, the transfer determining operation 402 of FIG. 4 for determining that a computing device that was in possession of a first user has been transferred from the first user to a second user, the determining including at least partially identifying the second user and the computing device being designed for presenting one or more items may involve determining the transfer of the computing device 10* based on a combination of detecting movements of the computing device 10*, detecting visual cues, and/or detecting audio cues. For example, in some implementations, the transfer determining operation 402 may include an operation 547 for determining that the computing device has been transferred from the first user to the second user by detecting presence or absence of one or more visual cues in proximate vicinity of the computing device and by detecting that the computing device has exhibited one or more movements that at least suggest that the computing device has been transferred from the first user to the second user as illustrated in FIG. 5*g*. For instance, the transfer determining module 102* including the particular movement detecting module 210 and the visual cue detecting module 220 of the computing device 10* determining that the computing device 10* has been transferred from the first user 20 to the second user 30 when the visual cue detecting module 220 detects presence or absence of one or more visual cues in proximate vicinity of the computing device and when the particular movement detecting module 210 detects that the computing device 10* has exhibited one or more movements that at least suggest that the computing device 10* has been transferred from the first user 20 to the second user 30.

In some alternative implementations, the transfer determination operation 402 may alternatively include an operation 548 for determining that the computing device has been transferred from the first user to the second user by detecting presence or absence of one or more visual cues and one or more audio cues in proximate vicinity of the computing device and by detecting that the computing device has exhibited one or more movements that at least suggest that the computing device has been transferred from the first user to the second user. For instance, the transfer determining module 102* including the visual cue detecting module 220, the audio cue detecting module 226, and the particular movement detecting module 210 of the computing device 10* determining that the computing device 10* has been transferred from the first user 20 to the second user 30 when the visual cue detecting module 220 and the audio cue detecting module 226 detects presence or absence of one or more visual cues and one or more audio cues in proximate vicinity of the computing device 10* and when the particular movement detecting module 210 detects that the computing device 10* has exhibited one or more movements that at least suggest that the computing device 10* has been transferred from the first user 20 to the second user 30.

In some alternative implementations, the transfer determining operation 402 may include an operation 549 for determining that the computing device has been transferred from the first user to the second user by detecting presence or absence of one or more visual cues and one or more audio cues in proximate vicinity of the computing device that at least suggest that the computing device has been transferred from the first user to the second user as further depicted in FIG. 5*g*. For instance, the transfer determining module 102* including the visual cue detecting module 220 and the audio cue detecting module 226 of the computing device 10* determining that the computing device 10* has been transferred from the first user 20 to the second user 30 when the visual cue detecting module 220 and the audio cue detecting module 226 detects presence or absence of one or more visual cues and one or more audio cues in proximate vicinity of the computing device 10* that at least suggest that the computing device 10* has been transferred from the first user 20 to the second user 30.

In some alternative implementations, the transfer determining operation 402 may include an operation 550 for determining that the computing device has been transferred from the first user to the second user by detecting presence or absence of one or more audio cues in proximate vicinity of the computing device and by detecting that the computing device has exhibited one or more movements that at least suggest that the computing device has been transferred from the first user to the second user. For instance, the transfer detecting module 102* including the audio cue detecting module 226 and the particular movement detecting module 210 of the computing device 10* determining that the computing device 10* has been transferred from the first user 20 to the second user 30 when the audio cue detecting module 226 detects presence or absence of one or more audio cues in proximate vicinity of the computing device 10* and when the particular movement detecting module 210 detects that the computing device 10* has exhibited one or more movements that at least suggest that the computing device 10* has been transferred from the first user 20 to the second user 30.

Referring now to FIG. 5*h*, in various implementations, the transfer determining operation 402 may include an operation 551 for identifying at least partially the second user by identifying the second user based, at least in part, on data provided by one or more movement sensors, one or more image capturing devices, and/or one or more audio capturing devices. For instance, the user identifying module 230*(see FIG. 3*c*) of the computing device 10* identifying at least partially the second user 30 by identifying the second user 30 based, at least in part, on data provided by one or more movement sensors 202, one or more image capturing devices 204, and/or one or more audio capturing devices 206.

As further illustrated in FIG. 5*h*, the transfer determining operation 402 may additionally or alternatively include an operation 552 for identifying at least partially the second user by at least determining that the second user is a different user from the first user. For instance, the user identifying module 230* including the different user determining module 231 (see FIG. 3*c*) of the computing device 10* identifying at least partially the second user 30 when the different user determining module 231 at least determines that the second user 30 is a different user from the first user 20. Such an operation may be executed, for example, by determining that the detected biometric characteristics (e.g., voice pattern or facial or retinal characteristics) of the second user 30 do not match with previously detected or known biometric characteristics of the first user 20.

In the same or different implementations, the transfer determining operation 402 may include an operation 553 for identifying at least partially the second user by at least determining that the second user is a registered user who is registered with the computing device. For instance, the user identifying module 230* including the registered user determining module 232 (see FIG. 3*c*) of the computing device 10* identifying at least partially the second user 30 when the registered user determining module 232 at least determines that the second user 30 is a registered user who is registered with the computing device 10*. In some cases, a user may have registered with the computing device 10* by registering his or her name, biometric characteristics, and/or personal presentation preferences (e.g., formatting preferences for viewing and/or listening content through the computing device 10* including font style/size preferences, display characteristics preferences such as brightness and/or color, audio volume preferences, and so forth) with the computing device 10*.

As further illustrated in FIG. 5*h*, operation 553 may include one or more additional operations in various alternative implementations. For example, in some implementations, operation 553 may include an operation 554 for determining that the second user is a registered user by acquiring the second user's one or more identification credentials and determining that the second user's one or more identification credentials are registered with the computing device. For instance, the registered user determining module 232 including the identification (ID) credential acquiring module 233 (see FIG. 3*c*) of the computing device 10* determining that the second user 30 is a registered user by having the ID credential acquiring module 233 acquire the second user's one or more identification credentials (e.g., biometric characteristics such as the second user's facial or retinal characteristics) and determining that the second user's one or more identification credentials are registered with the computing device 10*.

In some cases, operation 554 may include an operation 555 for acquiring the second user's one or more biometric identification credentials and determining that the second user's one or more biometric identification credentials are at least registered with the computing device. For instance, the biometric credential acquiring module 234 (see FIG. 3*c*) of the computing device 10* acquiring the second user's one or more biometric identification credentials (e.g., retinal characteristics or voice pattern) and the registered user determining module 232 of the computing device 10* determining that the second user's one or more biometric identification credentials are at least registered with the computing device 10*.

In various implementations, operation 555 may further include an operation 556 for acquiring the second user's one or more facial and/or retinal profiles and determining that the second user's one or more facial and/or retinal profiles are at least registered with the computing device. For instance, the biometric credential acquiring module 234 of the computing device 10* acquiring the second user's one or more facial and/or retinal profiles (e.g., digital pictures of the second user's face or retinas) and the registered user determining module 232 of the computing device 10* determining that the second user's one or more facial and/or retinal profiles are at least registered with the computing device 10*.

In the same or different implementations, operation 555 may alternatively or additionally include an operation 557 for acquiring the second user's one or more signature voice patterns and determining that the second user's one or more signature voice patterns are at least registered with the computing device. For instance, the biometric credential acquiring module 234 of the computing device 10* acquiring the second user's one or more signature voice patterns (e.g., audio voice recording) and the registered user determining module 232 of the computing device 10* determining that the second user's one or more signature voice patterns are at least registered with the computing device 10*.

In the same or different implementations, operation 555 may alternatively or additionally include an operation 558 for acquiring the second user's one or more signature movement patterns and determining that the second user's one or more signature movement patterns are at least registered with the computing device. For instance, the biometric credential acquiring module 234 of the computing device 10* acquiring the second user's one or more signature movement patterns (e.g., heart/pulse rate, or a secret personal gesture movement that is only known by the second user 30) and the registered user determining module 232 of the computing device 10* determining that the second user's one or more signature movement patterns are at least registered with the computing device 10*.

In the same or alternative implementations, operation 553 for identifying at least partially the second user by at least determining that the second user is a registered user who is registered with the computing device may include an operation 559 for determining that the second user is a registered user by determining that one or more presentation preferences associated with the second user are registered with the computing device, the one or more presentation preferences being one or more preferences for how the one or more items are to be preferably presented via the computing device. For instance, the registered user determining module 232 including the registered preference determining module 235 (see FIG. 3*c*) of the computing device 10* determining that the second user 30 is a registered user when the registered preference determining module 235 determines that one or more presentation preferences 174 (see FIGS. 3*a* and 3*b*) associated with the second user 30 are registered with the computing device 10*, the one or more presentation preferences 174 being one or more preferences for how the one or more items are to be preferably presented via the computing device 10*. In various implementations, the one or more presentation preferences 174 may relate to font style/size preferences, display preferences including brightness, hue, and/or tint preferences, color preferences (to accommodate users who are color blind), audio volume preferences, and so forth.

As further illustrated in FIG. 5*h*, in some cases, operation 559 may further include an operation 560 for determining that the one or more presentation preferences associated with the second user are registered with the computing device, the one or more presentation preferences being one or more preferences for how the one or more items are to be preferably viewed and/or heard via the computing device. For instance, the registered preference determining module 235 of the computing device 10* determining that the one or more presentation preferences 174 associated with the second user 30 are registered with the computing device 10*, the one or more presentation preferences 174 being one or more preferences for how the one or more items are to be preferably viewed and/or heard via the computing device 10*. For example, the presentation preferences 174, in some cases, may be provided by a third party or by the first user 20 (rather than set provided by the second user 30).

In the same or different implementations, operation 559 may alternatively or additionally include an operation 561 for determining that the one or more presentation preferences associated with the second user are registered with the computing device, the one or more presentation preferences being one or more preferences of the second user for how the one or more items are to be preferably presented via the computing device. For instance, the registered preference determining module 235 of the computing device 10* determining that the one or more presentation preferences associated with the second user 30 are registered with the computing device 10*, the one or more presentation preferences 174 being one or more preferences of the second user 30 for how the one or more items are to be preferably presented via the computing device 10*. Thus, in some cases, the second user 30 may have previously registered (e.g., previously entered or inputted) such preferences with the computing device 10*. For example if the second user 30 was a primary user (e.g., a person having superior access rights to the computing device 10* than other users) or an owner of the computing device 10*, then the second user 30 may have previously registered his/her presentation preferences.

Referring back to the particular format presenting operation 404 of FIG. 4, the particular format presenting operation 404 similar to the transfer determining operation 402 of FIG. 4 may be executed in a number of different ways in various alternative embodiments as illustrated in FIGS. 6*a*, 6*b*, 6*c*, and 6*d*. In some implementations, for example, the particular format presenting operation 404 of FIG. 4 may include an operation 662 for presenting visually via the computing device the one or more items in the one or more particular formats as depicted in FIG. 6*a*. For instance, the particular format presenting module 104* of the computing device 10* presenting visually via the computing device 10* (e.g., display via a display device such as a touchscreen) the one or more items (e.g., image or video files, textual documents, application interface, passwords, spreadsheet documents, websites, homepage, and so forth) in the one or more particular formats.

In some implementations, the particular format presenting operation 404 of FIG. 4 may include an operation 663 for presenting audibly via the computing device the one or more items in the one or more particular formats as further depicted in FIG. 6*a*. For instance, the particular format presenting module 104* of the computing device 10* presenting audibly via the computing device 10*(e.g., audibly presenting via one or more speakers) the one or more items (e.g., audio files, video files, voice messages, and so forth) in the one or more particular formats (e.g., volume level).

As further illustrated in FIG. 6*a*, in some cases, operation 663 may further include an operation 664 for presenting audibly and visually via the computing device the one or more items in the one or more particular formats. For instance, the particular format presenting module 104* of the computing device 10* presenting audibly and visually via the computing device 10* the one or more items (e.g., video files) in the one or more particular formats.

In various implementations, the particular format presenting operation 404 may include an operation 665 for presenting via the computing device the one or more items in the one or more particular formats by presenting one or more electronic items in the one or more particular formats. For instance, the particular format presenting module 104* of the computing device 10* presenting via the computing device 10* the one or more items in the one or more particular formats by presenting one or more electronic items (e.g., audio, video, and/or image files, word processing documents, spreadsheet documents, application interface, electronic passwords, software applications including gaming, productivity, and/or communication applications, and so forth) in the one or more particular formats.

As further illustrated in FIG. 6*a*, operation 665 may include one or more additional operations including, for example, an operation 666 for presenting the one or more electronic items in the one or more particular formats by presenting one or more electronic files or documents in the one or more particular formats. For instance, the particular format presenting module 104* of the computing device 10* presenting the one or more electronic items in the one or more particular formats by presenting one or more electronic files or documents (e.g., productivity documents such as word processing documents or spreadsheet documents, image or audio files, and so forth) in the one or more particular formats.

In the same or different implementations, operation 665 may include an operation 667 for presenting the one or more electronic items in the one or more particular formats by presenting one or more image and/or audio files in the one or more particular formats. For instance, the particular format presenting module 104* of the computing device 10* presenting the one or more electronic items in the one or more particular formats by presenting one or more image and/or audio files (e.g., digital photos, audio recordings, voice messages, and so forth) in the one or more particular formats.

In the same or different implementations, operation 665 may include an operation 668 for presenting the one or more electronic items in the one or more particular formats by presenting one or more applications in the one or more particular formats. For instance, the particular format presenting module 104* of the computing device 10* presenting the one or more electronic items in the one or more particular formats by presenting one or more applications (e.g., software applications including gaming applications, communication applications, and/or productivity applications) in the one or more particular formats.

In some cases, operation 668 may further include an operation 669 for presenting the one or more electronic items in the one or more particular formats by presenting one or more application interfaces in the one or more particular formats. For instance, the particular format presenting module 104* of the computing device 10* presenting the one or more electronic items in the one or more particular formats by presenting (e.g., displaying) one or more application interfaces (e.g., modified application interfaces) in the one or more particular formats. For example, displaying an application interface that has been modified so that one or more functionalities are not available or modifying portions (e.g., making a menu or drop down menu bigger of the application interface so that it is easier to use.

In the same or different implementations, operation 665 may include an operation 670 for presenting the one or more electronic items in the one or more particular formats by presenting one or more credentials in the one or more particular formats. For instance, the particular format presenting module 104* of the computing device 10* presenting the one or more electronic items in the one or more particular formats by presenting one or more electronic credentials (e.g., electronic passwords that cannot be copied or duplicated) in the one or more particular formats.

Referring to FIG. 6*b*, in some implementations, the particular format presenting operation 404 of FIG. 4 may include an operation 671 for presenting via the computing device the one or more items in the one or more particular formats by presenting the one or more items in one or more particular visual and/or audio formats that was selected based, at least in part, on said determining. For instance, the particular format presenting module 104* including the format selecting module 240 (see FIG. 3*d*) of the computing device 10* presenting via the computing device 10* the one or more items in the one or more particular formats by presenting the one or more items in one or more particular visual and/or audio formats that was selected by the format selecting module 240 based, at least in part, on said determining that the computing device 10* was transferred from the first user 20 to the second user 30, the determining including at least partially identifying the second user 30.

In some implementations, operation 671 may include an operation 672 for presenting the one or more items in the one or more particular visual and/or audio formats by presenting the one or more items to include text that is presented in one or more particular font styles and/or sizes that was selected based, at least in part, on said determining as further illustrated in FIG. 6*b*. For instance, the particular format presenting module 104* including the format selecting module 240 of the computing device 10* presenting the one or more items in the one or more particular visual and/or audio formats by presenting the one or more items to include text that is presented in one or more particular font styles and/or sizes that was selected by the format selecting module 240 based, at least in part, on said determining that the computing device 10* was transferred from the first user 20 to the second user 30, the determining including at least partially identifying the second user 30.

In the same or different implementations, operation 671 may include an operation 673 for presenting the one or more items in the one or more particular visual and/or audio formats by presenting the one or more items in one or more particular color schemes that was selected based, at least in part, on said determining. For instance, the particular format presenting module 104* including the format selecting module 240 of the computing device 10* presenting the one or more items in the one or more particular visual and/or audio formats by presenting the one or more items in one or more particular color schemes that was selected by the format selecting module 240 based, at least in part, on said determining that the computing device 10* was transferred from the first user 20 to the second user 30, the determining including at least partially identifying the second user 30.

In the same or different implementations, operation 671 may include an operation 674 for presenting the one or more items in the one or more particular visual and/or audio formats by presenting the one or more items in one or more particular audio schemes that was selected based, at least in part, on said determining. For instance, the particular format presenting module 104* including the format selecting module 240 of the computing device 10* presenting the one or more items in the one or more particular visual and/or audio formats by presenting the one or more items in one or more particular audio schemes that was selected by the format selecting module 240 based, at least in part, on said determining that the computing device 10* was transferred from the first user 20 to the second user 30, the determining including at least partially identifying the second user 30.

In various implementations, the particular format presenting operation 404 of FIG. 4 may include an operation 675 for presenting via the computing device the one or more items in one or more particular formats by presenting the one or more items with one or more modifications, the one or more modifications being selected based, at least in part, on said determining, the one or more items in the one or more modified forms to include one or more selective portions of the one or more items that have been selectively modified based, at least in part, on said determining. For instance, the particular format presenting module 104* including the modified form presenting module 242 (see FIG. 3*d*) of the computing device 10* presenting via the computing device 10* the one or more items in the one or more particular formats by having the modified form presenting module 242 present the one or more items with one or more modifications, the one or more modifications being selected (by the format selecting module 240) based, at least in part, on said determining, the one or more items in the one or more modified forms to include one or more selective portions of the one or more items that have been selectively modified based, at least in part, on said determining that the computing device 10* was transferred from the first user 20 to the second user 30, the determining including at least partially identifying the second user 30.

As a further illustration, referring now to FIG. 7*a*, which illustrates an example item 702*a* being displayed by the computing device 10* through a display device 12 (e.g. a display monitor or screen). In this example, the example item 702*a* being a web page having multiple sections or portions. Included in the example item 702*a* is a menu portion 704*a*, which allows a user to navigate to related linked pages. Turning now to FIG. 7*b*, which illustrates a modified version (illustrated as example item 702*b*) of the example item 702*a* of FIG. 7*a*. In particular, the menu portion 704*a* has been modified (depicted as menu portion 704*b*) to include text having a larger and bolded font. This may help for example, a second user 30 to better see and select the text included in the modified menu portion 704*b* of the modified example item 702*b*.

As further illustrated in FIG. 6*b*, operation 675 may include one or more additional operations in various alternative implementations. For example, in various implementations, operation 675 may include an operation 676 for presenting the one or more items with the one or more modifications by presenting the one or more items to exclude one or more selective portions of the one or more items that have been selectively deleted based, at least in part, on said determining. For instance, the modified form presenting module 242 of the computing device 10* presenting the one or more items with the one or more modifications by presenting the one or more items to exclude one or more selective portions of the one or more items that have been selectively deleted based, at least in part, on said determining that the computing device 10* was transferred from the first user 20 to the second user 30, the determining including at least partially identifying the second user 30. For example, FIG. 7*c* illustrates a modified version (illustrated as example item 702*c*) of the example item 702*a* of FIG. 7*a* in which a selected portion (e.g., menu portion 704*a*) of the example item 702*c* has been deleted.

In the same or different implementations, operation 675 may additionally or alternatively include an operation 677 for presenting the one or more items with the one or more modifications by presenting the one or more items to include one or more substitutes for one or more selective portions of the one or more items that have been selectively replaced based, at least in part, on said determining as further depicted in FIG. 6*b*. For instance, the modified form presenting module 242 of the computing device 10* presenting the one or more items with the one or more modifications by presenting the one or more items to include one or more substitutes for one or more selective portions of the one or more items that have been selectively replaced based, at least in part, on said determining that the computing device 10* was transferred from the first user 20 to the second user 30, the determining including at least partially identifying the second user 30. For example, FIG. 7*d* illustrates a modified version (illustrated as example item 702*d*) of the example item 702*a* of FIG. 7*a* in which two portions of original example item 702*a* have been replaced with two replacements 706*a* and 706*b* (e.g., in the case where the second user 30, for example, is primarily interested in sports rather than general news).

In the same or different implementations, operation 675 may alternatively or additionally include an operation 678 for presenting the one or more items with the one or more modifications by presenting the one or more items to include one or more additions that have been selectively added to the one or more items based, at least in part, on said determining. For instance, the modified form presenting module 242 of the computing device 10* presenting the one or more items with the one or more modifications by presenting the one or more items to include one or more additions that have been selectively added to the one or more items based, at least in part, on said determining that the computing device 10* was transferred from the first user 20 to the second user 30, the determining including at least partially identifying the second user 30. An example result of such an operation would be, for example, the inverse of FIGS. 7*a* and 7*c*. That is, instead of deleting menu portion 704*a*, adding the menu portion 704*a* to the example item 702*c* of FIG. 7*c*.

In the same or different implementations, operation 675 may alternatively or additionally include an operation 679 for presenting the one or more items with the one or more modifications by presenting the one or more items to include one or more portions that have been selectively altered based, at least in part, on said determining. For instance, the modified form presenting module 242 of the computing device 10* presenting the one or more items with the one or more modifications by presenting the one or more items to include one or more portions that have been selectively altered based, at least in part, on said determining that the computing device 10* was transferred from the first user 20 to the second user 30, the determining including at least partially identifying the second user 30.

Referring now to FIG. 6*c*, in various implementations, the particular format presenting operation 404 of FIG. 4 may include an operation 680 for presenting the one or more items in the one or more particular formats by presenting the one or more items through a user interface that has been particularly configured to present the one or more items in one or more particular ways, the user interface being particularly configured based, at least in part, on said determining. For instance, the particular format presenting module 104* including the user interface configuring module 244 (see FIG. 3*d*) of the computing device 10* presenting the one or more items in the one or more particular formats by presenting the one or more items through a user interface 110 (e.g., a display device and/or speaker) that has been particularly configured by the user interface configuring module 244 to present the one or more items in one or more particular ways (e.g., particular brightness, color, tint, audio volume, and so forth), the user interface 110 being particularly configured based, at least in part, on said determining that the computing device 10* was transferred from the first user 20 to the second user 30, the determining including at least partially identifying the second user 30.

In some implementations, operation 680 may further include an operation 681 for presenting the one or more items through the user interface that has been particularly configured to present the one or more items in the one or more particular ways, the user interface to be visually configured in one or more particular ways based, at least in part, on said determining. For instance, the particular format presenting module 104* including the user interface configuring module 244 of the computing device 10* presenting the one or more items through the user interface 110 (e.g., a touchscreen) that has been particularly configured by the user interface configuring module 244 to present the one or more items in the one or more particular ways, the user interface 110 to be visually configured in one or more particular ways based, at least in part, on said determining.

In the same or different implementations, operation 680 may additionally or alternatively include an operation 682 for presenting the one or more items through the user interface that has been particularly configured to present the one or more items in the one or more particular ways, the user interface to be audibly configured in one or more particular ways based, at least in part, on said determining. For instance, the particular format presenting module 104* including the user interface configuring module 244 of the computing device 10* presenting the one or more items through the user interface 110 (e.g., speakers) that has been particularly configured by the user interface configuring module 244 to present the one or more items in the one or more particular ways, the user interface 110 to be audibly configured in one or more particular ways based, at least in part, on said determining.

In the same or different implementations, the particular format presenting operation 404 of FIG. 4 may include an operation 683 for presenting the one or more items in the one or more particular formats by presenting the one or more items in one or more formats that were selected based, at least in part, on determined identity of the second user and ascertaining which one or more formats are associated with the identity of the second user. For instance, the particular format presenting module 104* including the format selecting module 240 (see FIG. 3*d*) of the computing device 10* presenting the one or more items in the one or more particular formats by presenting the one or more items in one or more formats that were selected by the format selecting module 240 based, at least in part, on determined identity of the second user 30 (as determined by, for example, the user identifying module 230*) and ascertaining which one or more formats are associated with the identity of the second user 30. For example, the computing device 10* or the logic endowed with the computing device 10*, upon at least partially identifying the second user 30*, may search through its memory 114 for one or more presentation preferences 174 (see FIG. 3*a* or 3*b*) that are associated with the second user 30 and to apply one or more formats to the one or more items as dictated by the one or more presentation preferences 174 of the second user 30.

A presentation preference 174 may indicate how one or more items may be preferably presented (e.g., preferable format) via, for example, the computing device 10*. Note that the one or more presentation preferences 174 of the second user 30 may or may not be the actual preferences of the second user 30. That is, in some cases, the one or more presentation preferences 174 of the second user 30 may be the preferences of another party. For example, if the first user 20 is the primary user or owner of the computing device 10*, then the one or more presentation preferences 174 of the second user 30 may be the preferences of the first user 20 as to how the first user 20 wishes the one or more items to be presented to the second user 30 via the computing device 10*. On the other hand, if the second user 30 is the primary user or owner of the computing device 10* then the one or more presentation preferences 174 of the second user 30 may actually be the preferences of the second user 30.

Accordingly and as further illustrated in FIG. 6*c*, in some cases, the particular format presenting operation 404 of FIG. 4 may include an operation 684 for presenting the one or more items in the one or more formats that were selected based, at least in part, on said determining, the one or more formats being selected based on one or more presentation preferences associated with the second user, the one or more presentation preferences being one or more preferences for how the one or more items are to be preferably presented via the computing device. For instance, the particular format presenting module 104* including the format selecting module 240 of the computing device 10* presenting the one or more items in the one or more formats that were selected by the format selecting module 240 based, at least in part, on said determining that the computing device 10* was transferred from the first user 20 to the second user 30, the determining including at least partially identifying the second user 30, the one or more formats being selected by the format selecting module 240 based on one or more presentation preferences 174 associated with the second user 30, the one or more presentation preferences 174 being one or more preferences for how the one or more items are to be preferably presented via the computing device 10*.

As further illustrated in FIG. 6*c*, in some implementations, operation 684 may further include an operation 685 for presenting the one or more items in the one or more formats that were selected based, at least in part, on said determining, the one or more formats being selected based on one or more presentation preferences provided by the second user. For instance, the particular format presenting module 104* including the format selecting module 240 of the computing device 10* presenting the one or more items in the one or more formats that were selected by the format selecting module 240 based, at least in part, on said determining that the computing device 10* was transferred from the first user 20 to the second user 30, the determining including at least partially identifying the second user 30, the one or more formats being selected by the format selecting module 240 based on one or more presentation preferences 174 provided by the second user 30 (e.g., a primary user or an owner of the computing device 10*).

Turning now to FIG. 6*d*, in various implementations, the particular format presenting operation 404 of FIG. 4 may include an operation 686 for presenting the one or more items in the one or more particular formats in response, at least in part, to said determining, the one or more particular formats being selected based, at least in part, on detected location of the second user relative to the computing device. For instance, the particular format presenting module 104* including the format selecting module 240 and the user location determining module 248 (see FIG. 3*d*) of the computing device 10* presenting the one or more items in the one or more particular formats in response, at least in part, to said determining, the one or more particular formats being selected by the format selecting module 240 based, at least in part, on detected location of the second user 30 relative to the computing device 10* as detected by the user location determining module 248.

In various implementations, operation 686 may include one or more additional operations in various alternative implementations. For example, in some implementations, operation 686 may include an operation 687 for presenting the one or more items in the one or more particular formats in response, at least in part, to said determining, the one or more particular formats being selected based, at least in part, on detected location of the second user relative to front-side of the computing device, the front-side of the computing device being a side of the computing device having a display device. For instance, the particular format presenting module 104* including the format selecting module 240 and the user location determining module 248 of the computing device 10* presenting the one or more items in the one or more particular formats in response, at least in part, to said determining that the computing device 10* was transferred from the first user 20 to the second user 30, the determining including at least partially identifying the second user 30, the one or more particular formats being selected by the format selecting module 240 based, at least in part, on detected location (e.g., as detected by the user location determining module 248) of the second user 30 relative to front-side 17*a* of the computing device 10*, the front-side 17*a* of the computing device 10* being a side of the computing device 10* having a display device 12 (e.g., a touchscreen or a LCD).

In some cases, operation 687 may further include an operation 688 for presenting the one or more items in the one or more particular formats in response, at least in part, to said determining, the one or more particular formats being selected based, at least in part, on detected location or locations of one or more features of the second user relative to the front-side of the computing device. For instance, the particular format presenting module 104* including the format selecting module 240 and the user location determining module 248 of the computing device 10* presenting the one or more items in the one or more particular formats in response, at least in part, to said determining that the computing device 10* was transferred from the first user 20 to the second user 30, the determining including at least partially identifying the second user 30, the one or more particular formats being selected by the format selecting module 240 based, at least in part, on detected location or locations (e.g., as detected by the user location determining module 248) of one or more features of the second user 30 relative to the front-side 17*a* of the computing device 10*.

As further illustrated in FIG. 6*d*, operation 688 may include one or more additional operations in various alternative implementations. For example, in some implementations, operation 688 may include an operation 689 for presenting the one or more items in the one or more particular formats in response, at least in part, to said determining, the one or more particular formats being selected based, at least in part, on detected angular location or locations of the one or more features of the second user relative to the front-side of the computing device. For instance, the particular format presenting module 104* including the format selecting module 240 and the user location determining module 248 of the computing device 10* presenting the one or more items in the one or more particular formats in response, at least in part, to said determining that the computing device 10* was transferred from the first user 20 to the second user 30, the determining including at least partially identifying the second user 30, the one or more particular formats being selected by the format selecting module 240 based, at least in part, on detected angular location or locations (e.g., as detected by the user location determining module 248) of the one or more features (e.g., a face or an eye) of the second user 30 relative to the front-side 17*a* of the computing device 10*. For example, if the user location determining module 248 determines that the face or the eyes of the second user 30 is not located directly in front of the display device 12, but instead, is determined to be located on the periphery, or side of the display device 12, then the format selecting module 240 may accordingly select the best color scheme or brightness level (e.g. formats) for the one or more items to be displayed through the display device 12 that will allow the second user 30 to see the one or more items even though the second user 30 will be viewing the items from an angle.

In the same or different implementations, operation 688 may include an operation 690 for presenting the one or more items in the one or more particular formats in response, at least in part, to said determining, the one or more particular formats being selected based, at least in part, on detected distance between the one or more features of the second user and the front-side of the computing device. For instance, the particular format presenting module 104* including the format selecting module 240 and the user location determining module 248 of the computing device 10* presenting the one or more items in the one or more particular formats in response, at least in part, to said determining that the computing device 10* was transferred from the first user 20 to the second user 30, the determining including at least partially identifying the second user 30, the one or more particular formats being selected by the format selecting module 240 based, at least in part, on detected distance (e.g., as detected by the user location determining module 248) between the one or more features of the second user 30 and the front-side 17*a* of the computing device 10*. For example, increasing the font size of the one or more items or increasing brightness of the display device 12 through which the one or more items are to be displayed if the face of the second user 30 is determined, by the user location determining module 248 as being relatively "far away" from the front-side 17*a* of the computing device 10*.

In the same or different implementations, operation 688 may include an operation 691 for presenting the one or more items in the one or more particular formats in response, at least in part, to said determining, the one or more particular formats being selected based, at least in part, on detected location or locations of one or more eyes of the second user relative to the front-side of the computing device. For instance, the particular format presenting module 104* including the format selecting module 240 and the user location determining module 248 of the computing device 10* presenting the one or more items in the one or more particular formats in response, at least in part, to said determining that the computing device 10* was transferred from the first user

20 to the second user 30, the determining including at least partially identifying the second user 30, the one or more particular formats being selected by the format selecting module 240 based, at least in part, on detected location or locations e.g., as detected by the user location determining module 248) of one or more eyes of the second user 30 relative to the front-side 17*a* of the computing device 10*.

In the same or different implementations, operation 688 may include an operation 692 for presenting the one or more items in the one or more particular formats in response, at least in part, to said determining, the one or more particular formats being selected based, at least in part, on detected location of a face of the second user relative to the front-side of the computing device. For instance, the particular format presenting module 104* including the format selecting module 240 and the user location determining module 248 of the computing device 10* presenting the one or more items in the one or more particular formats in response, at least in part, to said determining that the computing device 10* was transferred from the first user 20 to the second user 30, the determining including at least partially identifying the second user 30, the one or more particular formats being selected by the format selecting module 240 based, at least in part, on detected location of a face (e.g., as detected by the user location determining module 248) of the second user 30 relative to the front-side 17*a* of the computing device 10*.

In the same or different implementations, operation 688 may include an operation 693 for presenting the one or more items in the one or more particular formats in response, at least in part, to said determining, the one or more particular formats being selected based, at least in part, on the detected location or locations of the one or more features of the second user as sensed by one or more image capturing devices. For instance, the particular format presenting module 104* including the format selecting module 240 and the user location determining module 248 of the computing device 10* presenting the one or more items in the one or more particular formats in response, at least in part, to said determining that the computing device 10* was transferred from the first user 20 to the second user 30, the determining including at least partially identifying the second user 30, the one or more particular formats being selected by the format selecting module 240 based, at least in part, on the detected location or locations (e.g., as detected by the user location determining module 248) of the one or more features of the second user 30* as sensed (e.g., captured) by one or more image capturing devices 204.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware in one or more machines or articles of manufacture), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation that is implemented in one or more machines or articles of manufacture; or, yet again alternatively, the implementer may opt for some combination of hardware, software, and/or firmware in one or more machines or articles of manufacture. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware in one or more machines or articles of manufacture.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuitry (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuitry, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those having skill in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A system comprising:

(a) a transfer determining module including at least a user identifying module configured to determine that a computing device that is designed for presenting one or more items and that was in possession of a first user has been transferred from the first user to a second user, the determining including at least partially identifying the second user as a user registered with the computing device, including at least:

(1) a particular movement detecting module configured to determine that the computing device has been transferred from the first user to the second user when the particular movement detecting module at least detects that the computing device has exhibited one or more particular movements that at least suggest that the computing device has been transferred from the first user to the second user, including at least:

(A) a moving away detecting module configured to detect that the computing device has exhibited the one or more particular movements that at least suggest that the computing device has been transferred from the first user to the second user when the moving away detecting module at least detects, at least in part based on data from one or more image capturing devices, that the computing device has moved away from the first user; and (B) a tilt detecting module configured to detect that the computing device has exhibited the one or more particular movements that at least suggest that the computing device has been transferred from the first user to the second user when the tilt detecting module at least detects that the computing device is no longer in a particular tilt orientation that the computing device was detected as having when the computing device was in the possession of the first user, including at least detecting that the computing device has been reoriented from the particular tilt orientation to another tilt orientation that when detected as occurring at least suggests that the computing device has been transferred from the first user to the second user; and (b) a particular format presenting module configured to present the one or more items in one or more particular formats via the computing device, the particular format presenting module being responsive at least in part to the transfer determining module, the particular format presenting module including at least:

(1) a format selecting module configured to present the one or more items in the one or more particular formats by presenting the one or more items in one or more formats that were selected by the format selecting module based, at least in part, on determined identity of the second user and ascertaining which one or more formats are associated with the identity of the second user.

2. The system of claim 1, wherein said tilt detecting module configured to detect that the computing device has exhibited the one or more particular movements that at least suggest that the computing device has been transferred from the first user to the second user when the tilt detecting module at least detects that the computing device is no longer in a particular tilt orientation that the computing device was detected as having when the computing device was in the possession of the first user, including at least detecting that the computing device has been reoriented from the particular tilt orientation to another tilt orientation that when detected as occurring at least suggests that the computing device has been transferred from the first user to the second user comprises:

a tilt detecting module configured to detect that computing device has been reoriented from the particular tilt orientation to another tilt orientation having an angular tilt that is at least a predefined percentage different from an angular tilt associated with the particular tilt orientation that the computing device was detected as having when the computing device was in the possession of the first user.

3. The system of claim 1, wherein said particular movement detecting module comprises:

a particular movement detecting module including a spatial location detecting module configured to detect that the computing device has exhibited the one or more particular movements that at least suggest that the computing device has been transferred from the first user to the second user when the spatial location detecting module at least detects that the computing device is no longer at a particular spatial location that the computing device was detected as being located at when the computing device was in the possession of the first user.

4. The system of claim 3, wherein said spatial location detecting module comprises:

a spatial location detecting module configured to detect that the computing device is no longer at a particular spatial location that the computing device was detected as being located at when the computing device was in the possession of the first user by at least detecting that the computing device has been relocated from the particular spatial location to another spatial location that when detected at least suggests that the computing device has been transferred from the first user to the second user.

5. The system of claim 3, wherein said spatial location detecting module comprises:

a spatial location detecting module configured to detect that the computing device is no longer at a particular spatial location that the computing device was detected as being located at when the computing device was in the possession of the first user by at least detecting that the computing device has been relocated from the particular spatial location to another spatial location that is at least a predefined distance away from the particular spatial location that the computing device was detected as being located at when the computing device was in the possession of the first user.

6. The system of claim 1, wherein said particular movement detecting module comprises:

a particular movement detecting module including at least a spin rotation detecting module configured to detect that the computing device has exhibited the one or more particular movements that at least suggest that the computing device has been transferred from the first user to the second user when the spin rotation detecting module at least detects that the computing device has been spin rotated from a first orientation associated with the computing device when the computing device was in the possession of the first user to a second orientation.

7. The system of claim 1, wherein said moving away detecting module comprises:

a moving away detecting module configured to detect, at least in part based on data from one or more image capturing devices, that the computing device has moved away from the first user by at least detecting that the computing device has moved a predefined distance away from the first user.

8. The system of claim 1, wherein said particular movement detecting module comprises:

a particular movement detecting module including at least a vibration detecting module configured to detect that the computing device has exhibited the one or more particular movements that at least suggest that the computing device has been transferred from the first user to the second user when the vibration detecting module at least detects that the computing device is no longer vibrating in a manner that matches with a vibration pattern that the computing device was detected as having when the computing device was in the possession of the first user.

9. The system of claim 8, wherein said vibration detecting module comprises:

a vibration detecting module configured to detect that the computing device is no longer vibrating in a manner that matches with a vibration pattern that the computing device was detected as having when the computing device was in the possession of the first user by at least detecting that the computing device is vibrating in a manner that matches with a vibration pattern associated with the second user.

10. The system of claim 1, wherein said particular movement detecting module comprises:

a particular movement detecting module including a vibration detecting module configured to detect that the computing device has exhibited the one or more particular movements that at least suggest that the computing device has been transferred from the first user to the second user when the vibration detecting module at least detects that the computing device is not vibrating in a manner that matches with a vibration pattern that is associated with the first user.

11. The system of claim 1, wherein said particular movement detecting module comprises:

a particular movement detecting module including at least a three-dimensional movement detecting module configured to detect that the computing device has exhibited the one or more particular movements that at least suggest that the computing device has been transferred from the first user to the second user when the three-dimensional movement detecting module at least detects that the computing device has moved in a particular three-dimensional movement that implies that the computing device has been transferred from the first user to the second user.

12. The system of claim 1, wherein said transfer determining module including at least a user identifying module configured to determine that a computing device that is designed for presenting one or more items and that was in possession of a first user has been transferred from the first user to a second user, the determining including at least partially identifying the second user as a user registered with the computing device comprises:

a transfer determining module including at least a visual cue detecting module configured to determine that the computing device has been transferred from the first user to the second user when the visual cue detecting module at least detects presence or absence of one or more visual cues in proximate vicinity of the computing device that at least suggest that the computing device has been transferred from the first user to the second user.

13. The system of claim 12, wherein said visual cue detecting module comprises:

a visual cue detecting module including at least a lighting change detecting module configured to detect the presence or absence of the one or more visual cues in the proximate vicinity of the computing device when the lighting change detecting module detects at least a change in lighting in the proximate vicinity of the computing device that at least suggests that the computing device has at least been moved.

14. The system of claim 12, wherein said visual cue detecting module comprises:

a visual cue detecting module including at least a face detecting module configured to detect presence or absence of the one or more visual cues in the proximate vicinity of the computing device when the face detecting module at least detects presence of at least one face in the proximate vicinity of the computing device not associated with the first user.

15. The system of claim 14, wherein said face detecting module comprises:

a face detecting module configured to detect the presence of the at least one face in the proximate vicinity of the computing device not associated with the first user by at least detecting presence of the at least one face in the proximate vicinity of the computing device that is recognized as being associated with the second user.

16. The system of claim 12, wherein said visual cue detecting module comprises:

a visual cue detecting module including at least a face detecting module configured to detect the presence or absence of the one or more visual cues in the proximate vicinity of the computing device when the face detecting module at least detects presence of a first face associated with the first user and a second face associated with the second user in the proximate vicinity of the computing device, the second face being detected as being closer to the computing device than the first face.

17. The system of claim 12, wherein said visual cue detecting module comprises:

a visual cue detecting module including at least an eye detecting module configured to detect the presence or absence of the one or more visual cues in the proximate vicinity of the computing device when the eye detecting module detects presence of at least one eye in the proximate vicinity of the computing device not associated with the first user.

18. The system of claim 12, wherein said visual cue detecting module comprises:

a visual cue detecting module including at least an eye detecting module configured to detect the presence or absence of the one or more visual cues in the proximate vicinity of the computing device when the eye detecting module at least detects presence of a first one or more eyes associated with the first user and a second one or more eyes associated with the second user in the proximate vicinity of the computing device, the second one or more eyes being detected as being closer to the computing device than the first one or more eyes.

19. The system of claim 12, wherein said visual cue detecting module comprises:

a visual cue detecting module configured to detect the presence or absence of the one or more visual cues in the proximate vicinity of the computing device by at least detecting absence of a visual cue associated with the first user in the proximate vicinity of the computing device.

20. The system of claim 19, wherein said visual cue detecting module comprises:

a visual cue detecting module including at least a face detecting module configured to detect the absence of a visual cue associated with the first user in the proximate vicinity of the computing device when the face detecting module at least detects absence of a face associated with the first user in the proximate vicinity of the computing device.

21. The system of claim 19, wherein said visual cue detecting module comprises:

a visual cue detecting module including at least an eye detecting module configured to detect the absence of a visual cue associated with the first user in the proximate vicinity of the computing device when the eye detecting module at least detects absence of one or more eyes associated with the first user in the proximate vicinity of the computing device.

22. The system of claim 12, wherein said visual cue detecting module comprises:

a visual cue detecting module including at least a visual moving away detecting module configured to detect the presence or absence of the one or more visual cues in the proximate vicinity of the computing device when the visual moving away detecting module at least detects visually that the computing device has moved away from the first user.

23. The system of claim 12, wherein said visual cue detecting module comprises:

a visual cue detecting module including at least a visual moving closer detecting module configured to detect the presence or absence of the one or more visual cues in the proximate vicinity of the computing device when the visual moving closer detecting module at least detects visually that the computing device has moved closer to the second user.

24. The system of claim 1, wherein said transfer determining module including at least a user identifying module configured to determine that a computing device that is designed for presenting one or more items and that was in possession of a first user has been transferred from the first user to a second user, the determining including at least partially identifying the second user as a user registered with the computing device comprises:

a transfer determining module including at least an audio cue detecting module configured to determine that the computing device has been transferred from the first user to the second user when the audio cue detecting module at least detects presence or absence of one or more audio cues in proximate vicinity of the computing device that at least suggest that the computing device has been transferred from the first user to the second user.

25. The system of claim 24, wherein said audio cue detecting module comprises:

an audio cue detecting module including at least a voice pattern detecting module configured to detect the presence or absence of the one or more audio cues in the proximate vicinity of the computing device when the voice pattern detecting module at least detects presence of at least one audio voice pattern not associated with the first user in the proximate vicinity of the computing device.

26. The system of claim 1, wherein said particular format presenting module configured to present the one or more items in one or more particular formats via the computing device, the particular format presenting module being responsive at least in part to the transfer determining module comprises:

a particular format presenting module including at least a format selecting module configured to present the one or more items in the one or more formats that were selected by the format selecting module based, at least in part, on said determining, the one or more formats being selected based on one or more presentation preferences associated with the second user, the one or more presentation preferences being one or more preferences for how the one or more items are to be preferably presented via the computing device.

27. The system of claim 26, wherein said particular format presenting module including at least a format selecting module comprises:

a particular format presenting module including at least a format selecting module configured to present the one or more items in the one or more formats that were selected by the format selecting module based, at least in part, on said determining, the one or more formats being selected based on the one or more presentation preferences provided by the second user.

28. The system of claim 1, wherein said particular format presenting module configured to present the one or more items in one or more particular formats via the computing device, the particular format presenting module being responsive at least in part to the transfer determining module comprises:

a particular format presenting module including at least a format selecting module and a user location determining module configured to present the one or more items in the one or more particular formats in response, at least in part, to said determining, the one or more particular formats being selected by the format selecting module based, at least in part, on detected location of the second user relative to the computing device as detected by the user location determining module.

29. The system of claim 28, wherein said particular format presenting module including at least a format selecting module and a user location determining module comprises:

a particular format presenting module including at least a format selecting module and a user location determining module configured to present the one or more items in the one or more particular formats in response, at least in part, to said determining, the one or more particular formats being selected by the format selecting module based, at least in part, on detected location as detected by user location determining module of the second user relative to front-side of the computing device, the front-side of the computing device being a side of the computing device having a display device.

30. The system of claim 1, wherein said particular format presenting module configured to present the one or more items in one or more particular formats via the computing device, the particular format presenting module being responsive at least in part to the transfer determining module comprises:

a particular format presenting module including at least a format selecting module configured to present the one or more items in the one or more particular formats, the one or more particular formats including at least one of one or more particular font styles or sizes, one or more particular volume levels, and/or or one or more particular color schemes.

31. The system of claim 1, wherein said particular format presenting module configured to present the one or more items in one or more particular formats via the computing device, the particular format presenting module being responsive at least in part to the transfer determining module comprises:

a particular format presenting module including at least a format selecting module configured to present the one or more items in the one or more particular formats at least by displaying the one or more items through one or more user interfaces that has been configured to display the one or more items at one or more particular levels of brightness, tint, hue, and/or contrast.

32. The system of claim 1, wherein said user identifying module comprises:

a user identifying module including a registered user determining module configured to identify at least partially the second user when the registered user determining module at least determines that the second user is a registered user who is registered with the computing device.

33. The system of claim 32, wherein said registered user determining module comprises:

a registered user determining module including at least an identification (ID) credential acquiring module configured to determine that the second user is a registered user by having the identification (ID) credential acquiring module acquire the second user's one or more identification credentials and determining that the second user's one or more identification credentials are registered with the computing device.

34. The system of claim 32, wherein said registered user determining module comprises:

a registered user determining module including at least a registered preference determining module configured to determine that the second user is a registered user when the registered preference determining module determines that one or more presentation preferences associated with the second user are registered with the computing device, the one or more presentation preferences being one or more preferences for how the one or more items are to be preferably presented via the computing device.

35. An article of manufacture, comprising:

a non-transitory storage medium bearing at least:

(a) one or more instructions for determining that a computing device that is designed for presenting one or more items and that was in possession of a first user has been transferred from the first user to a second user, the determining including at least partially identifying the second user as a user registered with the computing device, the one or more instructions for determining including at least:

(1) one or more instructions for determining that the computing device has exhibited one or more particular movements that at least suggest that the computing device has been transferred from the first user to the second user, including at least:

(A) one or more instructions for determining, based at least in part on input received via one or more image capturing devices, that the computing device has moved away from the first user; and (B) one or more instructions for detecting that the computing device is no longer in a particular tilt orientation that the computing device was detected as having when the computing device was in the possession of the first user, including at least detecting that the computing device has been reoriented from the particular tilt orientation to another tilt orientation that when detected as occurring at least suggests that the computing device has been transferred from the first user to the second user; and (b) one or more instructions for presenting, via the computing device, the one or more items in one or more particular formats, the one or more instructions for presenting, via the computing device, the one or more items in one or more particular formats being responsive at least in part to the one or more instructions for determining that a computing device that is designed for presenting one or more items and that was in possession of a first user has been transferred from the first user to a second user, including at least:

(1) one or more instructions for presenting the one or more items in one or more formats that were selected based, at least in part, on determined identity of the second user and ascertaining which one or more formats are associated with the identity of the second user.

36. A computationally-implemented system, comprising:

(a) circuitry for determining that a computing device that is designed for presenting one or more items and that was in possession of a first user has been transferred from the first user to a second user, the determining including at least partially identifying the second user as a user registered with the computing device, the circuitry for determining including at least:

(1) circuitry for determining that the computing device has exhibited one or more particular movements that at least suggest that the computing device has been transferred from the first user to the second user, including at least:

(A) circuitry for determining, based at least in part on input received via one or more image capturing devices, that the computing device has moved away from the first user; and (B) circuitry for detecting that the computing device is no longer in a particular tilt orientation that the computing device was detected as having when the computing device was in the possession of the first user; including at least detecting that the computing device has been reoriented from the particular tilt orientation to another tilt orientation that when detected as occurring at least suggests that the computing device has been transferred from the first user to the second user; and (b) circuitry for presenting, via the computing device, the one or more items in one or more particular formats, the circuitry for presenting, via the computing device, the one or more items in one or more particular formats being responsive at least in part to the circuitry for determining that a computing device that is designed for presenting one or more items and that was in possession of a first user has been transferred from the first user to a second user, including at least:

(1) circuitry for presenting the one or more items in one or more formats that were selected based, at least in part, on determined identity of the second user and ascertaining which one or more formats are associated with the identity of the second user.

* * * * *